United States Patent [19]

Krieger et al.

[11] Patent Number: 5,841,817
[45] Date of Patent: Nov. 24, 1998

[54] APPARATUS AND METHODS FOR SIGNAL RECOVERY IN A DIGITAL COMMUNICATION SYSTEM

[75] Inventors: Abraham Krieger, San Diego; Mark Kent, Vista, both of Calif.

[73] Assignee: ADC Telecommunications, Inc., Minnetonka, Minn.

[21] Appl. No.: 549,565

[22] Filed: Oct. 27, 1995

[51] Int. Cl.$^6$ .................................................. H03D 1/00
[52] U.S. Cl. ............................................. 375/340; 341/43
[58] Field of Search .................................... 275/259, 316, 275/290, 340; 371/43; 375/348

[56] References Cited

U.S. PATENT DOCUMENTS

| | | | |
|---|---|---|---|
| 4,750,192 | 6/1988 | Dzung | 375/308 |
| 5,014,283 | 5/1991 | Baier | 375/235 |
| 5,311,523 | 5/1994 | Serizawa et al. | 375/270 |

OTHER PUBLICATIONS

M. Kent, D.D. Sworder, and R.J. Elliott, "*GMSK for Mobile Communication*," Proc. of the 28th Asilomar Conf. on Signals, Systems, and Computers (Monterey CA, Nov. 1994), IEEE Service Center, Piscataway, NJ., pp. 455–459.
Robert J. Elliott, "*A General Recursive Discrete Time Filter*," J. of Applied Probability, vol. 30, No. 3, Sep. 1993, pp. 575–588.
Robert J. Elliott, "*Exact Adaptive Filters for Markov Chains Observed in Gaussian Noise*," Automatica, vol. 30, 1994, pp. 1–10.

*Primary Examiner*—Tesfaldet Bocure
*Assistant Examiner*—Bryan Webster
*Attorney, Agent, or Firm*—Schwegman, Lundberg, Woessner & Kluth, P.A.

[57] ABSTRACT

The present invention provides an apparatus and method for signal recovery from noisy observation in digital communication systems, utilizing a forward estimator and data smoother which improves the quality of the estimates of the transmitted signal. The present invention also provides an apparatus and method for the application of the forward estimator to the recovery of a digital data stream modulated with a CPM waveform, through the use of a receiver for GMSK demodulation. The digital data is first processed using the Forward Estimation process which calculates the probability that a symbol is in particular states. Bit decision is then applied, followed by scaling. The present invention further provides an apparatus and method for the application of the forward estimator and data smoother to the decoding of digital data which has been encoded with a Convolutional code. The digital data is first processed using the Forward Estimation procedure and then smoothed and scaled. Bit decision is then applied.

54 Claims, 27 Drawing Sheets

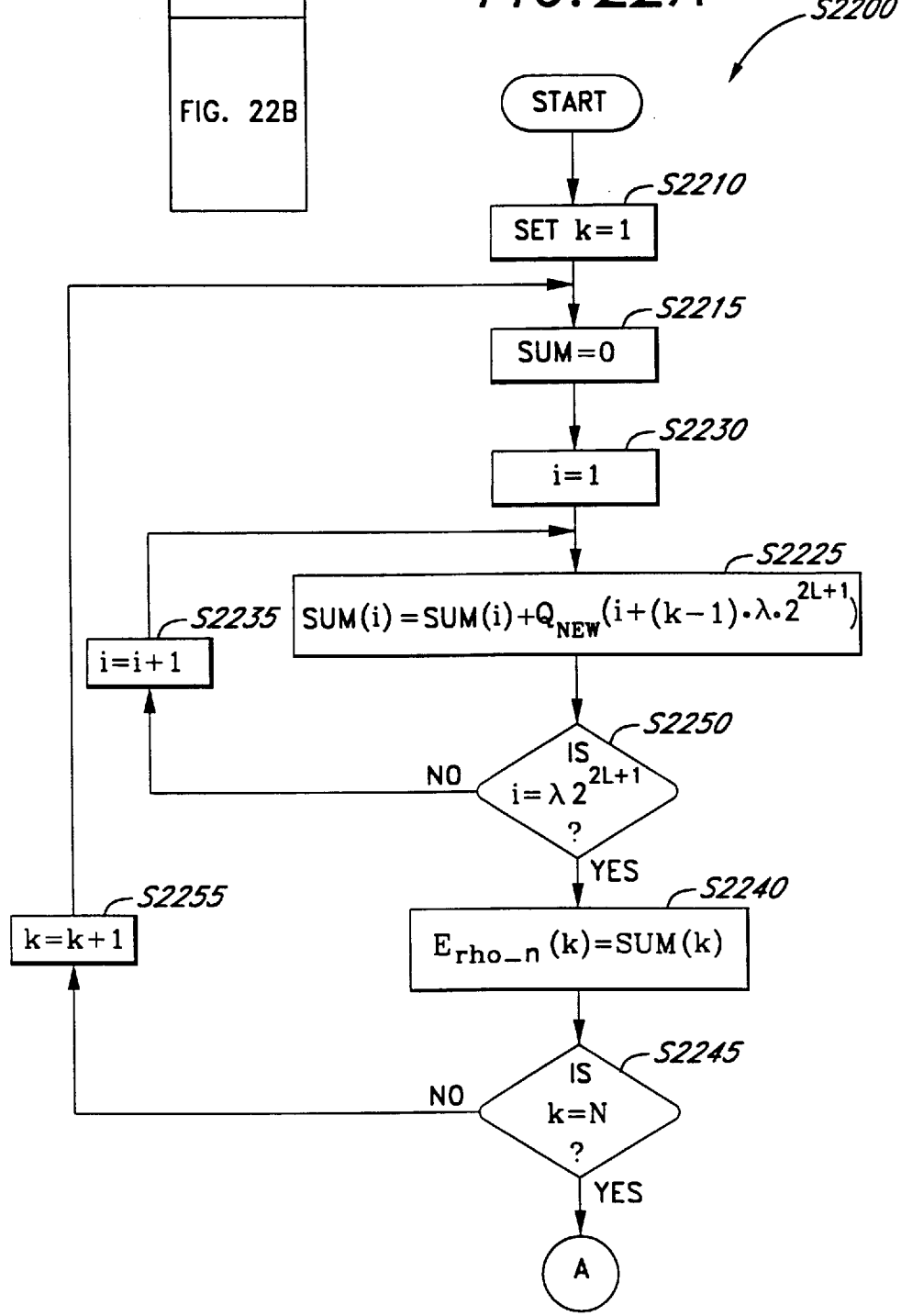

APPARATUS AND METHODS FOR SIGNAL RECOVERY IN A DIGITAL COMMUNICATION SYSTEM

BACKGROUND OF THE INVENTION

1. Field of the Invention

The present invention relates generally to digital communication systems, and in particular, to apparatus and methods for signal recovery in digital communication systems.

2. Description of the Related Art

Advances in wireless mobile digital communication systems provide increasing capabilities for accessing data and ubiquitous communication. With these increasing opportunities is the challenge for providing increasing performance while reducing the size and power consumption of the communication system. In addition, this challenge has to be met within the confines of the limited availability of frequency spectrum.

FIG. 1 illustrates a typical wireless communication system 10. An information source 12 at a transmitting station having symbols $\{I_0, I_1, \ldots, I_k, \ldots\}$, which are provided to a digital baseband transmit filter/pulse shaping circuit 14. The filter/pulse shaping circuit 14 provides the processed signals to a modulator 16 which modulates the signals at radio frequency. The signals are then transmitted by transmitter 18 to a transmission medium 20 which provides a communication channel for the signals to be transmitted to the receiver 22 at the receiving station. The receiver 22 includes an RF down converter/receive filter. The converter/filter 22 provides the down converts and filters the received signals before providing them to an information processor decoder/detector 24. The signals are decoded by the decoder/detector 24 and then provided to an information sink 26, which processes the recovered digital "estimated" symbols $\{\hat{I}_0, \hat{I}_1, \ldots \hat{I}_k, \ldots\}$.

The mobile radio channel provided via the transmission medium 20 presents aggregated problems that are difficult to overcome, and at times, can cause unrecoverable received symbol error. Radio signals, before arriving at the receiver 22, can be distorted in envelope, phase and frequency. In addition, the receiver 22 may experience intermittent shadowing or multipath effects, during which more than one image of the transmitted signal may be received at a particular time. This further complicates the receiver's task of correctly recovering the transmitted symbols. Detection and recovery of information at the receiver 22 is also complicated by the anomalous effects of signal generation and transmission. The effects of inter-symbol-interference (ISI), drifts in synchronization, fading and multipath reception, combine to make the task of information recovery at the receiver 22 difficult.

Accordingly, there is a need in the technology for an apparatus and method for effectively recovering signals from noisy observation in digital communication systems.

A conventional modulation scheme used in the typical wireless communication system 10 is the Binary Phase Shift Key (i.e. BPSK) modulation scheme. In this scheme, the information source produces binary symbols (0,1) every T-seconds, and the transmitted signal is of the form:

$$s(t) = A \cdot \cos(2\pi f_c \cdot t + \theta_k)$$

where
$\theta_k \in \{0, \pi\}$,
$t \in \{(kT+1)T\}$, $f_c$ is the carrier frequency of the system in hertz, and where the binary symbols (0,1) are mapped to phases $\{0, \pi\}$. As shown in FIG. 2, the phase trajectory for BPSK is discontinuous. The discontinuities at phase transitions for this waveform translate to a broadening of the power spectrum that results in an inefficient system which occupies more frequency spectrum than is usually available.

An alternative conventional modulation scheme that provides similar error rate performance as the BPSK scheme but which does not suffer from the discontinuities of the BPSK phase trajectory, is the Minimum Shift Key (i.e. MSK) modulation scheme. As shown in FIG. 3, the phase trajectory for MSK is piecewise continuous. MSK maps binary symbols {0,1} to positive and negative rates of change (i.e. frequencies) of the phase trajectory over each information symbol. In effect, the phase trajectory for MSK can be created by "integrating" a BPSK like modulation input.

For MSK, a $\pi/2$ change of phase occurs every symbol time. Phase transitions are continuous, and translate to a less occupied spectrum than that provided by the BPSK scheme. In general, the "smoother" the phase trajectory, the narrower the spectrum. Therefore, a waveform with continuous phase is a good candidate for digital modulation system. The power spectrum for BPSK and MSK are shown in FIG. 4.

A digital communication system that employs Continuous Phase Modulation (CPM) techniques to produce phase transitions which are not only continuous, but which also has continuous derivatives, is the Gaussian Minimum Shift Key (i.e. GMSK) scheme. GMSK is a CPM technique produced by filtering square flat top pulses with gaussian low pass filter of selectable bandwidth, which are then integrated to produce a continuous phase trajectory. The GMSK (with $\beta T=0.5$) and MSK phase trajectories for the same information pattern shown in FIG. 4, are depicted in FIG. 5.

The phase response to a single information bit for GMSK spreads over more than one symbol time. When a phase response to a single information bit spreads beyond one symbol or bit time, the CPM technique is called partial response. The phase response for MSK to a single information bit does not extend beyond one bit time, thus MSK is a member of the CPM family which has full response.

The continuity of the GMSK phase trajectory and its derivatives, resulting in a reduction of channel power spectrum compared to BPSK and MSK, motivates its implementation for wireless communications systems. The GMSK power spectrum along with that provided by BPSK and MSK is shown in FIG. 6. As shown, there is significant decrease in out-of-channel power spectrum for GMSK relative to MSK and BPSK.

Since most digital communication systems are typically operated over channels in which there is limited available spectrum, a smooth phase trajectory is a highly desirable characteristic. Spectrally efficient CPM can be achieved through a wide variety of techniques. While CPM techniques can significantly reduce out-of-channel power, this is not without exacting a cost. CPM increases the inter-symbol-interference (i.e. ISI) in the transmitted signal by spreading the information pulse in time. When partial response CPM signaling is employed, over a single symbol time at the receiver, information for the current symbol, as well as that for the neighboring symbols, are present. This ISI introduced by the CPM constraint can lead to degregated performance at the receiver when information recovery takes place.

Accordingly, there is a need in the technology for providing an apparatus and method of recovering digital data stream modulated with a CPM waveform which provides increased system performance.

Digital data that is transmitted over a noisy channel is usually first encoded to increase its immunity to channel errors. There are several methods of encoding and decoding the data and they are selected according to the characteristics of the channel and according to system specifications. Convolutional coding is an important member of the class of error correcting codes that are frequently used in conjunction with digital communication systems.

There are various techniques of encoding and decoding Convolutional codes. A discussion of these codes, along with the known encoding and decoding schemes, and their roles in digital communications systems, is provided by Shu Lin and Daniel J. Costelo, Jr. in *Error Control Coding in Fundamental and Applications* (Prentice-Hall 1983) and also by Proakis in *Digital Communication Systems* (McGraw Hill 1982).

In general, to encode a stream of digital data with a Convolutional code, the data is first input to a shift register 40 of length L as shown in FIG. 7. The output is generated by combining several stages of the shift register 20 with an exclusive-OR operation. To obtain the code redundancy, n different exclusive-OR functions are output for each m data input. The length L of the shift register 70 is known as the constraint length of the code and m/n is the code rate. FIG. 7 shows a block diagram of a system that produces Convolutional encoded binary data with a constraint length of 3 and a code rate of ½.

As can be seen from FIG. 7, for each binary input (i), there are two outputs c(i,l) and c(i,2). The selected output c(i,k) (i.e. c(i,l) or c(i,2) depends on the contents of the shift register 90 at the time b(i) enters the shift register 70. The sequence c(i,k) is then transmitted over the transmission channel via transmission medium 20 (see FIG. 1) and is received at the destination (i.e. Receiving Unit) corrupted by additive channel noise. The receiver's 22's task is then to recover the original value of the sequence {b(i)} from the noisy observation of the sequence {c(i,k)} in such a way that the recovered sequence will contain the least amount of errors. The optimal decoding scheme in the sense of minimizing the number of decoding errors is based on the maximum probability estimation of the transmitted sequence.

The most popular method for the decoding of Convolutional codes is the Viterbi algorithm which employs dynamic programming techniques for an efficient implementation of the maximum probability estimation as described by G. D. Forney, *The Viterbi Algorithm*, 61 Proc. IEEE 268–78 (March 1973).

The main disadvantage in implementing the Viterbi algorithm is its computational complexity. The computational complexity of the Viterbi algorithm is proportional to the memory needed for proper utilization of the algorithm. As shown by G. D. Forney in *The Viterbi Algorithm*, the memory required in implementing the Viterbi Algorithm is proportional to K·M, where M is the number of states in the code and K is the length of the sequence needed to be stored for each input. In general, M is an exponential function of the constraint length and K is a linear function of it. For example, the popular code with a constraint length 7 and a code rate of ½ has the values M=128 and K=35. It is important to note that the code performance, with respect to the decoding errors, improves with an increase of L. However, with current technology, the decoding of Convolutional codes with constraint length of greater than 7 is not practical using the Viterbi algorithm.

Accordingly, there is a need in the technology for providing an apparatus and method of decoding Convolutional codes which requires low implementational complexity while maintaining system performance.

BRIEF SUMMARY OF THE INVENTION

The present invention provides an apparatus and method for signal recovery from noisy observation in digital communication systems, utilizing a forward estimator and a data smoother which improves the quality of the estimates of the transmitted signal. Smoothing of the estimated signal is performed by applying the following expression:

$$\beta_n = q_n$$
$$\beta_{n-1} = q_{n-1} \otimes [A^T\beta_n]$$
$$\beta_{n-2} = q_{n-2} \otimes [A^T\beta_{n-1}]$$
$$\vdots$$
$$\beta_{n-j} = q_{n-j} \otimes [A^T\beta_{n-j+1}]$$

where $\beta_{n-j}$ is the smoothed estimate of the state at time (n–j) (considering measurements up to time n), $q_n$ is the forward estimate at time n, $A^T$ is the transpose of the system's state transition matrix, and $\oplus$ is the Haddamard product in $R^N$. This technique provides for the effective recovery of signals from noisy observation in digital communication systems.

The present invention also provides an apparatus and method for the application of a forward estimator to the recovery of a digital data stream modulated with a CPM waveform, through the use of a receiver for GMSK demodulation. The digital data is first processed using a Forward Estimation process which calculates the probability that a symbol of signal is in particular states, followed by bit selection. The current estimate is then scaled. This technique provides for the recovery of a digital data stream modulated with a CPM waveform and also provides increased system performance.

The present invention further provides an apparatus and method for the application of the forward estimator and data smoother to the decoding of digital data which has been encoded with a Convolutional code. The digital data is first processed using the Forward Estimation procedure and then smoothed and scaled. Bit decision is then applied. This technique provides for the decoding of Convolutional codes and involves low implementational complexity while maintaining system performance.

In one embodiment, a method of recovering transmitted signals in a digital communications system is provided. The method comprises the steps of:

(a) obtaining n samples of a received signal for a respective time p, p–1, p–2, . . . p–j and digitizing the n samples to provide (j+1) sets of n digitized samples;

(b) providing (j+1) vectors based on the (j+1) sets of n digitized samples, each vector having signal estimates of a transmitted signal for a respective time (p–t), where t=0 to j;

(c) storing the j vectors; and (d) providing an estimate vector having signal estimates of the transmitted signal for time (p–j), based on the (j+1) vectors.

In another embodiment, the method of recovering transmitted signals further comprises the steps of:

(e) determining if transmission of signals has ended;

(f) if transmission has not ended, then
  (f.1) storing the vector for time p and discarding the vector for time (p−j);
  (f.2) obtaining additional n samples of the received signal for time (p+1);
  (f.3) providing an additional vector based on the additional n samples, the vector having signal estimates of the transmitted signal for time (p+1); and
  (f.4) providing an estimate vector having signal estimates of the transmitted signal for time (p+1−j), based on the additional vector and the immediately preceding j vectors.

In another embodiment, the method further comprises the step of recovering the transmitted signal based on the estimate vector having signal estimates obtained at time (p−j).

In another embodiment, the method further comprises the steps of scaling the estimate vector and applying bit decision to the scaled estimate vector.

In another embodiment, a method of recovering transmitted continuous phase modulated signals in a digital communications system is provided. The method comprises the steps of:

(a) obtaining n samples of a received signal for a respective time p, p−1, p−2, . . . , p−j and digitizing the n samples to provide (j+1) sets of n digitized samples;

(b) providing (j+1) vectors based on the (j+1) sets of n digitized samples, each vector having signal estimates of a transmitted continuous phase modulated signal for a respective time (p−t), where t=0 to j;

(c) storing the j vectors; and (d) providing an estimate vector having signal estimates of the transmitted signal for time (p−j), based on the (j+1) vectors.

In another embodiment, the method of recovering transmitted continuous phase modulated signals further comprises the steps of:

(e) determining if transmission of signals has ended;

(f) if transmission has not ended, then
  (f.1) storing the vector for time p and discarding the vector for time (p−j);
  (f.2) obtaining additional n samples of the received signal for time (p+1);
  (f.3) providing an additional vector based on the additional n samples, the vector having signal estimates of the transmitted signal for time (p+1); and
  (f.4) providing an estimate vector having signal estimates of the transmitted signal for time (p+1−j), based on the additional vector and the immediately preceding j vectors.

In another embodiment, the method of recovering transmitted continuous phase modulated signals further comprises the step of recovering the transmitted signal based on the estimate vector having signal estimates for time (p−j).

In another embodiment, the method of recovering transmitted continuous phase modulated signals further comprises the steps of scaling the estimate vector and applying bit decision to the scaled estimate vector.

In another embodiment, step (b) of the method of recovering transmitted continuous phase modulated signals comprises the steps of:

(b.1) determining phase response vector $p(t_j)$, where $$t_j = -\frac{T}{2} \cdot (2L+1) + j \cdot \frac{T}{\lambda}, \; j = 0, \ldots (L+2) \cdot \lambda - 1,$$

where
  $\lambda$ is the number of samples per symbol, T is symbol time and L is a predetermined integer;

(b.2) determining a first matrix G based on the phase response vector, where $$G = \begin{bmatrix} p(t_0) & p(t_1) & \cdots & p(t_{\lambda-1}) \\ p(t_\lambda) & p(t_{\lambda+1}) & \cdots & p(t_{2\lambda-1}) \\ \cdots & \cdots & \cdots & \cdots \\ p(t_{(L+1)\lambda}) & p(t_{(L+1)\lambda+1}) & \cdots & p(t_{(L+2)\lambda-1}) \end{bmatrix},$$

where $G \in \mathfrak{R}^{2L+1,\lambda}$ (b.3) determining a second matrix NN, where $$NN = 0_{2L+1,2^{2L+1}} - 2 \cdot \begin{bmatrix} 0 & 0 & \cdots & 0 \\ 0 & 0 & \cdots & 1 \\ \cdots & \cdots & \cdots & \cdots \\ 1 & 1 & \cdots & 1 \end{bmatrix},$$

where $NN \in \mathfrak{R}^{2L+1}, 2^{2L+1}$ (b.4) providing a third matrix U, the third matrix being a product of the first and second matrices, where $$U = NN \cdot G = \begin{bmatrix} u_1 \\ \cdot \\ \cdot \\ \cdot \\ u_{2^{2L+1}} \end{bmatrix},$$

and $U \in \mathfrak{R}^{2^{2L+1}, \lambda}$ (b.5) providing a probability vector comprising a first probability vector $g_1$ and a second probability vector $g_2$, where $$g_1 = \cos \begin{bmatrix} v \\ v + \Delta\theta \\ \cdot \\ \cdot \\ v + (N-1) \cdot \Delta\theta \end{bmatrix}, g_2 = \sin \begin{bmatrix} v \\ v + \Delta\theta \\ \cdot \\ \cdot \\ v + (N-1) \cdot \Delta\theta \end{bmatrix}$$

where N is the number of memory states for the continuous phase modulated signal, $\Delta\theta = 2 \cdot \pi/N;$ and $$v = \begin{bmatrix} u^T \\ \cdot \\ \cdot \\ \cdot \\ \cdot \\ u^T_{2^{2L+1}} \end{bmatrix}.$$

In another embodiment, in step (b.5) of the method of recovering transmitted continuous phase modulated signals, $$N = \left\{ \begin{array}{l} p \cdot 2^{2L}, m - \text{even} \\ 2 \cdot p \cdot 2^{2L}, m - \text{odd} \end{array} \right\}$$

In another embodiment, step (d) of the method of recovering transmitted continuous phase modulated signals comprises the steps of:

(d.1) determining a first transition vector q, where $$q_{1,2 \cdot i-1} = q_{i,2 \cdot k} = q_{i+2}{}^{2L}{}_{,2 \cdot i-1} = q_{i+2}{}^{2L}{}_{,2 \cdot i} = 0.5,$$

where $i=1, 2, \ldots, 2^{2L}$;

(d.2) determining a second transition vector a, where $$a_{2,1} = a_{N,1} = a_{1,N} = a_{N-1,N} = 0.5$$

$$a_{i-1,i} = a_{i+1,i} = 0.5, \text{ where } i=2, \ldots, N-1$$

N is the Number of memory states for the continuous phase modulated signal; and (d.3) providing a transition matrix QA based on the first and second transition vectors, where $$QA = \begin{bmatrix} 0 & Q \cdot I_p & 0 & . & Q \cdot I_p \\ Q \cdot I_p & 0 & Q \cdot I_p & . & 0 \\ 0 & Q \cdot I_m & 0 & . & 0 \\ . & & & & . \\ . & 0 & Q \cdot I_m & . & . \\ 0 & . & 0 & . & Q \cdot I_m \\ Q \cdot I_m & 0 & 0 & . & 0 \end{bmatrix},$$

$$I_p = \begin{bmatrix} 1 & 0 & . & 0 & 0 & 0 \\ . & & & & & . \\ 0 & 0 & 0 & . & . & . \\ . & 0 & 1 & 0 & . & . \\ . & . & 0 & 0 & 0 & . \\ . & . & . & 0 & 1 & 0 \\ 0 & 0 & 0 & 0 & 0 & . \end{bmatrix}, I_p \in \Re^{N,N},$$

and $$I_m = \begin{bmatrix} 0 & 0 & . & 0 & 0 & 0 \\ . & & & & & . \\ 0 & 1 & 0 & . & . & . \\ . & 0 & 0 & 0 & . & . \\ . & . & 0 & 1 & 0 & . \\ . & . & . & 0 & 0 & 0 \\ . & . & . & . & . & . \\ 0 & 0 & 0 & 0 & 0 & . \end{bmatrix}, I_m \in \Re^{N,N}$$

(d.4) determining sample phasing matrices $Im_1$ and $IM_2$, where $$I_{m1} = \begin{bmatrix} 0 & 0 & \ldots & 1 \\ 0 & 0 & \ldots & 0 \\ . & . & & . \\ . & . & 0 & . \\ . & . & & . \\ 0 & 0 & . & 0 \end{bmatrix}, I_{m1} \in \Re^{\lambda,\lambda},$$

$$I_{m2} = \begin{bmatrix} 0 & \ldots & 0 \\ I_{\lambda-1,\lambda-1} & & 0 \end{bmatrix}, I_{m2} \in \Re^{\lambda,\lambda};$$

and (d.5) determining a State Transition, $QA_f$ and providing an estimate vector based on $QA_f$.

In another embodiment, in step (d.2) of the method of recovering transmitted continuous phase modulated signals, $$N = \left\{ \begin{array}{l} p \cdot 2^{2L}, m - \text{even} \\ 2 \cdot p \cdot 2^{2L}, m - \text{odd} \end{array} \right\}$$

and m/p is a modulation index.

In another embodiment, a method of decoding transmitted Convolutionally encoded signals in a digital communication system is provided. The method comprises the steps of:

(a) obtaining n samples of a received signal for a respective time p, p-1, p-2, ..., p-j and digitizing the n samples to provide (j+1) sets of n digitized samples;

(b) providing (J+1)) vectors based on the (j+1) sets of n digitized samples, each vector having signal estimates of a transmitted signal for a respective time (p-t), where t=0 to j;

(c) storing the j vectors; and (d) providing an estimate vector having signal estimates of the transmitted signal for time (p-j), based on the (j+1) vectors.

In another embodiment, the method of decoding transmitted Convolutionally encoded signals further comprises the steps of:

(e) determining if transmission of signals has ended;

(f) if transmission has not ended, then (f.1) storing the vector for time p and discarding the vector of time p-j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

In another embodiment, the method of decoding transmitted Convolutionally encoded signals further comprises the step of recovering the transmitted signal based on the estimate vector having signal estimates for time (p−j).

In another embodiment, the method of decoding transmitted Convolutionally encoded signals further comprises the steps of scaling the estimate vector and applying bit decision to the scaled estimate vector.

In another embodiment, the method of decoding transmitted Convolutionally encoded signals, wherein step (b) comprises the steps of:

(b.1) selecting n encoding polynomials, $g_1(x), \ldots, g_n(x)$, where $x=(0,\ldots,2^{mL})$, m/n is the code rate and mL is a size of a shift register used for data encoding;

(b.2) determining $a_l$, where $a_l=g_l(k+i\cdot 2^{m(L-1)})\cdot r_l g_l$ being representative of the encoding polynomials $g_1(x), \ldots, g_n(x)$, $r_1$ being representative of the digitized samples, and $l=1, \ldots n$;

(b.3) determining a function f, where f is the exponential of the summation of $a_l$ from l=1 to l=n; and (b.4) updating the signal estimate u, where an updated estimate $u(p, k+i\cdot 2^{m(L-1)})$ is equal to the summation of $u(p-1, k\cdot 2m+j)$ taken from j=0 to j=$2^m$−1, multiplied by the function f.

In another embodiment, the method of decoding transmitted Convolutionally encoded signals, wherein step (d) comprises the steps of:

(d.1) summing a plurality of probabilities of state transitions from a state at time (p−1) to a state at time p to obtain an intermediate estimate vector;

(d.2) multiplying the intermediate estimate vector with a corresponding vector obtained in step (b) component by component;

(d.3) repeating steps (d.1) and (d.2) for t=2, . . . j, to obtain the estimate vector for time (p−j).

In another embodiment, an apparatus for recovering transmitted signals in a digital communications system is provided. The method comprises:

a receiver for obtaining n samples of a received signal for a respective time p, p−1, p−2, . . . , p−j and digitizing the n samples to provide (j+1) sets of n digitized samples;

a decoder for providing (j+1) vectors based on the (j+1) sets of n digitized samples, each vector having signal estimates of a transmitted signal for a respective time (p−t), where t=0 to j;

a register for storing the j vectors; and the decoder also providing an estimate vector having signal estimates of the transmitted signal for time (p−j), based on the (j+1) vectors.

In another embodiment of the apparatus for recovering transmitted signals, the decoder further determines if transmission of signals has ended, and wherein if transmission has not ended, the register further stores the vector for time p and discards the vector for time p−j, the receiver further obtains additional n samples of the received signal for time (p+1), the decoder further provides an additional vector based on the additional n samples, the vector having signal estimates of the transmitted signal for time (p+1), and the decoder further provides an estimate vector having signal estimates of the transmitted signal for time (p+1−j), based on the additional vector and the immediately preceding j vectors.

In another embodiment of the apparatus for recovering transmitted signals, the decoder further recovers the transmitted signal based on the estimate vector having signal estimates for time (p−j).

In another embodiment of the apparatus for recovering transmitted signals, the decoder further scales the estimate vector, and applies bit decision to the scaled estimate vector.

In another embodiment, an apparatus for recovering transmitted continuous phase modulated signals in a digital communications system is provided. The apparatus comprises:

a receiver for obtaining n samples of a received signal for a respective time p, p−1, p−2, . . . , p−j and digitizing the n samples to provide (j+1) sets of n digitized samples;

a decoder for providing (j+1) vectors based on the (j+1) sets of n digitized samples, each vector having signal estimates of a transmitted continuous phase modulated signal for a respective time (p−t), where t=0 to j;

a register for storing the j vectors; and the decoder also providing an estimate vector having signal estimates of the transmitted signal for time (p−j), based on the (j+1) vectors.

In another embodiment of the apparatus for recovering continuous phase modulated signals, the decoder further determines if transmission of signals has ended, and wherein if transmission has not ended, the register further stores the vector for time p and discards the vector for time p−j, the receiver further obtains additional n samples of the received signal for time (p+1), the decoder further provides an additional vector based on the additional n samples, the vector having signal estimates of the transmitted signal for time (p+1), and the decoder further provides an estimate vector having signal estimates of the transmitted signal for time (p+1−j), based on the additional vector and the immediately preceding j vectors.

In another embodiment of the apparatus for recovering continuous phase modulated signals, the decoder further recovers the transmitted signal based on the estimate vector having signal estimates for time (p−j).

In another embodiment of the apparatus for recovering continuous phase modulated signals, the decoder further scales the estimate vector, and applies bit decision to the scaled estimate vector.

In another embodiment of the apparatus for recovering continuous phase modulated signals, the decoder provides the j vectors by:

(b.1) determining phase response vector $p(t_j)$, where $$\text{where } t_j = -\frac{T}{2} \cdot (2L+1) + j \cdot \frac{T}{\lambda}, j=0, \ldots (L+2)\cdot \lambda - 1,$$

$\lambda$ is the number of samples per symbol, T is symbol time and L is a predetermined integer;

(b.2) determining a first matrix G based on the phase response vector, where $$G = \begin{bmatrix} p(t_0) & p(t_1) & \ldots & p(t_{\lambda-1}) \\ p(t_\lambda) & p(t_{\lambda+1}) & \ldots & p(t_{2\lambda-1}) \\ \ldots & \ldots & \ldots & \ldots \\ p(t_{(L-1)+\lambda}) & p(t_{(L+1)-\lambda+1}) & \ldots & p(t_{(L+2)\lambda-1}) \end{bmatrix},$$

where $G \in \mathfrak{R}^{2L+1,\lambda}$ (b.3) determining a second matrix NN, where $$NN = 0_{2^{2L+1}, 2^{2L+1}} - 2 \cdot \begin{bmatrix} 0 & 0 & \ldots & 0 \\ 0 & 0 & \ldots & 1 \\ \ldots & \ldots & \ldots & \ldots \\ 1 & 1 & \ldots & 1 \end{bmatrix},$$

where $NN \in \mathfrak{R}^{2^{2L+1}, 2^{2L+1}}$ (b.4) providing a third matrix U, the third matrix being a product of the first and second matrices, where $$U = NN \cdot G = \begin{bmatrix} u_1 \\ \cdot \\ \cdot \\ \cdot \\ u_{2^{2L+1}} \end{bmatrix},$$

and $U \in \mathfrak{R}^{2^{2L+1}, \lambda}$ (b.5) providing a probability vector comprising a first probability vector $g_1$ and a second probability vector $g_2$, where $$g_1 = \cos \begin{bmatrix} v \\ v + \Delta\theta \\ \cdot \\ \cdot \\ v + (N-1) \cdot \Delta\theta \end{bmatrix}, g_2 = \sin \begin{bmatrix} v \\ v + \Delta\theta \\ \cdot \\ \cdot \\ v + (N-1) \cdot \Delta\theta \end{bmatrix}$$

where N is the number of memory states for the continuous phase modulated signal, $\Delta\theta = 2 \cdot \pi/N;$ and $$v = \begin{bmatrix} u^T \\ \cdot \\ \cdot \\ \cdot \\ u^T_{2^{2L+1}} \end{bmatrix}.$$

In another embodiment of the apparatus for recovering continuous phase modulated signals, $$N = \begin{cases} p \cdot 2^{2L}, & m - \text{even} \\ 2 \cdot p \cdot 2^{2L}, & m - \text{odd} \end{cases}$$

In another embodiment of the apparatus for recovering continuous phase modulated signals, the decoder provides the estimate vector by:

(d.1) determining a first transition vector q, where $q_{i,2\cdot i-1} = q_{i,2\cdot i} = q_{i+2^{2L}, 2\cdot i-1} = q_{i+2^{2L}, 2\cdot i} = 0.5,$ where $i = 1, 2, \ldots, 2^{2L}$;

(d.2) determining a second transition vector a, where $a_{2,1} = a_{N,1} = a_{1,n} = a_{N-1,N} = 0.5$ $a_{i-1,i} = a_{i+1,i} = 0.5,$ where $i = 2, \ldots, N-1$ where N is the Number of memory states for the continuous phase modulated signal; and (d.3) providing a transition matrix QA based on the first and second transition vectors, where $$QA = \begin{bmatrix} 0 & Q \cdot I_p & 0 & \cdot & Q \cdot I_p \\ Q \cdot I_p & 0 & Q \cdot I_p & \cdot & 0 \\ 0 & Q \cdot I_m & 0 & \cdot & 0 \\ \cdot & 0 & Q \cdot I_m & \cdot & \cdot \\ 0 & \cdot & 0 & \cdot & Q \cdot I_m \\ \cdot & & & & \cdot \\ Q \cdot I_m & 0 & 0 & \cdot & 0 \end{bmatrix},$$

$$I_p = \begin{bmatrix} 1 & 0 & \cdot & 0 & 0 & 0 \\ 0 & 0 & 0 & \cdot & \cdot & \cdot \\ \cdot & 0 & 1 & 0 & \cdot & \cdot \\ \cdot & & & & & \cdot \\ \cdot & \cdot & 0 & 0 & 0 & \cdot \\ \cdot & & & & & \cdot \\ \cdot & \cdot & \cdot & 0 & 1 & 0 \\ 0 & 0 & 0 & 0 & 0 & \cdot \end{bmatrix}, I_p \in \mathfrak{R}^{N,N},$$

and $$I_m = \begin{bmatrix} 0 & 0 & \cdot & 0 & 0 & 0 \\ \cdot & & & & & \cdot \\ 0 & 1 & 0 & \cdot & \cdot & \cdot \\ \cdot & & & & & \cdot \\ \cdot & 0 & 0 & 0 & \cdot & \cdot \\ \cdot & & & & & \cdot \\ \cdot & \cdot & 0 & 1 & 0 & \cdot \\ \cdot & \cdot & \cdot & 0 & 0 & 0 \\ 0 & 0 & 0 & 0 & 0 & \cdot \end{bmatrix}, I_m \in \mathfrak{R}^{N,N}$$

(d.4) determining sample phasing matrices $Im_1$ and $IM_2$, where $$I_{m1} = \begin{bmatrix} 0 & 0 & \ldots & 1 \\ 0 & 0 & \ldots & 0 \\ \vdots & \vdots & 0 & \vdots \\ 0 & 0 & . & 0 \end{bmatrix}, I_{m1} \in \mathfrak{R}^{\lambda,\lambda},$$

$$I_{m2} = \begin{bmatrix} 0 & \ldots & 0 \\ I_{\lambda-1,\lambda-1} & & 0 \end{bmatrix}, I_{m2} \in \mathfrak{R}^{\lambda,\lambda};$$

and (d.5) determining a State Transition, $QA_f$ and providing the estimate vector based on $QA_f$.

In another embodiment of the apparatus for recovering continuous phase modulated signals, $$N = \begin{Bmatrix} p \cdot 2^{2L}, m - \text{even} \\ 2 \cdot p \cdot 2^{2L}, m - \text{odd} \end{Bmatrix}$$

where m/p is a modulation index.

In another embodiment, an apparatus for decoding transmitted Convolutionally encoded signals in a digital communication system is provided. The apparatus comprises:

a receiver for obtaining n samples of a received signal for a respective time p, p–1, p–2, ... p–j and digitizing the n samples to provide (j+1) sets of n digitized samples;

a decoder for providing (j+1) vectors based on the (j+1) sets of n digitized samples, each vector having signal estimates of a transmitted Convolutionally encoded signal for a respective time (p–t), where t=0 to j;

a register for storing the j vectors; and the decoder also providing an estimate vector having signal estimates of the transmitted signal for time (p–j), based on the (j+1) vectors.

In another embodiment of the apparatus for decoding transmitted Convolutionally encoded signals, the decoder further determines if transmission of signals has ended, and wherein if transmission has not ended, the register further stores the vector for time p and discards the vector for time p–j, the receiver further obtains additional n samples of the received signal for time (p+1), the decoder further provides an additional vector based on the additional n samples, the vector having signal estimates of the transmitted signal for time (p+1), and the decoder further provides an estimate vector having signal estimates of the transmitted signal for time (p+1–j), based on the additional vector and the immediately preceding j vectors.

In another embodiment of the apparatus for decoding transmitted Convolutionally encoded signals, the decoder further recovers the transmitted signal based on the estimate vector having signal estimates for time (p–j).

In another embodiment of the apparatus for decoding transmitted Convolutionally encoded signals, the decoder further scales the estimate vector, and applies bit decision to the scaled estimate vector.

In another embodiment of the apparatus for decoding transmitted Convolutionally encoded signals, the decoder provides the j vectors by:

(b.1) selecting n encoding polynomials, $g_1(x), \ldots, g_n(x)$, where $x=(0, \ldots, 2^{mL})$, n/n is the code rate and mL is a size of a shift register used for data encoding;

(b.2) determining $a_l$, where $a_l = g_l(k+i \cdot 2^{m(L-1)}) \cdot r_l$, $g_l$ being representative of the encoding polynomials $g_1(x), \ldots,$ $g_n(x)$, $r_l$ being representative of the digitized samples, and l=1, ..., n;

(b.3) determining a function f, where f is the exponential of the summation of $a_l$ from l=1 to l=n; and (b.4) updating the signal estimate u, where an updated estimate $u(p, k+i \cdot 2^{m(L-1)})$ is equal to the summation of $u(p-1, k \cdot 2m+j)$ taken from j=0 to j=$2^m$–1, multiplied by the function f.

In another embodiment of the apparatus for decoding transmitted Convolutionally encoded signals, the decoder provides the estimate vector by:

(d.1) summing a plurality of probabilities of state transitions from a state at time (p–1) to a state at time p to obtain an intermediate estimate vector;

(d.2) multiplying the intermediate estimate vector with a corresponding vector obtained in step (b) component by component;

(d.3) repeating steps (d.1) and (d.2) for t=2, ..., j, to obtain the estimate vector for time (p–j).

In another embodiment, computer-executable process steps for recovering transmitted signals in a digital communications system are provided. The computer-executable process steps include:

(a) obtaining n samples of a received signal for a respective time p, p–1, p–2, ..., p–j and digitizing the n samples to provide (j+1) sets of n digitized samples;

(b) providing (j+1) vectors based on the (j+1) sets of n digitized samples, each vector having signal estimates of a transmitted signal for a respect time (p=t), where t=0 to j;

(c) storing the j vectors; and (d) providing an estimate vector having signal estimates of the transmitted signal for time (p–j), based on the (J+1)) vectors.

In another embodiment, the computer-executable process steps further include the steps of:

(e) determining if transmission of signals has ended;

(f) if transmission has not ended, then (f.1) storing the vector for time p and discarding the vector for time p–j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1–j), based on the additional vector and the immediately preceding j vectors.

In another embodiment, the computer-executable process steps further include the step of recovering the transmitted signal based on the estimate vector having signal estimates for time (p–j).

In another embodiment, the computer-executable process steps further include the steps of:

scaling the estimate vector; and applying bit decision to the scaled estimate vector.

In another embodiment, computer-executable process steps for recovering transmitted continuous phase modulated signals in a digital communications system are provided. The computer executable process steps include the steps of:

(a) obtaining n samples of a received signal for a respective time p, p–1, p–2, ..., p–j and digitizing the n samples to provide (j+1) sets of n digitized samples;

(b) providing ((j+1) vectors based on the (j+1) sets of n digitized samples, each vector having signal estimates of a transmitted continuous phase modulated signal for a respective time (p−t), where t=0 to j;

(c) storing the j vectors; and (d) providing an estimate vector having signal estimates of the transmitted signal for time (p−j), based on the (j+1) vectors.

In another embodiment, the computer-executable process steps further include the steps of:

(e) determining if transmission of signals has ended;

(f) if transmission has not ended, then (f.1) storing the vector for time p and discarding the vector for time p−j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

In another embodiment, the computer executable process steps further include the step of recovering the transmitted signal based on the estimate vector having signal estimates for time (p−j).

In another embodiment, the computer-executable process steps further include the steps of:

scaling the estimate vector; and applying bit decision to the scaled estimate vector.

In another embodiment, step (b) of the computer-executable process steps comprises the steps of:

(b.1) determining phase response vector p ($t_j$), where $$p(t_j) = [p(t_0), p(t_1), \ldots p(t_{(L+2)\lambda-1})]$$

where $$t_j = -\frac{T}{2} \cdot (2L+1) + j \cdot \frac{T}{\lambda}, j = 0, \ldots (L+2) \cdot \lambda - 1,$$

$\lambda$ is the number of samples per symbol, T is symbol time and L is a predetermined integer;

(b.2) determining a first matrix G based on the phase response vector, where $$G = \begin{bmatrix} p(t_0) & p(t_1) & \ldots & p(t_{\lambda-1}) \\ p(t_\lambda) & p(t_{\lambda+1}) & \ldots & p(t_{2\lambda-1}) \\ \ldots & \ldots & \ldots & \ldots \\ p(t_{(L-1)+\lambda}) & p(t_{(L+1)-\lambda+1}) & \ldots & p(t_{(L+2)\lambda-1}) \end{bmatrix},$$

where $G \in \Re^{2L+1, \lambda}$ (b.3) determining a second matrix NN, where $$NN = 0_{2^{2L+1}, 2^{2L+1}} - 2 \cdot \begin{bmatrix} 0 & 0 & \ldots & 0 \\ 0 & 0 & \ldots & 1 \\ \ldots & \ldots & \ldots & \ldots \\ 1 & 1 & \ldots & 1 \end{bmatrix},$$

where $NN \in \Re^{2^{2L+1}, 2^{2L+1}}$ (b.4) providing a third matrix U, the third matrix being a product of the first and second matrices, where $$U = NN \cdot G = \begin{bmatrix} u_1 \\ \cdot \\ \cdot \\ \cdot \\ u_{2^{2L+1}} \end{bmatrix},$$

and $$U \in \Re^{2^{2L+1}, \lambda}$$

(b.5) providing a probability vector comprising a first probability vector $g_1$ and a second probability vector $g_2$, where $$g_1 = \cos \begin{bmatrix} v \\ v+\Delta\theta \\ \cdot \\ \cdot \\ v+(N-1)\cdot\Delta\theta \end{bmatrix}, g_2 = \sin \begin{bmatrix} v \\ v+\Delta\theta \\ \cdot \\ \cdot \\ v+(N-1)\cdot\Delta\theta \end{bmatrix}$$

N is the number of memory states of the continuous phase modulated signal, $$\Delta\theta = 2 \cdot \pi/N;$$

and $$v = \begin{bmatrix} u^T \\ \cdot \\ \cdot \\ \cdot \\ \cdot \\ u^T_{2^{2L+1}} \end{bmatrix}.$$

In another embodiment, in step (b.5) of the computer-executable process steps, $$N = \begin{Bmatrix} p \cdot 2^{2L}, m - \text{even} \\ 2 \cdot p \cdot 2^{2L}, m - \text{odd} \end{Bmatrix}$$

where m/p is a modulation index.

In another embodiment, step (d) of the computer-executable process steps comprises the steps of:

(d.1) determining a first transition vector q, where $$q_{i,2\cdot i-1} = q_{i,2\cdot i} = q_{i+2}^{2L}, {}_{2\cdot i-1} = q_{i+2}^{2L}, {}_{2\cdot i} = 0.5,$$

where i=1, 2, ..., $2^{2L}$;

(d.2) determining a second transition vector a, where $$a_{2,1} = a_{N,1} = a_{1,N} = a_{N-1,N} = 0.5$$

$$a_{i-1,i} = a_{i+1,i} = 0.5, \text{ where } i=2, \ldots, N-1$$

where N is the Number of memory states for the continuous phase modulated signal; and (d.3) providing a transition matrix QA based on the first and second transition vectors, where $$QA = \begin{bmatrix} 0 & Q \cdot I_p & 0 & . & Q \cdot I_p \\ Q \cdot I_p & 0 & Q \cdot I_p & . & 0 \\ 0 & Q \cdot I_m & 0 & . & 0 \\ . & 0 & Q \cdot I_m & . & . \\ 0 & . & 0 & . & Q \cdot I_m \\ Q \cdot I_m & 0 & 0 & . & 0 \end{bmatrix},$$

$$I_p = \begin{bmatrix} 1 & 0 & . & 0 & 0 & 0 \\ 0 & 0 & 0 & . & . & . \\ . & 0 & 1 & 0 & . & . \\ . & . & 0 & 0 & 0 & . \\ . & . & . & 0 & 1 & 0 \\ 0 & 0 & 0 & 0 & 0 & . \end{bmatrix}, I_p \in \Re^{N,N}$$

and $$I_m = \begin{bmatrix} 0 & 0 & . & 0 & 0 & 0 \\ 0 & 1 & 0 & . & . & . \\ . & 0 & 0 & 0 & . & . \\ . & . & 0 & 1 & 0 & . \\ . & . & . & 0 & 0 & 0 \\ 0 & 0 & 0 & 0 & 0 & . \end{bmatrix}, I_m \in \Re^{N,N}$$

(d.4) determining sample phasing matrices $Im_1$ and $Im_2$, where $$I_{m1} = \begin{bmatrix} 0 & 0 & . & . & 1 \\ 0 & 0 & . & . & 0 \\ . & . & & . & \\ . & . & 0 & . & \\ . & . & & . & \\ 0 & 0 & . & & 0 \end{bmatrix},$$

$$I_{m1} \in \Re^{\lambda,\lambda}, I_{m2} = \begin{bmatrix} 0 & . & . & . & 0 \\ I_{\lambda-1,\lambda-1} & & & & 0 \end{bmatrix}, I_{m2} \in \Re^{\lambda,\lambda};$$

and (d.5) determining a State Transition, $QA_f$ and providing the estimate vector based on $QA_f$.

In another embodiment, in step (d.2) of the computer-executable process steps, $$N = \begin{Bmatrix} p \cdot 2^{2L}, m - \text{even} \\ 2 \cdot p \cdot 2^{2L}, m - \text{odd} \end{Bmatrix}$$

where m/p is a modulation index.

In another embodiment, computer-executable process steps of decoding transmitted Convolutionally encoded signals in a digital communication system are provided. The computer-executable process steps include the steps of:

(a) obtaining n samples of a received signal for a respective time p, p−1, p−2, . . . , p−j and digitizing the n samples to provide (j+1) sets of n digitized samples;

(b) providing (j+1) vectors based on the (j+1) sets of n digitized samples, each vector having signal estimates of a transmitted Convolutionally encoded signal for a respective time (p−t), where t=0 to j;

(c) storing the j vectors; and (d) providing an estimate vector having signal estimates of the transmitted signal for time (p−j), based on the (j+1) vectors.

In another embodiment, the computer-executable process steps further include the steps of:

(e) determining if transmission of signals has ended;

(f) if transmission has not ended, then (f.1) storing the vector for time p and discarding the vector for time p−j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

In another embodiment, the computer-executable process steps further include the step of recovering the transmitted signal based on the estimate vector having signal estimates for time (p−j).

In another embodiment, the computer-executable process steps further include the steps of:

scaling the estimate vector; and applying bit decision to the scaled estimate vector.

In another embodiment, step (b) of the computer-executable process steps includes the steps of:

(b.1) selecting n encoding polynomials, $g_1(x), \ldots, g_n(x)$, where $x=(0, \ldots, 2^{mL})$, m/n is the code rate and mL is a size of a shift register used for data encoding;

(b.2) determining $a_l$, where $a_l = g_l(k+I \cdot 2^{m(L-1)}) \cdot r_l$, $g_l$ being representative of the encoding polynomials $g_1(x), \ldots, g_n(x)$, $r_1$ being representative of the digitized samples, and $l=1, \ldots, n$;

(b.3) determining a function f, where f is the exponential of the summation of $a_l$ from $l=1$ to $l=n$; and (b.4) updating the signal estimate u, where an updated estimate $u(p, k+i \cdot 2^{m(L-1)})$ is equal to the summation of $u(p-1, k \cdot 2m+j)$ taken from $j=0$ to $j=2^m-1$, multiplied by the function f.

In another embodiment, step (d) of the computer-executable process steps includes the steps of:

(d.1) summing a plurality of probabilities of state transitions from a state at time (p−1) to a state at time p to obtain an intermediate estimate vector;

(d.2) multiplying the intermediate estimate vector with a corresponding vector obtained in step (b) component by component;

(d.3) repeating steps (d.1) and (d.2) for $t=2, \ldots, j$, to obtain the estimate vector for time (p−j).

BRIEF DESCRIPTION OF THE DRAWINGS

FIGS. 22A and 22B are a flow chart of the Bit Decision process implemented by the Bit Decision block 1740 in FIG. 17.

DETAILED DESCRIPTION OF THE PREFERRED EMBODIMENT

Figure 1:
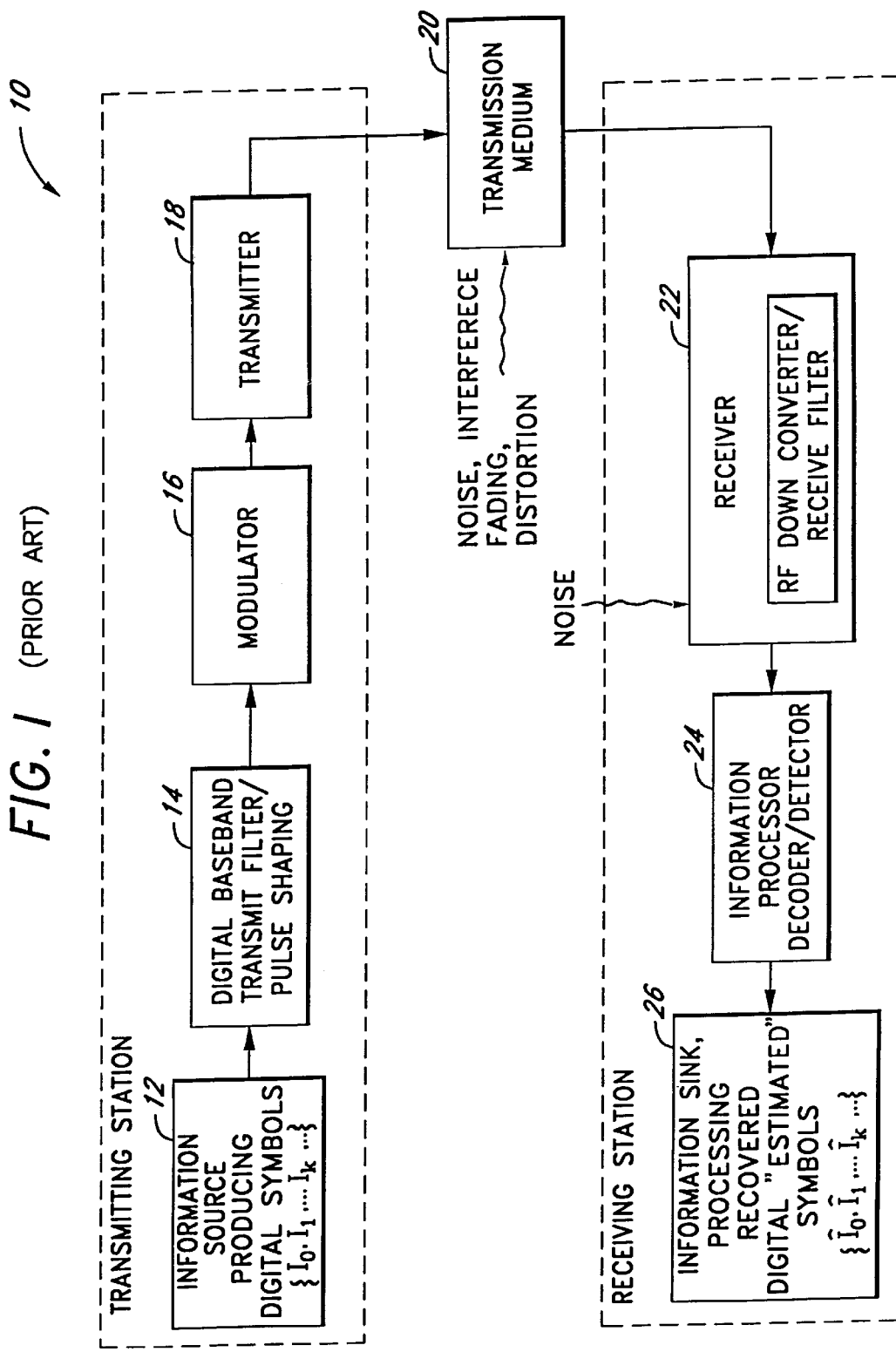
FIG. 1 is an exemplary block diagram of a typical wireless communication system 10.
Figure 2:
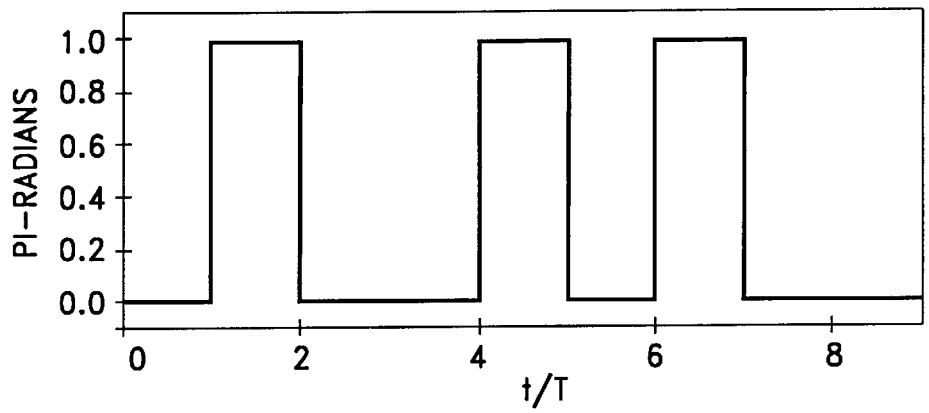
FIG. 2 is a graph illustrating the phase trajectory for BPSK.
Figure 3:
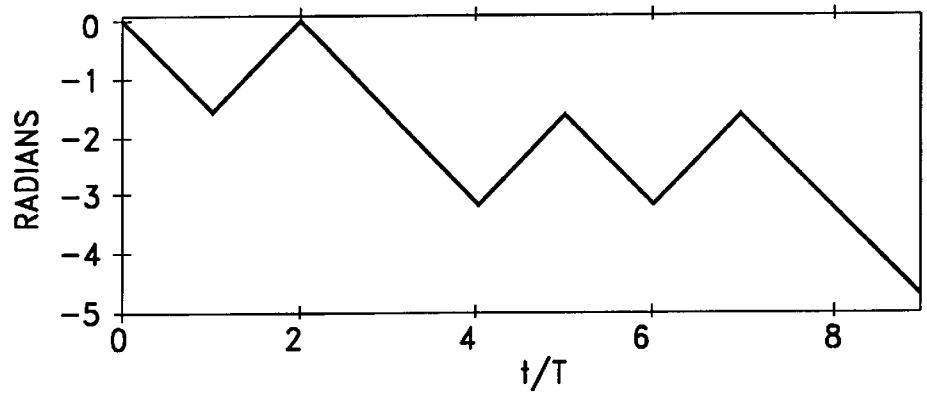
FIG. 3 is a graph illustrating the phase trajectory for MSK.
Figure 4:
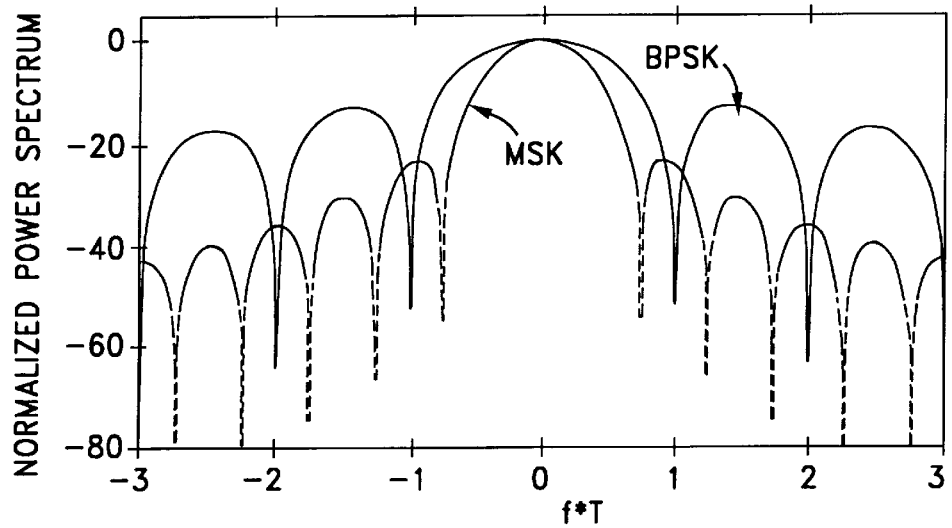
FIG. 4 is a graph illustrating the power spectrum for BPSK and MSK.
Figure 5:
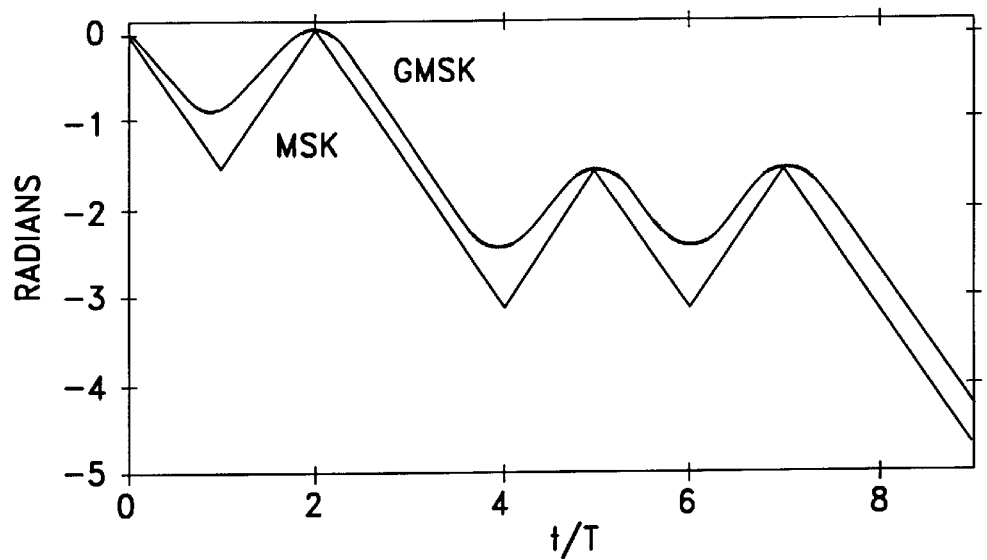
FIG. 5 is a graph illustrating the phase trajectories for MSK and GMSK.
Figure 6:
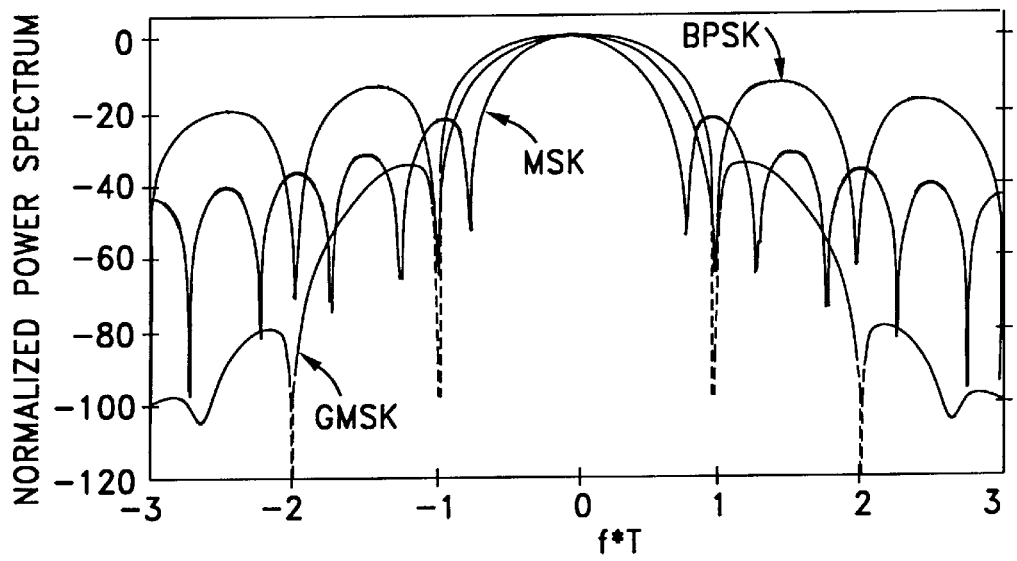
FIG. 6 is a graph illustrating the normalized power spectrums for BPSK, MSK and GMSK.

The present invention provides an apparatus and method for signal recovery from noisy observation in digital communication systems, through the utilization of a forward estimator and data smoother which improves the quality of the estimates of the transmitted signal. The present invention also provides an apparatus and method for applying a forward estimator which calculates the probability that a symbol of a signal is in particular states, to the recovery of a digital data stream modulated with a CPM waveform through the use of a receiver for GMSK demodulation. The present invention further provides an apparatus and method for the application of the forward estimator and data smoother to the decoding of digital data encoded with a Convolutional code.

The CPM signal and the convolutional encoded signal provide state vectors, which are used to represent the signal in either case. The state vectors change with the particular data stream transmitted and if the state at a given time is known, the data that generated that state vector is also known. The converse is also true, that is, if we know the data sequence at a particular time, the data sequence completely defines the state vector for that time. The transition from state to state is represented by a transition matrix. This matrix depends on the particular modulation scheme in the case of the CPM signal, and on the convolutional code structure in the case of the convolutional encoded signal.

At the receiver, we want to estimate the transmitted bit stream from the samples of received waveform. This is done by estimating the state vectors, and from the state vectors the data is obtained. The estimation of the state vectors is done by the forward estimation process, This estimation process utilizes the signal structure and the system's state transition matrix to obtain a new estimate with the reception of each new set of samples. The present invention involves the derivation of the state vectors and transition matrix representation for CPM signals, and application of this estimation process for data recovery in CPM systems and in decoding convolutional encoded signals. The present invention also provides a method for improving the estimates that were made in the past. This is done with a back smoothing process that also uses the induced structure of the state vectors and the transition matrix. It also uses the forward estimate state vectors going back in time until the point that we want to get an improved estimate.

The steps of the procedure performed by the receiver can be summarized as follows. First, obtaining n new samples of the received signal at time p. Next, using these samples, the state vector is estimated. The receiver saves the j vectors representing the estimates at time p−1, p−2, ..., p−j. Finally, the receiver uses the current state estimated vector and the past j stored estimate, to create an improved state estimate for time p−j. The transmitted data at time p is recovered from the estimated state vector at time p, or the transmitted data at time (p−j) is recovered from the improved state estimate at time (p−j). This process then continues until the end of transmission.

A. THEORY OF OPERATION

A.1 Description

All processes are defined on a complete probability space $(\Omega, F, P)$. The time parameter n, will take on values in $Z^+=\{1, 2, 3, \ldots,\}$. For a signal process, $\{X_n, n \in Z^+\}$ is taken as a finite state homogeneous Markov chain. The state space for the process X, is mapped onto the set of unit vectors $S=\{e_1, e_2, \ldots, e_n\}$, where $e_i=[0\ 0\ \ldots\ 1\ \ldots\ 0\ \ldots\ 0]^T \in R^N$ with 1 in the i'th position and where N is an integer. It is assumed that $X_0$ is given, or that $E[X_0]$ is known. The process X is not observed directly, but there is an observable real-valued process $\{Y_n, n \in Z^+\}$ which has the following form:

$$Y_n = <g, X_n> + <\sigma, X_n> W_n$$

where $\{w_n\}$ a sequence of independently and identically distributed (iid) N(0,1) random variables. The density of $w_n$ is denoted as $\phi$. The notation $<, X_n>$ is used to indicate an inner product, and g & σ are known vectors. Since $\{X_n \in S\}$, the inner products $<,X_n>$, are determined by the vectors g and σ.

The following definitions are presently provided: $\{F_n\}$ is the filtration generated by the σ-field $\{X_1, \ldots, X_n\}$, $\{Y_n\}$ is the filtration generated σ-field $\{Y_1, \ldots Y_n\}$, and $\{G_n\}$ is the complete filtration generated by the σ-field $\{Y_1, \ldots, Y_n, X_0, X_1, \ldots, X_{n+j}\}$.

Since $\{X_n, n \in Z^+\}$ is a homogeneous Markov chain, it has the following transition probability matrix A with elements $a_{ij}$ given by:

$$P(X_n=e_i|F_{n-1})=P(X_n=e_j)=a_{ij}$$

$X_n$ can be expressed in terms of a matrix A as follows:

$$X_n = AX_{n-1} + m_n$$

where $m_n$ is a $R^N$ (P, $F_n$) martingale increment. A recursive estimate of the parameters of the process X is desired. In order to arrive at a recursion which incorporates the information filtration $\{Y_n\}$ into the estimate, a change of measure is examined in which the observation process is an independent iid sequence of random variables.

A.2 Chance of Measure

The observation process can be rendered as an independent iid under a new probability measure $\overline{P}$ as described by R. J. Elliot, *Exact Adoptive Filters for Markov Chains Observed in Gaussian Noise,* 30 Automatica n. 30 (1994).

The following is defined:

$$\lambda_l = \frac{<\sigma, X_l> \Phi(y_l)}{\Phi(W_l)}, l \in Z^+$$

$$\Lambda_n = \prod_{l=0}^{n} \lambda_l, \Lambda_{0=l}$$

The new probability measure is constructed by setting the restriction of the Radon-Nikodyn derivative on the filtration $G_n$, to the following expression:

$$\Lambda_n : \frac{d\overline{P}}{dP} |G_n$$

A discussion of the measure $\overline{P}$ and its properties is provided by 30 R. J. Elliot, *A General Recursive Discrete Time Filter,* 30 Journal of Applied Probability 578–88 (Sept. 1993) and P. Bremaud, *Point Processes and Queues, Martingale Dynamics,* Springer Verlag (1981).

Under the new measure $\overline{P}$, the measurements are independent iid random variables. In particular, they are independent of the process X. The required estimate may be derived under this new measure.

A.3 Recursive MAP Signal Estimation, Utilizing The New Measure

To arrive at a recursive estimate of the signal, the new measure $\overline{P}$ is obtained and $E(<X_k, e_r>|Y_k)$ which represents the probability that the Markov-chain is at state r, given the observation filtration $\{Y_k\}$ is computed. The following is defined:

$$\overline{\lambda}_l = \frac{\Phi(W_l)}{<\sigma,X_l>\Phi(y_l)}, l \in Z^+$$

$$\overline{\Lambda}_n = \prod_{l=0}^{n} \overline{\lambda}_l, \overline{\Lambda}_0 = 1$$

The original probability measure may be constructed by setting the restriction of the Radon-Nikodyn derivative on the filtration $G_n$, to the following:

$$\overline{\Lambda}_n : \frac{dP}{d\overline{P}} |G_n$$

The estimate $E(<X_k, e_r>|Y_k)$ may be rewritten using the terms of the new measure $\overline{P}$ by utilizing a version of Bayes theorem which facilitates the writing of the following expression:

$$E(\langle X_k, e_r\rangle/Y_k) = \frac{\overline{E}(\overline{\Lambda}_k \langle X_k, e_r\rangle/Y_k)}{\overline{E}(\overline{\Lambda}_k/Y_k)}$$

This expression allows us to work under the new measure $\overline{P}$, where the numerator expectation $E(\langle X_k, e_r\rangle|Y_k)$, can be easily computed, since under $\overline{P}$, the process $\{X_n\}$ and measurements $\{y_n\}$ are independent. To proceed, only the numerator of $E(\langle X_k, e_r\rangle|Y_k)$ is considered and the following expression is defined:

$$q_k^r = \overline{E}(\overline{\Lambda}_k \langle X_k, e_r\rangle|Y_k)$$

where $q_k^r$ is the un-normalized conditional expectation of the $r^{th}$ state of the signal process $X_k$. The denominator of $E(\langle X_k, e_r\rangle|Y_k)$ can be found by summing $q_k^r$ over all states of the process $\{X_n\}$. Thus, the individual expectations are sufficient to compute the estimate. The un-normalized estimate may be expressed as follows:

$$q_k^r = \overline{E}(\overline{\Lambda}_k \langle X_k, e_r\rangle\{Y_k\}) = \overline{E}(\overline{\Lambda}_{k-1}\langle X_k, e_r\rangle \overline{\lambda}_k/Y_k)$$

By examining the term on the inside of the right hand expectation (i.e. $\langle X_k, e_r\rangle \overline{\lambda}_{k+1}$) first it is noted that $\overline{\lambda}_k$ is given by:

$$\overline{\lambda}_k = \frac{\Phi\left(\frac{y_k - \langle g, X_k\rangle}{\langle \sigma, X_k\rangle}\right)}{\langle \sigma, X_k\rangle \Phi(y_k)}$$

Since X takes on only one of the vectors $\{e_1, e_2, \ldots, e_N\}$ at each time, the term $\langle X_k, e_r\rangle \overline{\lambda}_k$ is zero, when $X_k e_r$. Thus we have:

$$\langle X_k, e_r\rangle \overline{\lambda}_k = \langle X_k, e_r\rangle \frac{\Phi\left(\frac{y_k - g_r}{\sigma_r}\right)}{\sigma_r \cdot \Phi(y_k)}$$

We can then substitute the above into the expression for $q_k^r$ to obtain the following expression:

$$q_k^r = \overline{E}\left(\overline{\Lambda}_{k-1}\langle X_k, e_r\rangle \frac{\Phi\left(\frac{y_k - g_r}{\sigma_r}\right)}{\sigma_r \cdot \Phi(y_k)} / Y_k\right)$$

and introduce the notation for the value of the required expectation:

$$q_k^r = \overline{E}(\overline{\Lambda}_{k-1}\langle X_k, e_r\rangle L_k^r/Y_k)$$

where the following is defined:

$$L_k^r = \frac{\Phi\left(\frac{y_k - g_r}{\sigma_r}\right)}{\sigma_r \cdot \Phi(y_k)}$$

Since the expectation defined under $\overline{P}$ is conditioned on the filtration $\{Y_k\}$, the term $L_k^r$ from the inside of the expectation can be extracted, and the following expression may be obtained:

$$q_k^r = \overline{E}(\overline{\Lambda}_{k-1}\langle X_k, e_r\rangle/Y_{k-1}) \cdot L_k^r$$

The conditioning filtration is now $\{Y_{k-1}\}$, since the terms inside the expectation do not depend upon $y_k$. Next, the vector process $X_k$ is expanded as follows:

$$\langle X_k, e_r\rangle = \langle AX_{k-1} + m_k, e_r\rangle$$

The expression for the vector process $X_k$ is substitution into the previous expression to obtain the following expression:

$$q_k^r = [\overline{E}(\overline{\Lambda}_{k-1}\langle AX_k, e_r\rangle/Y_{k-1}) + \overline{E}(\overline{\Lambda}_{k-1}\langle m_k, e_r\rangle/Y_{k-1})] L_k^r$$

The second expectation on the right hand side of the above expression is clearly 0, and $$\langle AX_{k-1}, e_r\rangle = \sum_{j=1}^{N} \langle X_{k-1}, e_j\rangle a_{rj},$$

can be substituted into the non-zero term of the above expression to obtain the following expression:

$$q_k^r = \overline{E}(\overline{\Lambda}_{k-1}\langle X_k, e_r\rangle a_{rj}/Y_{k-1}) \cdot L_k^r$$

Interchanging the expectation and the summation symbol, we obtain:

$$q_k^r = \sum_{j=1}^{N} \overline{E}(\overline{\Lambda}_{k-1}\langle X_{k-1}, e_j\rangle/Y_{k-1}) \cdot a_{rj} L_k^r$$

Which provides the following desired result:

$$q_k^r = \sum_{j=1}^{N} q_{k-1}^j \cdot a_{rj} L_k^r$$

The vector of the estimate states at time k is denoted by $q_k$
The present invention provides an apparatus and method of updating the estimate $q_k$ as time moves forward and as new observations arrive. However, previous estimates can also be back-smoothed so as to improve the estimation performance. The smoothing is done by moving back in time according to the transition probability matrix A, from one estimated state to the next.

Assuming that the sequence of filtered estimates at time n, that is $\{q_n, q_{n-1}, q_{n-2}, \ldots, q_{n-j}\}$ is known, and that the estimate of a state j time units in the past requires improvement. The process for improving the filtered estimates may be described by the following expressions:

$$\beta_n = q_n$$
$$\beta_{n-1} = q_{n-1} \otimes [A^T \beta_n]$$
$$\beta_{n-2} = q_{n-2} \otimes [A^T \beta_{n-1}]$$
$$\vdots$$
$$\beta_{n-j} = q_{n-j} \otimes [A^T \beta_{n-j+1}]$$

where $\beta_{n-j}$ is the smoothed estimate of the state at time (n–j) (considering measurements up to time n), $q_n$ is the forward estimate at time n, $A^T$ is the transpose of the system's state transition matrix, and $\oplus$ is the Haddamard product in $R^N$.

A.4 Operation

Figure 8:
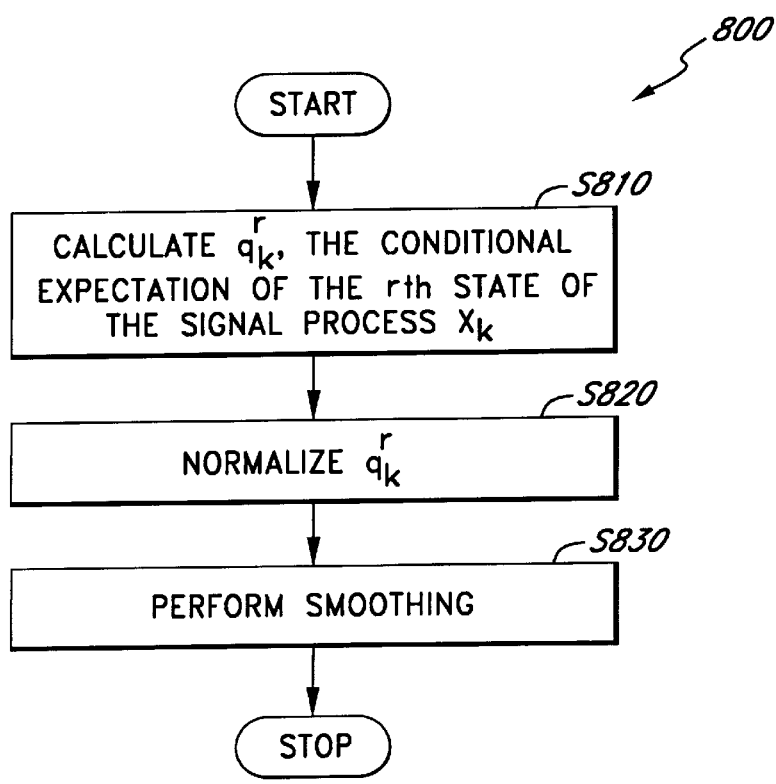
FIG. 8 is a flow chart illustrating the method of recovering signals from noisy observation in accordance with one embodiment of the present invention.
Figure 9:
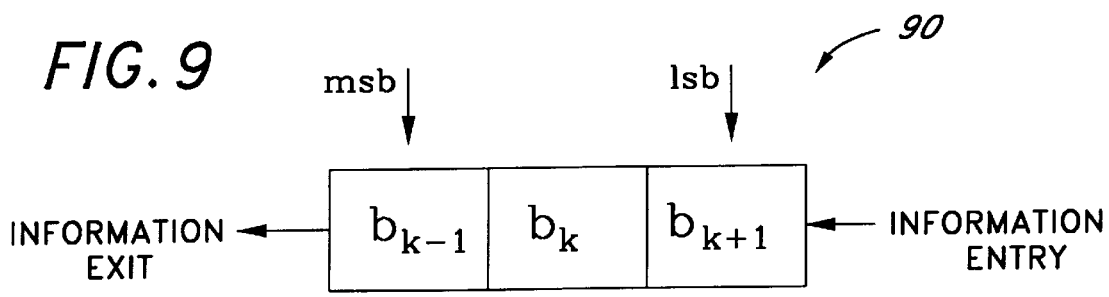
FIG. 9 is a block diagram illustrating the Shift Register 90 utilized in a receiver in accordance with one embodiment of the present invention.

FIG. 8 is a flow chart of a method of the present invention which provides the "estimated" symbols of a transmitted signal. The method of the present invention may be implemented in a receiver of a communication system in recovering signals from noisy observation.

Upon receiving the transmitted signal, the process S800 begins from a start state, and proceeds to process step S810, during which the process S800 calculates $q_k$ the conditional expectation of the $r^{th}$ state of the signal process $X_k$, where k is time. The process S800 then advances to process step S820, where $q_k$ is normalized. The process S800 then proceeds to process step S830, where smoothing of the estimated signal is performed. In one embodiment, this is done by applying the following expression:

$$\beta_n = q_n$$
$$\beta_{n-1} = q_{n-1} \otimes [A^T \beta_n]$$
$$\beta_{n-2} = q_{n-2} \otimes [A^T \beta_{n-1}]$$
$$\vdots$$
$$\beta_{n-j} = q_{n-j} \otimes [A^T \beta_{n-j+1}]$$

where $\beta_{n-j}$ is the smoothed estimate of the state at time (n−j) (considering measurements up to time n), $q_n$ is the forward estimate at time n, $A^T$ is the transpose of the system's state transition matrix, and $\oplus$ is the Haddamard product in $R^N$. The process S800 then terminates. Because the process S800 provides the smoothing of estimated signals at time (n−j), it may be considered as a "data smoothing" process.

B. DECODING OF CPM

B.1 Overview

The following sections provide a discussion of one application of data smoother discussed in Section A to the recovery of a Continuous Phase Modulation (CPM) signal, which is observed with additive channel noise. It will be shown that CPM can be modeled as a function of two homogenous hidden Markov models (HMMs). The phase process results from the ISI bit pattern will be first described, followed by a description of the memory induced by the CPM constraint.

Homogeneous HMMs have been used for speech processing in the recent past with success, and in L. R. Rabiner, *A Tutorial on Hidden Markov Models and Selected Applications in Speech Recognition*, 77 Proc. of IEEE 257–85 n.2 (February 1989) tutorial article, the power of HMMs applied to speech processes is presented. Recently, F. Swarts and H. C. Ferreira, *Markov Characterization of Channels with Soft Decision Outputs*, 41 IEEE Trans. on Commun. 678–82, n.5 (May 1993) used HMMs to model the envelope for a digital communication system under the influence of fading using the techniques outlined in Rabiner's tutorial article. However, to date, there has yet to be a description of CPM in terms of an HMM as provided herein.

The new non-linear multi-sample receiver provided by the present invention allows a highly parallel recursive estimate of the signal, conditioned on the measurement history (i.e. filtration) to be computed at each sample time at low complexity. This new receiver naturally takes advantage of the inherent growing information pattern produced by the memory within the CPM. In the following sections, a general model that represents a CPM waveform as a Markov-Chain, as provided by the present invention, will be discussed. An example for the process is provided using GMSK.

B.2 Markov Models for CPM Systems

CPM produces a phase trajectory which can be expressed in its most general form as the following sum:

$$2 \cdot \pi \sum_{n=-\infty}^{k} I_n h_n p(t - nT), \text{ where } t\epsilon[kT, (k+1)T)]$$

where $\{I_k\}$ is a sequence of information symbols selected from an M-ary alphabet; the value $h_k$ is called the modulation index, which in general can vary over a finite set of values; and p(t) is the phase response function. For any CPM system, the phase-response function can be written as the integral of some pulse shape (i.e., u(t)), as follows:

$$p(t) = \int_0^t u(\tau)d\tau$$

The pulse shape (i.e. u(t)) and its duration are chosen so as to meet the constraints of the system. When the pulse shape has a single symbol time of non-zero value, the CPM is called full-response. In the same way, when the pulse extends more than one symbol time, the CPM is called partial-response. In general, the longer the pulse shape is non-zero in the time-domain, the more the spectrum will be reduced in the frequency domain and the smoother the phase trajectory will be at symbol transitions. While this is desirable, in that out of band power spectrum is reduced, ISI is increased, and symbol detection suffers.

Full response CPM phase trajectories obey the following equation:

$$\theta(t) = 2 \cdot \pi \cdot p(T) \sum_{n=-\infty}^{k} I_n h_n + 2 \cdot \pi \cdot I_k h_k p(t - kT), t\epsilon[kT, (k+1)T)$$

again, $\{I_k\}$ is a sequence of information symbols selected form an M-ary alphabet, $h_k$ is the modulation index, and p(t) is the phase-response function for the CPM. Partial Response CPM has a phase-response function extending over more than a single symbol time and is expressed as follows:

$$\theta(t)2 \cdot \pi \cdot p((2L+1)T) \sum_{n=-\infty}^{k-L-1} I_n h_n + 2 \cdot \pi \sum_{i=-L}^{L} I_{k+i} h_{k+i} p(t - iT - kT),$$

where $t\epsilon[kT,(k+1)T]$ L determines the number of neighboring interfering symbols on either side of the current symbol, $I_k$ and $h_k$ are the symbol sequence and modulation indices, respectively, as in the full response equation. The parameter L reflects the amount of ISI that is present in the phase waveform, and the phase-response function p(t) extends over (2L+1) symbol times. In the development which follows, Markov models of CPM phase trajectories are developed with constant modulation index, which can be expressed as a rational fraction (i.e. $h_k$=h=m/p).

B.3 Phase Space of CPM

Figure 10:
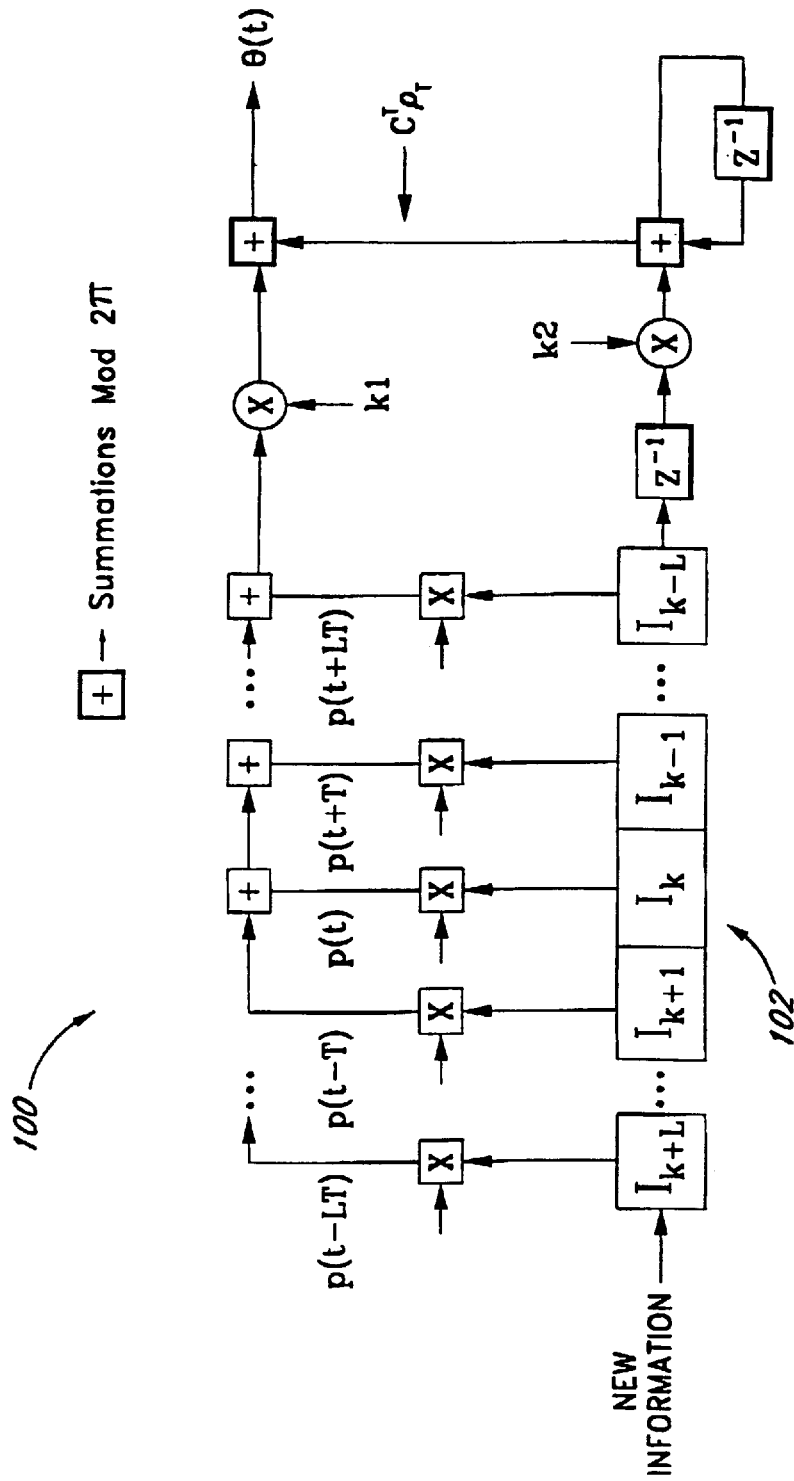
FIG. 10 is a block diagram of a communication system which utilizes Partial Response CPM in accordance with one embodiment of the present invention.

The phase trajectory for CPM system consists of shifting new information into a shift register and forming linear combinations of the phase-response function. Data exiting the shift register is then integrated, creating memory for systems such as continuous-phase-frequency-shift-key (i.e. CPFSK) system. When there is no memory, CPM is generated purely by the contents of a shift register and the phase response function. FIG. 10 is a block diagram of a communications system which utilizes the CPM phase process of the present invention. The constants $k_1$, $k_2$, and vector $C^T$ are derived from the particular type of CPM utilized.

B.3.1 CPM Shift Register Process

The shift register 102 in the system 100 shown in FIG. 10 gives rise to Markov process with transitions at the symbol times, the process is henceforth called the shift-register-process and denoted as $\phi$. The shift-register process is a $M^{2L+1}$ dimensional random process defined as follows:

$$\phi_n = e_i, \text{ when } n=k\lambda+r.$$

where k represents the K'th information bit, $\lambda$ is the number of samples per symbol, and r={0, 1, 2, . . . $\lambda$−1} is the position of the sample within the $k^{th}$ information symbol. $\phi$ is a $\mathfrak{R}^{M^{2L-1}}$ unit vector taking on value $e_i$, when the value of the M-ary expansion of the shift register contents $\{I_L, I_{L-1}, \ldots I_0, \ldots I_L\}$ is equal to (i−1). With these definitions, $\phi$ is a Markov process with transitions at the symbol times. The following equation describes the shift-register-process:

$$\phi_n = Q_n \cdot \phi_{n-1} + m_n$$

where $Q_n = I$, and $m_n = 0$, when $n \neq k\lambda$ (i.e. no-symbol-transition). For each shift-register-process, assume the most-significant symbol is assumed to be the most recent in time and the symbol exiting the shift-register 102 is assumed to be the least significant symbol. Using these definitions, the elements of $Q_n$ is defined as follows:

$$q_{ij} = p(\phi_n = e_{i-1} | \phi_{n-1} = e_{j-1})$$

The elements of $Q_n$ for binary symbols are further enumerated as follows:

$$q_{i,2 \cdot i-1} = q_{i,2 \cdot i} = q_{1+2^{2L}, 2 \cdot i-1} = q_{i+2^{2L}, 2 \cdot i} = 0.5,$$

where $i = 1, 2, \ldots, 2^{2L}$ and $s = i-1$.

At each symbol transition, $m_n$ is a martingale difference sequence. Proof: The Markov property guarantees the following:

$$q_{ji} = p(\phi_{n+1} = e_{j-1} | \phi_n = e_{i-1}).$$

$F_{-1}$ is denoted as the sigma field generated by the process $\phi = \{\phi_0, \phi_1, \phi_2, \ldots, \phi_{n-1}\}$. In computing the value of $E[m_n | F_{n-1}]$, where $m_n = \phi_n - Q_n \cdot \phi_{n-1}$, the following may be expressed:

$$E[m_n | F_{n-1}] = Q_n \cdot \phi_{n-1} - Q_n \cdot \phi_{n-1} = 0$$

Thus, $\{m_n\}$ is indeed a sequence of martingale increments.

B.3.2 CPM Memory Process

In systems employing frequency modulation of information, memory is created by CPM systems which integrate the output of the shift register 102 of FIG. 10. The output of shift register 102 generates a memory-process, denoted as $\rho$, and having transitions at the symbol times. $\rho$ is a $\Re^N$ unit vector on value $e_i$, when the integrated sum is equal to $2\pi(i-1)/N$, where N is the total number memory states for the CPM. N is function of the modulation index $h = m/p$, given as follows:

$$N = \text{Number of memory-states} = \begin{cases} p \cdot M^{2L}, \text{where } m \text{ is even} \\ 2 \cdot p \cdot M^{2L}, \text{where } m \text{ is odd} \end{cases}$$

M is the symbol alphabet size, and 2L+1 is the shift register length, the process $\rho$ is Markov, with transitions at the symbol times and obeys the following equations:

$$\rho_n = A_n \cdot \rho_{n-1} + v_n, \; n = k\lambda + r$$

again, k represents the k'th information symbol/bit, is the number of samples per symbol, and $r = \{0, 1, 2, \ldots, \lambda-1\}$ is the position of the sample within the kth bit. $A_n = I$, and $v_n = 0$, when $n \neq K\lambda$ (the sample is not at a symbol transition). The elements of the matrix $A_n$ for binary symbols, are as follows:

$$a_{2,1} = a_{N,1} = a_{1,N} = a_{N-1,N} = 0.5$$

$$a_{i-1,i} = a_{i+1,i} = 0.5, \text{ where } i = 2, \ldots, N-1$$

all other $a_{ij} = 0.0$

B.4 State Dynamics for CPM Systems

From the shift-register-process, and the memory-process, a general representation of CPM systems is constructed. Define a matrix N, which contains the M-ary bi-polar expansion of the shift register contents $\{I_L, I_{L+1}, \ldots, I_0, \ldots, I_L\}$. The matrix N, will have $M^{2L+1}$ rows and 2L+1 columns, using the above-defined mapping. Define the vector process $u_t$, as follows:

$$u_t = N \cdot (p(t-LT), p(t-(L+1)T, \ldots, p(t), \ldots, p(t+LT))$$

The vector process $u_t$ represents the phase response to new information, with the ISI present due to time spread of the information pulse. In particular, $u_t$ represents the modulation eye-pattern-process, since it contains all linear combinations of the shift register 102's phase response function. Using these definitions, the Markov model for CPM is:

$$\theta(t) = C^T \cdot \rho_k + 2 \pi h \cdot u_{t-kT}^T \cdot \phi_k, \; t \in [kT, (k+1)T]$$

Where $C^T$ is defined as:

$$C^T = \left[ 0, \frac{2\pi}{N}, \ldots 2\pi - \frac{2\pi}{N} \right],$$

where N = total number of memory-states

This representation will cover any CPM system with constant h. For multi-h systems, we can enlarge the symbol space and proceed as described.

In order to proceed, the entire state space of the CPM system is cast, (i.e., both the shift-register-process, and the memory-state-process) into a single state space. The comprehensive state space model is formed as kronecker product as described by J. Brewer in Kronecker Products and *Matrix Calculus In Systems Theory*, CAS-25 IEEE Trans. on Circuits and Systems 722–81 (1978) of the $\rho$ and the $\phi$ states as follows:

$$\zeta = \rho \otimes \phi = \begin{pmatrix} \rho_1 \phi_1, \rho_1 \phi_2, \ldots, \rho_1 \phi_{M^{2L+1}}, \rho_2 \phi_1, \rho_2 \phi_2, \ldots, \\ \rho_2 \phi_{M^{2L+1}}, \ldots, \rho_4 \phi_1, \rho_4 \phi_2, \ldots, \rho_N \phi_{M^{2L+1}} \end{pmatrix}$$

Figure 11:
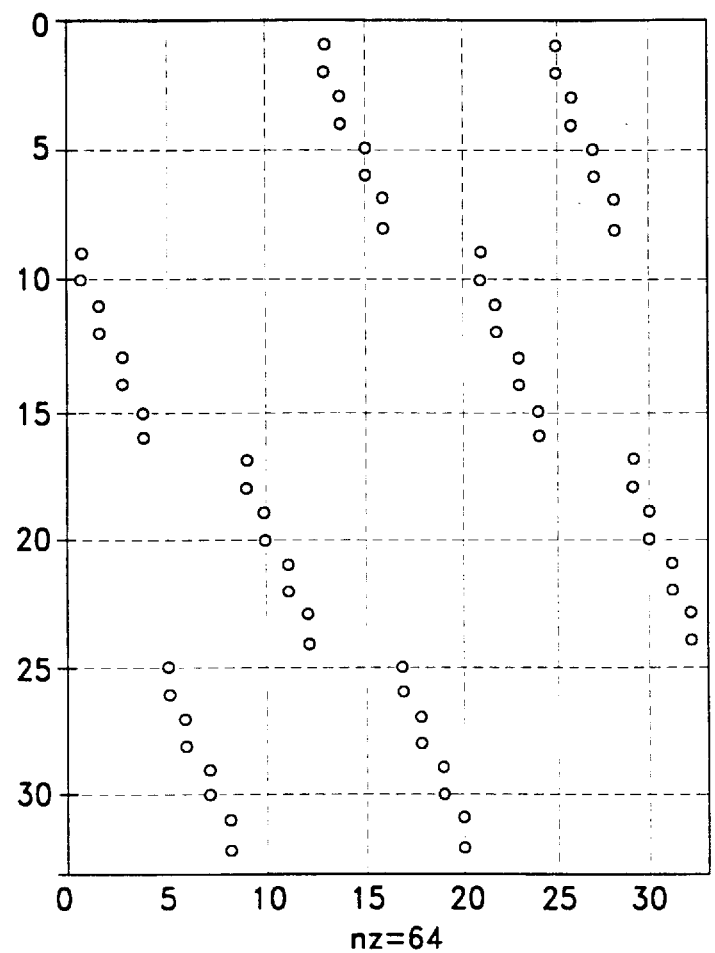
FIG. 11 is a graph illustrating the transition matrix $f(A,Q)$ for the composite process utilized in applying Partial Response CPM in accordance with one embodiment of the present invention.

The process $\zeta$ represents the state of the shift register 102, considering each possible memory state shown in FIG. 10. FIG. 11 is a graph illustrating the transition matrix $f(A,Q)$ for the composite process utilized in applying Partial Response CPM in accordance with one embodiment of the present invention. The process is defined as follows:

$$\zeta_n = e_i, \text{ when } n = k\lambda + r$$

k represents the k'th information bit, $\lambda$ reflects the number of samples per symbol, and $r = \{0, 1, 2 \ldots -1)\}$. Then $\zeta_n$ is a $\Re^{N \cdot M^{(2L+1)}}$ unit vector taking on value $e_i$, indicating both shift-register-state and memory-state, and the process $\zeta_n$ is described by the following equation:

$$\zeta_n = f(Q, \phi_{n-1}) \cdot \zeta_{n-1} + z_n$$

where $f(Q\phi_{n-1}) = I$, and $w_n = 0$, when $n \neq k\lambda$ (i.e. no-symbol-transition. The function $f(Q\phi_n)$ for binary symbol alphabet (i.e. m=2) may be shown as follows:

$$f(Q,\phi_{n-1}) = \begin{bmatrix} 0 & Q \cdot I_m & 0 & . & Q \cdot I_p \\ Q \cdot I_p & 0 & Q \cdot I_m & . & 0 \\ 0 & Q \cdot I_p & 0 & . & 0 \\ . & 0 & Q \cdot I_p & . & . \\ 0 & . & 0 & . & Q \cdot I_m \\ Q \cdot I_m & 0 & 0 & . & 0 \end{bmatrix},$$

$$f(Q,\phi_{n-1}) \in \mathfrak{R}^{N \cdot M^{2L+1}, N M^{2L+1}}, L \neq 0$$

$$f(Q,\phi_{n-1}) = \begin{bmatrix} 0 & I_m \cdot Q & 0 & . & I_p \cdot Q \\ I_p \cdot Q & 0 & I_m \cdot Q & . & 0 \\ 0 & I_p \cdot Q & 0 & . & 0 \\ . & 0 & I_p \cdot Q & . & . \\ 0 & . & 0 & . & I_m \cdot Q \\ I_m \cdot Q & 0 & 0 & . & 0 \end{bmatrix}, L = 0,$$

where $I_p$ and $I_m$ are defined as follows:

$$I_p = \begin{bmatrix} 1 & 0 & . & 0 & 0 & 0 \\ . & & & & & \\ 0 & 0 & 0 & . & . & . \\ . & 0 & 1 & 0 & . & . \\ . & . & 0 & 0 & 0 & . \\ . & . & . & 0 & 1 & . \\ 0 & 0 & 0 & 0 & 0 & . \end{bmatrix}, I_p \in \mathfrak{R}^{M^{2L+1}, M^{2L+1}}$$

$$I_m = \begin{bmatrix} 0 & 0 & . & 0 & 0 & 0 \\ 0 & 1 & 0 & . & . & . \\ . & 0 & 0 & 0 & . & . \\ . & . & 0 & 1 & 0 & . \\ . & . & . & 0 & 0 & 0 \\ 0 & 0 & 0 & 0 & 0 & . \end{bmatrix}, I_m \in \mathfrak{R}^{M^{2L+1}, M^{2L+1}}$$

The matrix describes the transitions of the entire "state-process" depicted in FIG. 10. It includes both the shift-register-process, and memory-state-process, and correctly reflects that memory-state-process is derived by the shift-register-process.

While the description of the CPM process described above is given at the symbol transitions as between transitions, there is no state change. The state space could be enlarge further by representing $\lambda$-states for each $\zeta$-state. The following is defined:

$$I_{m1} = \begin{bmatrix} 0 & 0 & \ldots & 1 \\ 0 & 0 & \ldots & 0 \\ . & . & & . \\ . & . & 0 & . \\ . & . & & . \\ 0 & 0 & . & 0 \end{bmatrix}, I_{m1} \in \mathfrak{R}^{\lambda,\lambda},$$

$$I_{m2} = \begin{bmatrix} 0 & \ldots & 0 \\ I_{\lambda-1,\lambda-1} & & 0 \end{bmatrix}, I_{m2} \in \mathfrak{R}^{\lambda,\lambda}$$

Where $\lambda$ is the number of samples per-symbol. Thus, the state space of the CPM system can be further enlarged. The state vector then contains the following:

$$x_k = \begin{pmatrix} \zeta_1(0), \zeta_1(1), \ldots, \zeta_1(\lambda-1), \ldots, \\ \zeta_{\lambda \cdot M^{2L+1}}(1), \ldots, \zeta_{\lambda \cdot M^{2L+1}}(\lambda-1) \end{pmatrix}$$

Each element of the state vector x now indicates not only the state but also the sample. Multiple-samples-per-symbol can now be processed. The enlarged state process x obeys the following equation:

$$x_k = QA_f x_{k-1} + z_k$$

Again, $z_k$ is the martingale difference sequence, and $QA_f$ is defined as follows:

$$QA_f = f(Q_n, \phi_{n-1}) \oplus I_{m1} + [I_{N \cdot M}^{2L+1} \phi I_{m2}]$$

In the examples which follow, multiple sampling allows the receiver to achieve self-synchronization and maintain low bit error rate. To extract the original shift-register-process-states, and the memory-process states, the following is evaluated:

$\phi_k = KW \cdot (KWS \cdot x_k)$ $\rho_k = KS \cdot (KWS \cdot x_k)$ where KW, KWS, and KS are defined as follows:

$KWS = I_{\lambda \cdot M}^{2L+1} \oplus 1'\lambda$ $KS = I_\lambda \oplus 1'_{80} \cdot 2^{2L+1}$ $KW = I'_\lambda \oplus 1'_M{}^{2L+1}$ and $1_n$ is an n-vector with every element equal to one, as follows:

$1_n = [1 \ldots 1]'$

B.5 The HMM for CPM Measures in the Additive White Gaussian Noise (AWGN)

The information presented to the receiver in a system employing CPM is embedded in the phase of the received signal. After removal of the carrier frequency, the receiver in the AWGN is presented the following passband signals:

$$y_i = \begin{bmatrix} A \cdot \cos(\theta_t) + n_{x_t} \\ A \cdot \sin(\theta_t) + n_{y_t} \end{bmatrix}$$

$n_{xt}$ and $n_{yt}$ are zero mean, un-correlated random processes. In these signals, the phase is not directly measurable, rather the phase process outlined in the previous section is embedded or hidden in the measurements corrupted by additive gaussian noise, thus the HMM formalism. The above signals are sampled $\lambda$ times per symbol to create the following sampled signals:

$$y_k = \begin{bmatrix} A \cdot \cos(\theta_k) + n_{x_k} \\ A \cdot \sin(\theta_k) + n_{y_k} \end{bmatrix} = \begin{bmatrix} Im_k \\ Qm_k \end{bmatrix}$$

From phase state process $x_k$, outlined in Section B.3, the above could be written as follows:

$$\begin{bmatrix} Im_k \\ Qm_k \end{bmatrix} = \begin{bmatrix} A \cdot \cos(\Psi^T \cdot x_k) + n_{x_k} \\ A \cdot \sin(\Psi^T \cdot x_k) + n_{y_k} \end{bmatrix}$$

where $\Psi^T$ is a vector of phases representing the phase values indicated by the state process $x_k$. The measurement process can be further reduced by noting that the phase state indicator vector can operate on a vector of constants as follows:

$$\begin{bmatrix} Im_k \\ Qm_k \end{bmatrix} = \begin{bmatrix} A \cdot (g_1^T \cdot x_k) + n_{x_k} \\ A \cdot (g_2^T \cdot x_k) + n_{y_k} \end{bmatrix}$$

The above is an HMM description of the measurement process for CPM which utilizes the previously defined state dynamics process state vector. The process for computing $\Psi$, $g_1$ and $g_2$ from the CPM phase response function will now be described.

B.5.1 Measurement and Phase Vectors for CPM HMM Measurement Models

From the CPM phase response function p(t), the following is computed:

$p = [p(t_0) \cdot p(t_1), \ldots p(t_{(L+2)\lambda-1})]$ $t_j = -\dfrac{T}{2} \cdot (2L+1) + j - \dfrac{T}{\lambda}$, where $j = 0, \ldots (L+2) \cdot \lambda - 1$ p(t)=phase response function ("symmetric")

$\lambda$=number of samples per symbol

T=symbol-time

L=CPM ISI-parameter (ISI=2·L+1), where, L=1, 2, ...

Next, a matrix is constructed which is called the phase response matrix, denoted as G from the elements of p as follows:

$$G = \begin{bmatrix} p(t_0) & p(t_1) & \ldots & p(t_{\lambda-1}) \\ p(t_\lambda) & p(t_{\lambda+1}) & \ldots & p(t_{2\lambda-1}) \\ \ldots & \ldots & \ldots & \ldots \\ p(t_{(L-1)\lambda}) & p(t_{(L+1)-\lambda+1}) & \ldots & p(t_{L+2)\lambda-1}) \end{bmatrix},$$

where $G \in \Re^{2L+1,\lambda}$

From shift register expansion matrix N given in Section B.3, the CPM-ISI matrix U is computed as follows:

$$U = N \cdot G = \begin{bmatrix} u_1 \\ \cdot \\ \cdot \\ \cdot \\ u_{M2L-1} \end{bmatrix}, U \in \Re^{2^{2L+1},\lambda}$$

From the above, the phase vector $\Psi$ can be formed which is related to the state indicator process as follows:

$$\Psi = \begin{bmatrix} v \\ v + \Delta\theta \\ \cdot \\ \cdot \\ v + (N-1) \cdot \Delta\theta \end{bmatrix}$$

Where $\Delta\theta = \pi/2$, N=the number of memory-states, and v is defined as follows:

$$v = \begin{bmatrix} u_1^T \\ \cdot \\ \cdot \\ \cdot \\ u_2^T 2L - 1 \end{bmatrix}$$

From these definitions, measurement vectors $g_1$ and $g_2$ are defined for L=1 and N=4 as follows:

$g_1 = \cos[\psi]$, $g_2 = \sin[\psi]$, $g_1 \& g_2 \in \Re^{\lambda NM2L+1}$

The CPM measurements are now in the form needed to apply the process outlined in Section A.

B.6 Synchronization Derived from the State Estimates

Figure 12:
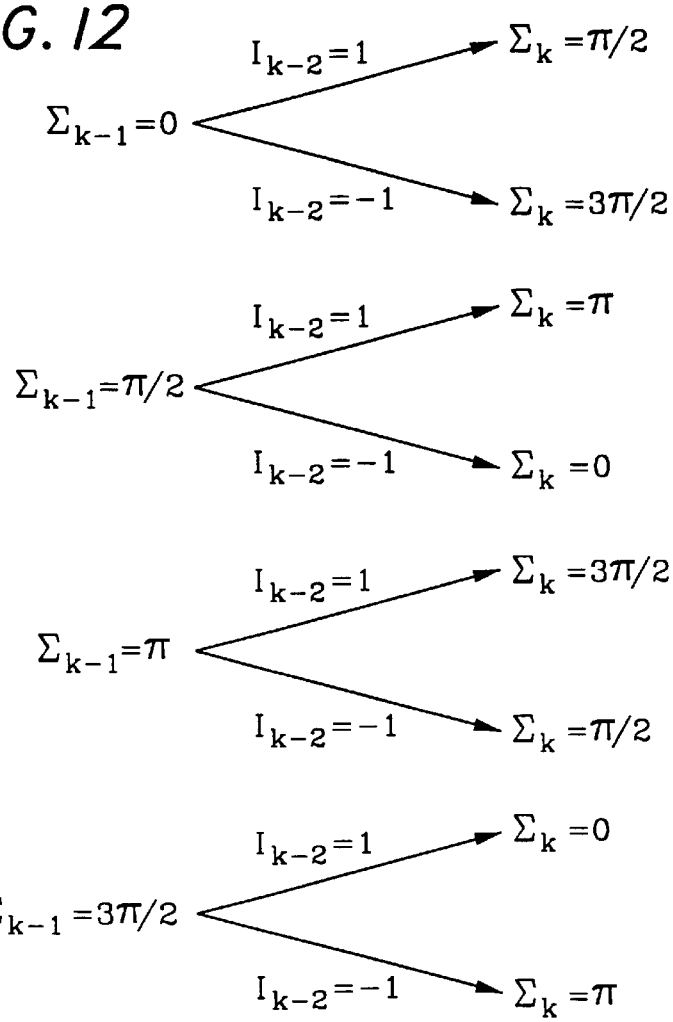
FIG. 12 is a chart illustrating the Decision Rule for the Partial Response CPM used in accordance with one embodiment of the method of the present invention.

Given the state estimates from the recursive estimation process developed in earlier, bit-timing may be computed, which is necessary in order to make good bit-decisions. Bit timing is extracted by computing and integrating over several symbol times, the sample-timing probabilities. For the example given, 4-samples per symbol is assumed. Thus the probabilities of the four possible sample points are computed, and these estimates are integrated over several symbols. Then the integrated-estimate which indicates the last sample of the CPM within the symbol is chosen, and this determines the bit-boundary. Using this information, bit decisions may be made. FIG. 12 is a chart illustrating the Decision Rule for the Partial Response CPM used in accordance with one embodiment of the method of the present invention.

B.7 Bit Decisions

The decision rule used for the results which follow exploits the inherent memory in the CPM waveform by examining transitions of the process $\{\rho_n\}$ which is an indicator of the memory state of the CPM signal. When the sum state has a value of 0, $\rho_n = e_1$ is defined. When the sum has a value of $\pi/2$, $\rho_n = e_2$; when the sum has a value of $\pi$, $\rho_n = e_3$ is defined; and when the sum has a value of $3\pi$, $\rho_n = e_4$ is defined. The process $\{\rho_n\}$ has transitions at the symbol time which are indicative of the information departing the channel and entering into the memory of the receiver. A decision rule which exploits the state transitions of the $\{\rho_n\}$ process is depicted in the FIG. 12.

B.8 GMSK CPM and the HMM for GMSK in the Additive White Gaussian Noise (AWGN)

Figure 13:
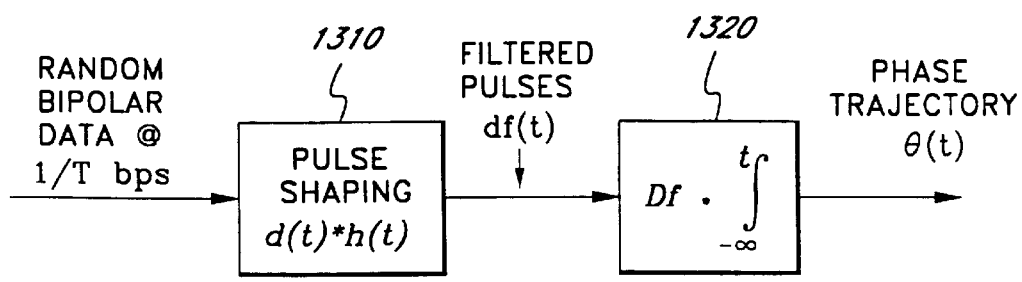
FIG. 13 is a block diagram illustrating a typical GMSK transmitter 1300 which operates at baseband.

GMSK is a popular CPM scheme used in wireless mobile communication systems. GMSK significantly reduces the radio frequency (RF) spectrum required for high speed digital data links as discussed by K. Murota and K. Hirade, GMSK *Modulation for Digital Mobile Radio Telephony*, Com-29 IEEE Trans. Commun. 1044–50 no.7 (July 1981), and reduces out band power by reducing spectral spill into adjacent channels. A GMSK transmitter 1300 is depicted in FIG. 13.

The transmitter 1300 operates on a binary symbol sequence $\{b_k\}$, where each $b_k$ takes on the values $\{0,1\}$ with equally-likely probability. The transmitter 1300 then maps the information bits to a bi-polar sequence, and provides symbols to the shaping filter at a rate of 1/T symbols per second. The binary sequence $\{b_k\}$ chosen from $\{0,1\}$, is replaced with the bipolar process d(t), represented as follows:

$$d(t) = \sum_k (2b_k - 1) \cdot u(t - kT)$$

where u(t) is defined as:

$$u(t) = \left\{ \begin{array}{l} 1, 0 \leq t \leq T \\ 0, \text{otherwise} \end{array} \right\}$$

The gaussian filter 1310 which is used for pulse shaping has the following impulse response:

$$h(t) = \frac{\alpha}{\pi^{1/2}} \cdot \exp(-\alpha \cdot t^2)$$

The constant $\alpha$, is defined as:

$$\alpha = \pi / \sqrt{2 \cdot \ln(2)} \cdot \beta \cdot T$$

and $\beta$ is bandwidth parameter which relates the 3 dB point of the gaussian filter 1310 to the bit rate 1/T of the transmitter 1300. The response of the gaussian filter 1310 to the single information pulse u(t) (i.e., h(t)*u(t)) is the following:

$$u_f(t) = Q(\alpha \cdot 2^{1/2} \cdot (t+T/2)) - Q(\alpha \cdot 2^{1/2} \cdot (t-T2))$$

Where Q is the tail probability for unit normal gaussian random variable, defined as follows:

$$Q(x) = \frac{1}{(2\pi)^{1/2}} \cdot \int_x^\infty \exp(-y^2/2) dy$$

Figure 14:
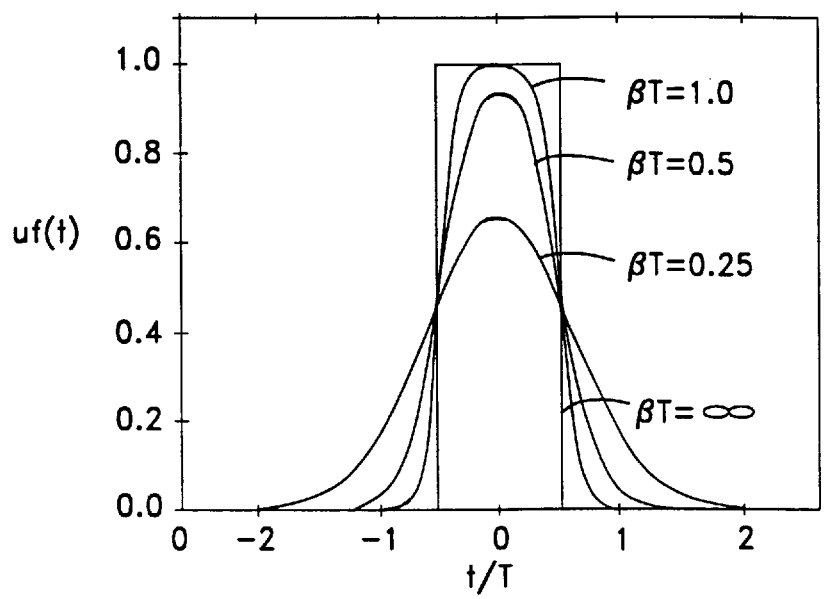
FIG. 14 is a graph illustrating pulse shapes provided by the pulse shaping circuit 1310 of FIG. 13 using GMSK.

The effect of the parameter $\beta$ is shown in the FIG. 14, which depicts the pulse gaussian filter response to a pulse with $\beta T = 0.25, 0.5, 1.0$, and infinity.

The filtered information waveform $d_f(t) = d(t) \cdot h(t)$, is a superposition of the individual pulse responses to the gaussian filter, and is denoted as follows:

$$d_f(t) = \sum_k (1 - 2b_k) \cdot u_f(t - kT)$$

Figure 15:
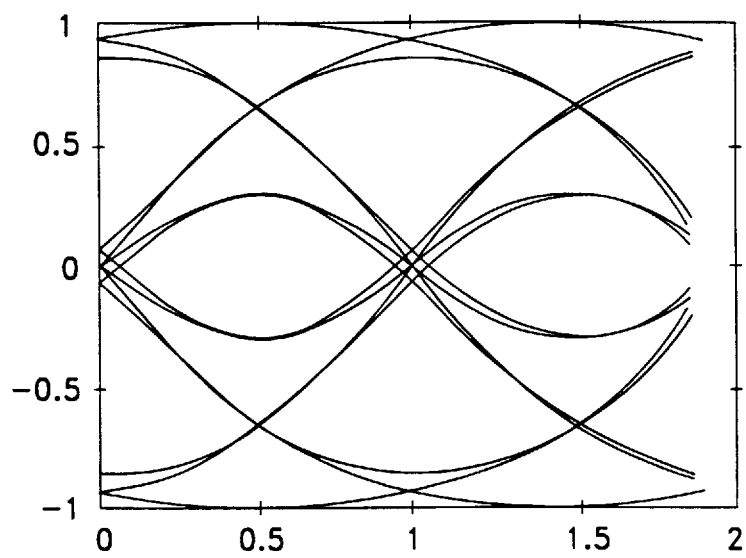
FIG. 15 is a graph illustrating an "Eye Pattern" obtained through the superposition of filtered information pulses, where $T\beta=0.25$.

While the GMSK transmits filter reduces out-of band power, it produces a spread in the time domain of one information from one bit onto another creating transmitter induced ISI. For small $\beta T$, when channel bandwidth is reduced and this information spread can become significant. In the FIG. 15, the "eye-pattern" for $T\beta = 0.25$ is depicted. The eye pattern shows the effect of the superposition of filtered information pulses. The eye pattern illustrates the adding and subtracting of distant pulses to the current information pulse.

The filtered information-bearing waveform is then input to an integrator 1320 which produces phases. The phase response to a single information bit u(t) is of interest, and is given by the following equation:

$$p(t) = D_f \cdot \int_{-\infty}^{t} \left[ \int_0^T h(\tau - s) ds \right] d\tau$$

where h(t) is the gaussian filter impulse response and where $D_f$ is the peak frequency deviation of the modulated signal. The phase trajectory created is modulated under the following condition:

$$Re\{e^{j\Theta(t)} \cdot A e^{j\omega_c t}\} = A \cdot \cos(\omega_c t + \Theta(t))$$

A closed form expression can be found in terms of Q-functions, first define the following functions:

$$\begin{array}{rl} p1(t) = & 1/\sqrt{2\pi} \cdot \exp(\alpha\beta T \cdot (0.5 + t/T)^2/2) + \\ & \alpha\beta T \cdot (0.5 + t/T) \cdot Q(-\alpha\beta T \cdot (0.5 + t/T)) \\ p2(t) = & 1/\sqrt{2\pi} \cdot \exp(-\alpha\beta T \cdot (0.5 - t/T)^2/2) + \\ & \alpha\beta T \cdot (0.5 - t/T) \cdot Q(\alpha\beta T \cdot (0.5 - t/T)) \end{array}$$

Then the phase response function is the following:

$$p(t) = \frac{\pi}{\alpha\beta \cdot 2T} [p1(t) - p2(t)]$$

Figure 16:
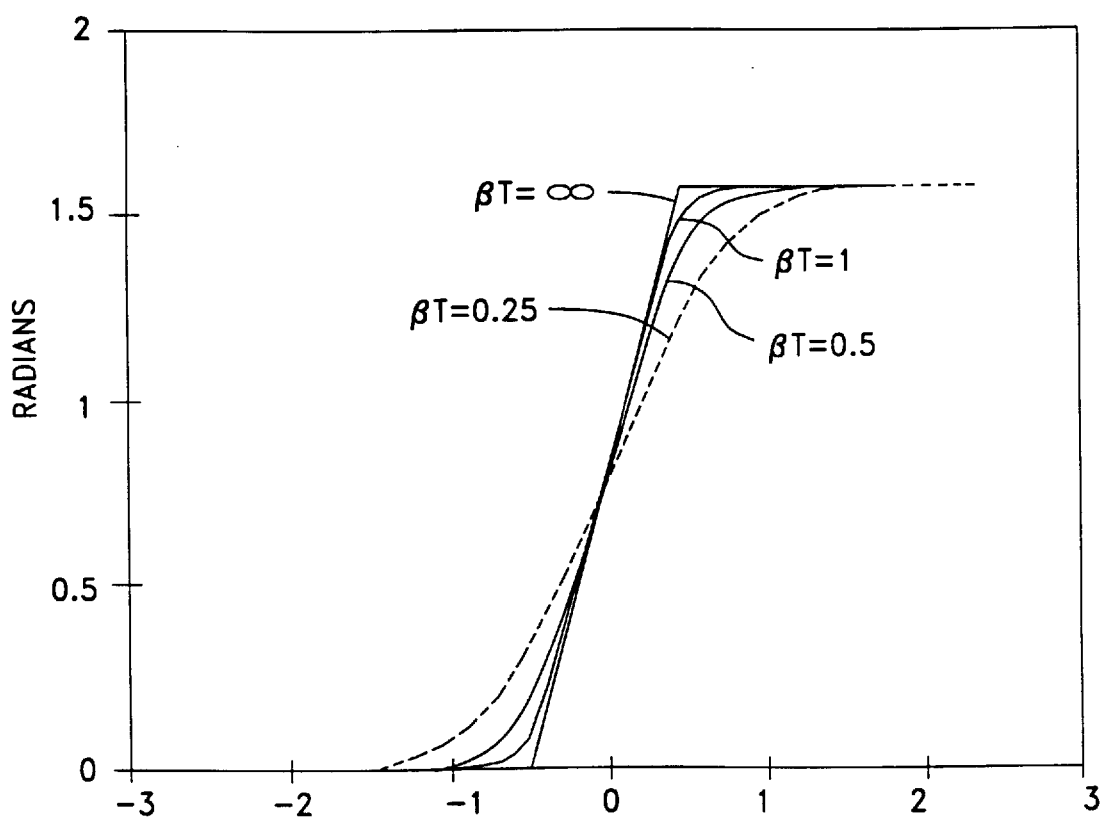
FIG. 16 is a graph illustrating the phase response of the Integrated 1320 of FIG. 13 using GMSK.

The phase response for GMSK and time bandwidth product ($\beta T$) less than infinity, produces partial response CPM. The phase response for time-bandwidth products of 0.25, 0.5, 1.0 and infinity, are shown in FIG. 16.

The phase response for GMSK having the above characteristics provide information from a transmitter to a receiver, and the phase response at any time can be written in terms of the defined functions. FIG. 16 illustrates the fact that the phase response is not confined to a single symbol time. The support of the phase response is not confined to the temporal bin from which the information originates, but lies the contiguous neighboring information bins, producing ISI at the receiver. This is the effect of the gaussian transmit filter, while reducing occupied spectrum the filter produces both pre and post transient effects in the phase of the signal at any new time. A GMSK receiver with βT=0.5, has a phase response which over three information bits. A GMSK receiver with βT=0.25, the effect of the transmit filter lies over 5 information bits. The HMM for GMSK is found by substituting the above defined phase response function p(t) into the equations describing the HMM for partial response CPM developed in the previous sections.

B.9 HMM for GMSK Measurement Model & MAP Signal Estimation Update

Assuming that the carrier has been removed from the received signal, and that the received signal is measured in quadrate. The following process, $$\begin{bmatrix} Im_k \\ Qm_k \end{bmatrix} = \begin{bmatrix} A \cdot (g_1^T \cdot x_k) + n_{x_k} \\ A \cdot (g_2^T \cdot x_k) + n_{y_k} \end{bmatrix}$$

and $n_{x_k}$ and $n_{y_k}$ are zero mean gaussian wideband additive noise processes with equal variance, may be converted to one digital sample per symbol. Since we are trying to estimate the signal phase, in the presence of channel noise, we employ the HMM developed in the previous sections. From the previous development for the HMM for CPM, the state vector $X_k$ can be defined as the indicator of the following phase vector:

$$\Psi = \begin{bmatrix} v \\ v + \pi/2 \\ v + \pi \\ v + 3\pi/2 \end{bmatrix}$$

where v is defined as follows:

$$v = \begin{bmatrix} u^T \\ \cdot \\ \cdot \\ \cdot \\ \cdot \\ u_{2L-1}^T \end{bmatrix}$$

From these definitions, measurement vectors $g_1$ and $g_2$ are defined for L=1 and N=4 as follows:

$$g_1 = \cos[\psi], g_2 = \sin[\psi]$$
$$g_1 \& g_2 \in \Re^{(\lambda NM^{2L+1})}$$

where M is the symbol size. In the present case, M=2.

The above equation is in the form necessary to the recursive estimation algorithm developed in section A, and along with the phase response function, is the HMM for GMSK. Note that the development was for a single scalar movement. We have vector of two measurements for each of the quadrate components. Note that the update for the HMM for GMSK can be derived for two measurements in a similar fashion to that for one. The update for the phase indication state may be expressed as follows:

$$q_k^r = \sum_{j=1}^{N} q_{k-1}^j a_{ij} \cdot L_k^r$$

where $q_k^r$ is the un-normalized phase indicator estimate, and a simplified $q_k^r$ is defined as follows:

$$L_k = EXP(g_1(k) \cdot Im_k + g_2(k) \cdot Qm_k)$$

where f is the density function for a unit normal random variable. The values $a_{ij}$, in the un-normalized phase indicator estimate come from the kronecker product introduced in the Markov model section, and are elements of the matrix $QA_f$. Performance of the multi-sample receiver is given in the following section.

B.10 Operation

Figure 17:
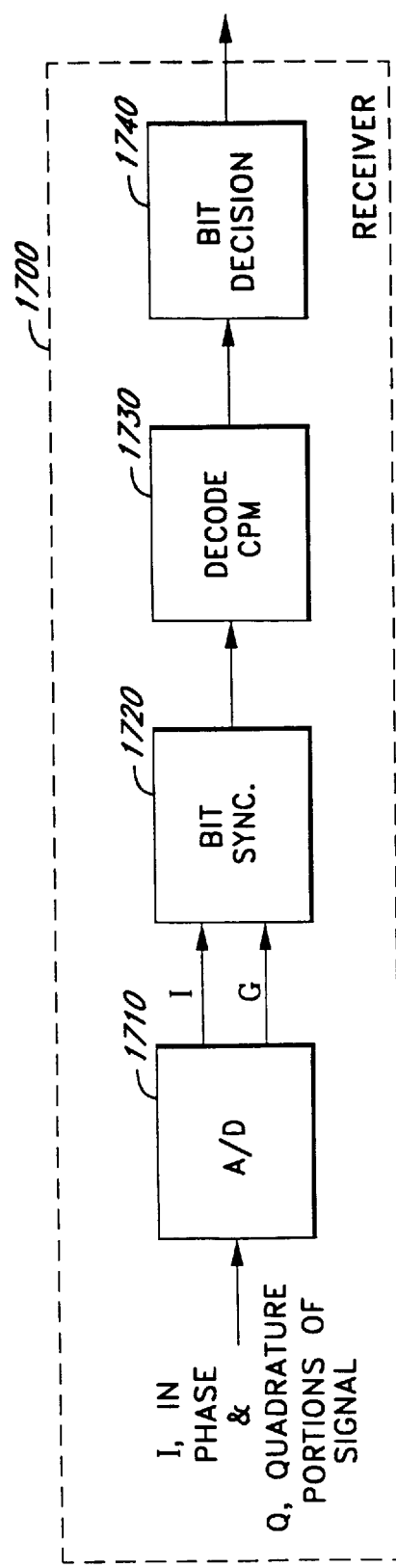
FIG. 17 is a block diagram illustrating a receiver which utilizes the Partial Response CPM technique for GMSK demodulation in accordance with one embodiment of the present invention.

FIG. 17 is a block diagram of the receiver of the present invention. The receiver 1700 includes a analog-to-digital converter (ADC) 1710, a bit synchronization block 1720, a decode CPM block 1730 and a bit decision block 1740. Signals transmitted via transmission medium 20 (see FIG. 1) are received by the receiver 1700. The received signals include an inphase portion and a quadrate portion, and are first provided to the ADC 1720, where they are converted from analog to digital signals. The digitized signals are then provided to the bit synchronization block 1720, where they are bit synchronized. The bit-synchronized signals are then decoded by the decode CPM block 1730. The decoded signals are then provided to bit decision block 1740, where bit decision is determined, as will be discussed in detail in the following sections. The resulting signals are a close estimate of the transmitted signal.

Figure 18:
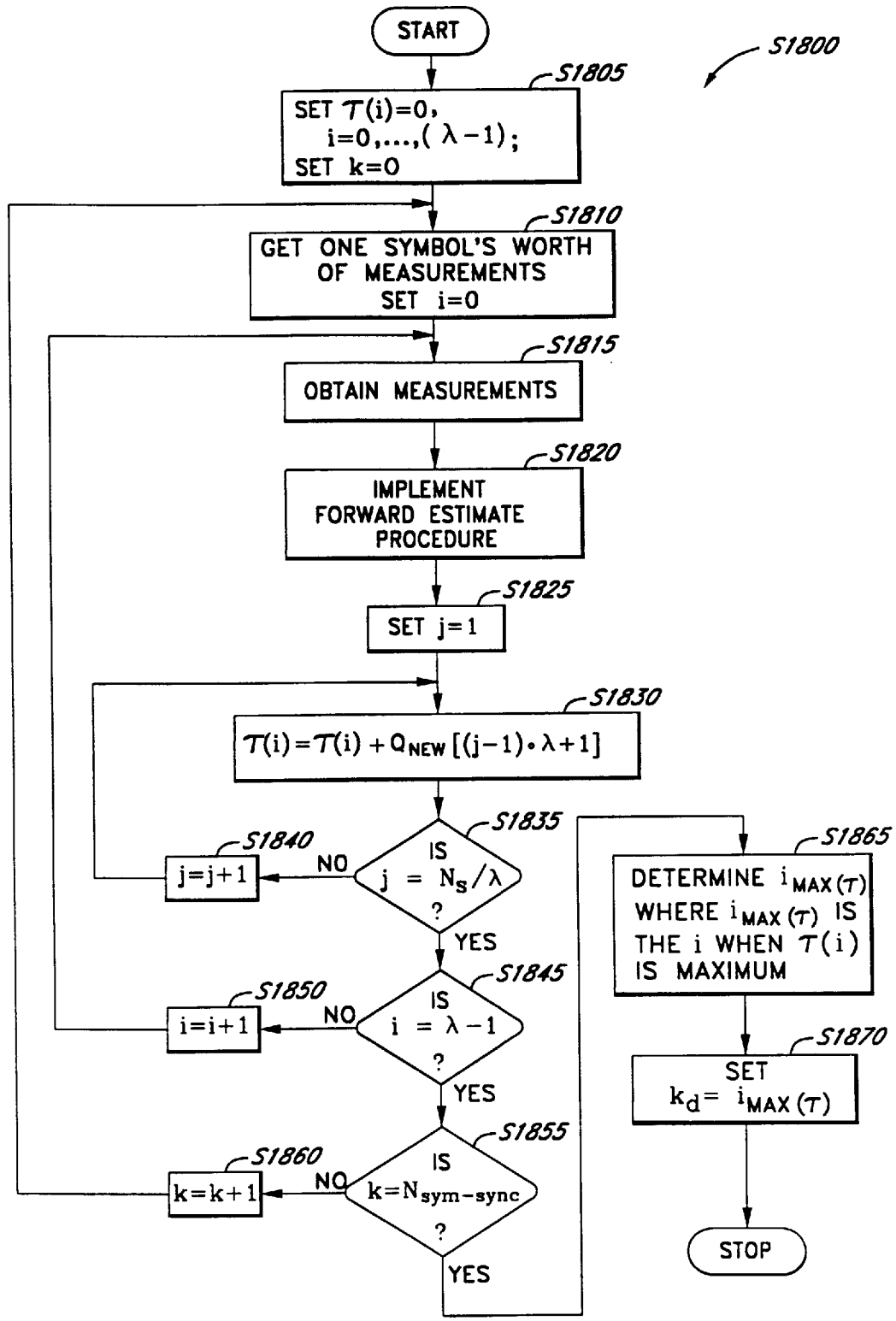
FIG. 18 is a flow chart of the bit synchronization process implemented by bit synchronization block 1720 in FIG. 17.

FIG. 18 is a flow chart of the process S1800 implemented by bit synchronization block 1720. Beginning with a start state, the process S1720 proceeds to process block S1805, where the synchronization parameter $\tau_0, \tau_1, \ldots \tau_{n-1}$ are initialized to a value of 0. This is done by processing each synchronization parameter and to do so, counter k is set to zero for each synchronization parameter. The process S1800 then processes the parameters for a predetermined number of times, $N_{sym-sync}$. In one embodiment, $N_{sym-sync}$ is 20–30 bits. The process S1800 next advances to process step S1810, where one symbol's worth of data is obtained. This is first done by initializing a counter i to 0. The process S1800 then obtains the first measurement, as shown in process step S1815.

Next, the process S1800 implements the Forward Estimate procedure, as shown in process step S1820. Each synchronization parameter is then calculated. This is done by first setting a counter, j, to 1 as shown in step S1825. The synchronization parameter τ(i) for a particular symbol, i, is then calculated, as shown in process step S1830. The process step S1830 next queries if j is equal to $N_s/\lambda$, where $N_s$ is the total number of states and λ is the number of samples per symbol. If not, the process S1800 proceeds to process step S1840, where j is incremented by 1, and the process S1840 returns back to process step S1830. If j is equal to $N_s/\lambda$, the process S1800 proceeds to decision step S1840, where the process S1800 queries if i is equal to λ−1. If not, the process S1800 proceeds to process step S1850, where i is incremented by 1, and the process S1800 then proceeds back to process step S1815. If i equals to 1, the process S1800 proceeds to decision step S1855, where the process S1800 queries if k is equal to a $N_{sym-sync}$ predetermined number of bits. If not, the process S1800 proceeds to process step S1860, where k is incremented by 1 and the process S1800 then proceeds back to process step S1810. If k is equal to $N_{sym-sync}$, the process S1800 advances to process step S1865, where the process S1800 determines $i_{max}(\tau)$, the value of i when τ(i) is a maximum as shown in process step S1865. The process S1800 then sets kd to $i_{max}(\tau)$ as shown in process step S1870. The process S1800 then terminates.

Figure 19:
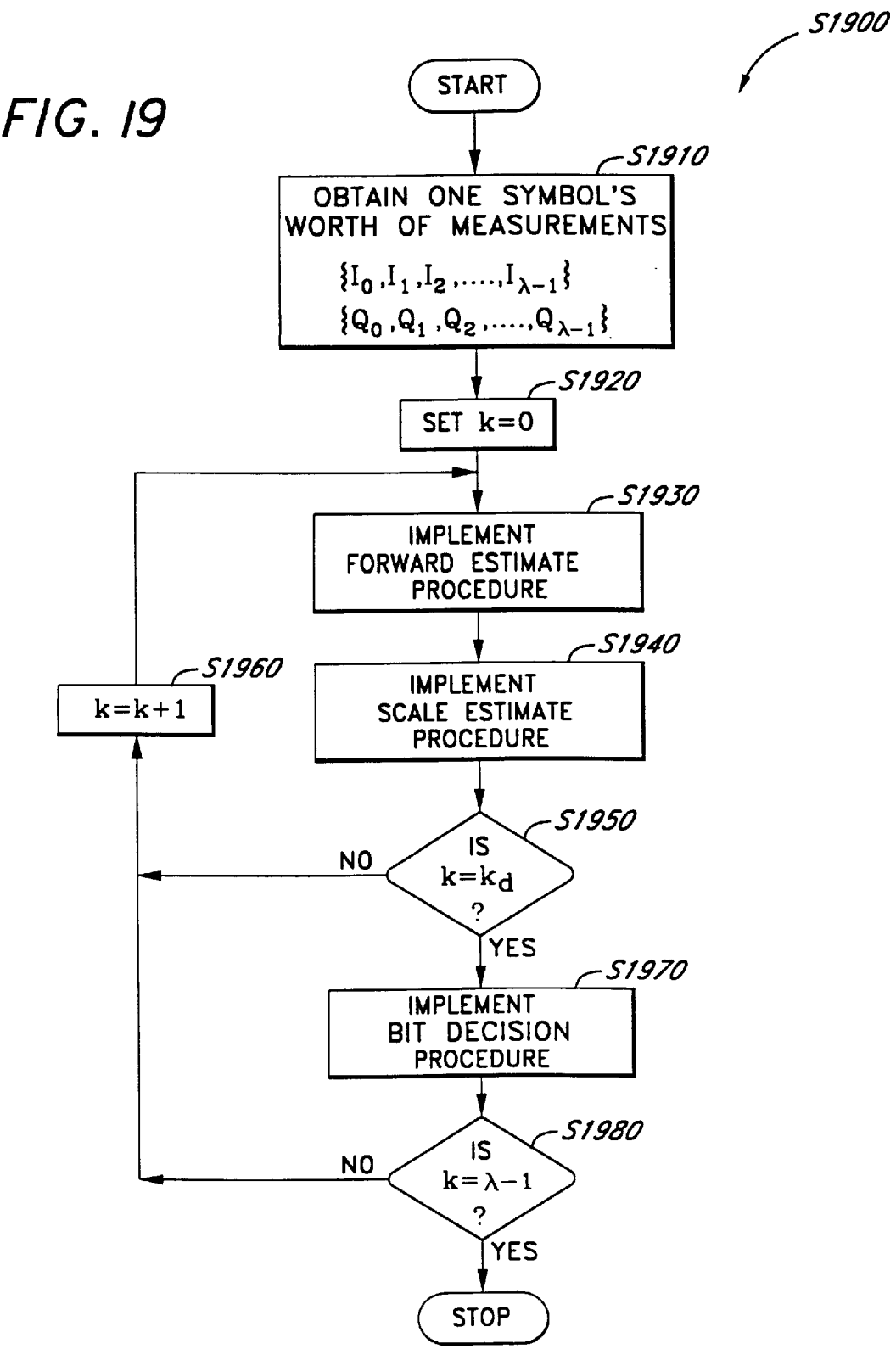
FIG. 19 is a flow chart of the Decoding CPM process implemented by the Decode CPM block 1730 in FIG. 17.

FIG. 19 is a flow chart of the process S1900 for decoding CPM implemented by the Decode CPM block 1730 in FIG. 17. The process S1900 begins from a start state and proceeds to process step S1910, where it obtains one symbol's worth of measurements. The value of k is then initialized to 0 in process step S1920 and the process S1900 proceeds to process step S1930, where the Forward Estimate procedure. The process S1900 next advances to process step S1940, where the Scale Estimate procedure is implemented. The process S1900 then proceeds to decision step S1950, where it queries if k is equal $k_d$ the value provided by the bit synchronization process S1960. If not, the process S1900 proceeds to process step S1960, where k is incremented by 1, and the process S1900 returns to process step S1930. If k is equal to $k_d$, the process S1900 proceeds to process block S1970, where the Bit Decision procedure is implemented, as will be discussed in the following sections. The process S1900 then proceeds to decision step S1980, where it queries if k=λ-1. If not, the process S1900 proceeds to process block S1960, where k is incremented by one, after which the process S1900 returns to process step S1930. If k is equal to λ-1, the process S1900 terminates.

Figure 20:
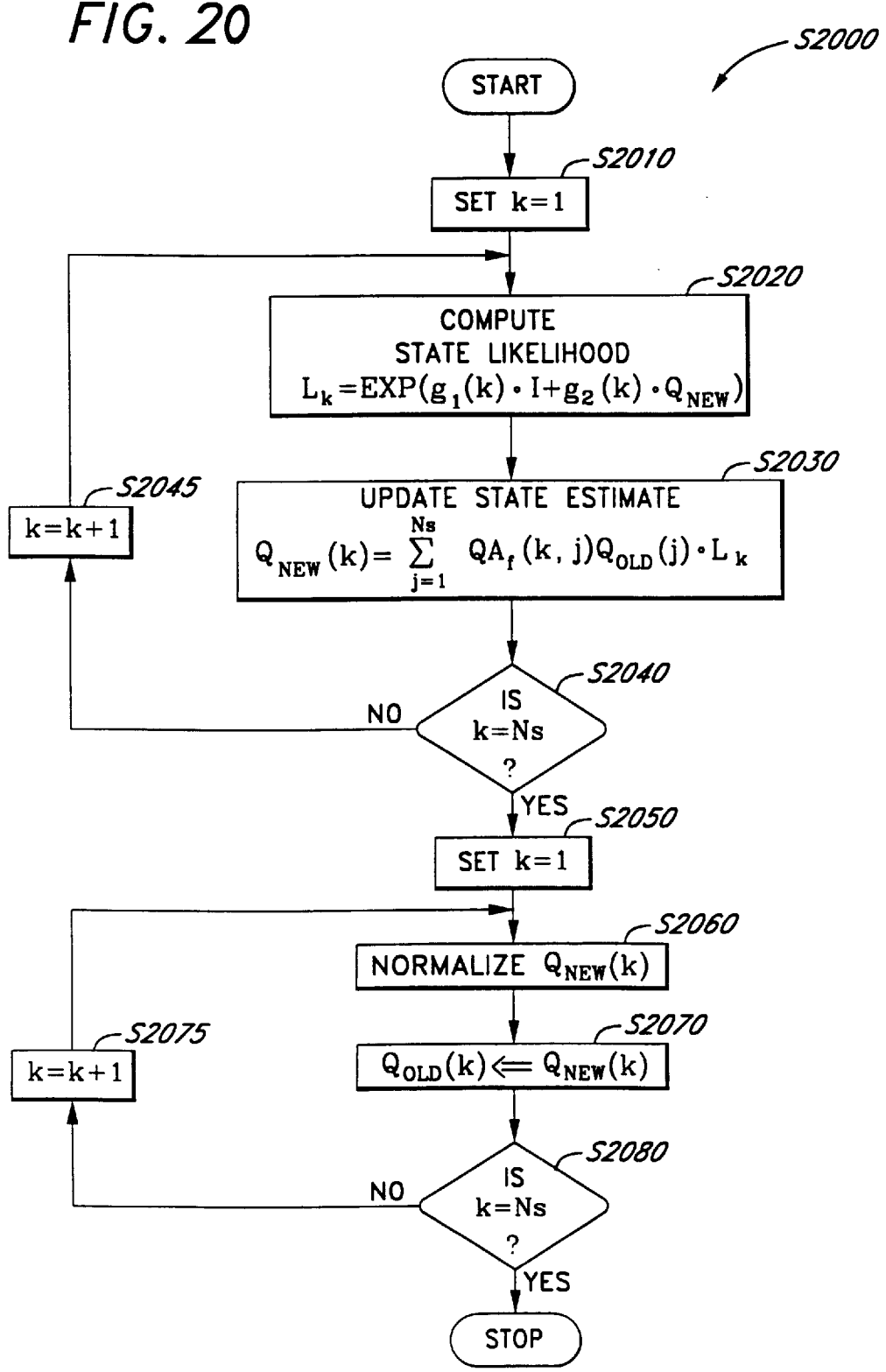
FIG. 20 is a flow chart of the Forward Estimate process implemented in step S1820 of FIG. 18 and step S1930 in FIG. 19.

FIG. 20 is a flow chart of the Forward Estimate process implemented in step S1800 of FIG. 18 and step S1930 of FIG. 19. The Forward Estimate process S2000 begins from a start state and proceeds to process step S2010, where the value of k, the current state, is set to one. The process S2000 then proceeds to process step S2020, where the state probability values $L_k$ are computed. The process S2000 then advances to process step S2030, where the state estimate values are updated.

The process S2000 then proceeds to decision block S2040, where it queries if k is equal to Ns, the total number of states. If not, the process S2000 proceeds back to process step S2020. If k is equal to Ns, the process S2000 proceeds to process step S2050, where the value of the old estimates are substituted with the values of the new estimates. The process S2000 then terminates.

Figure 21:
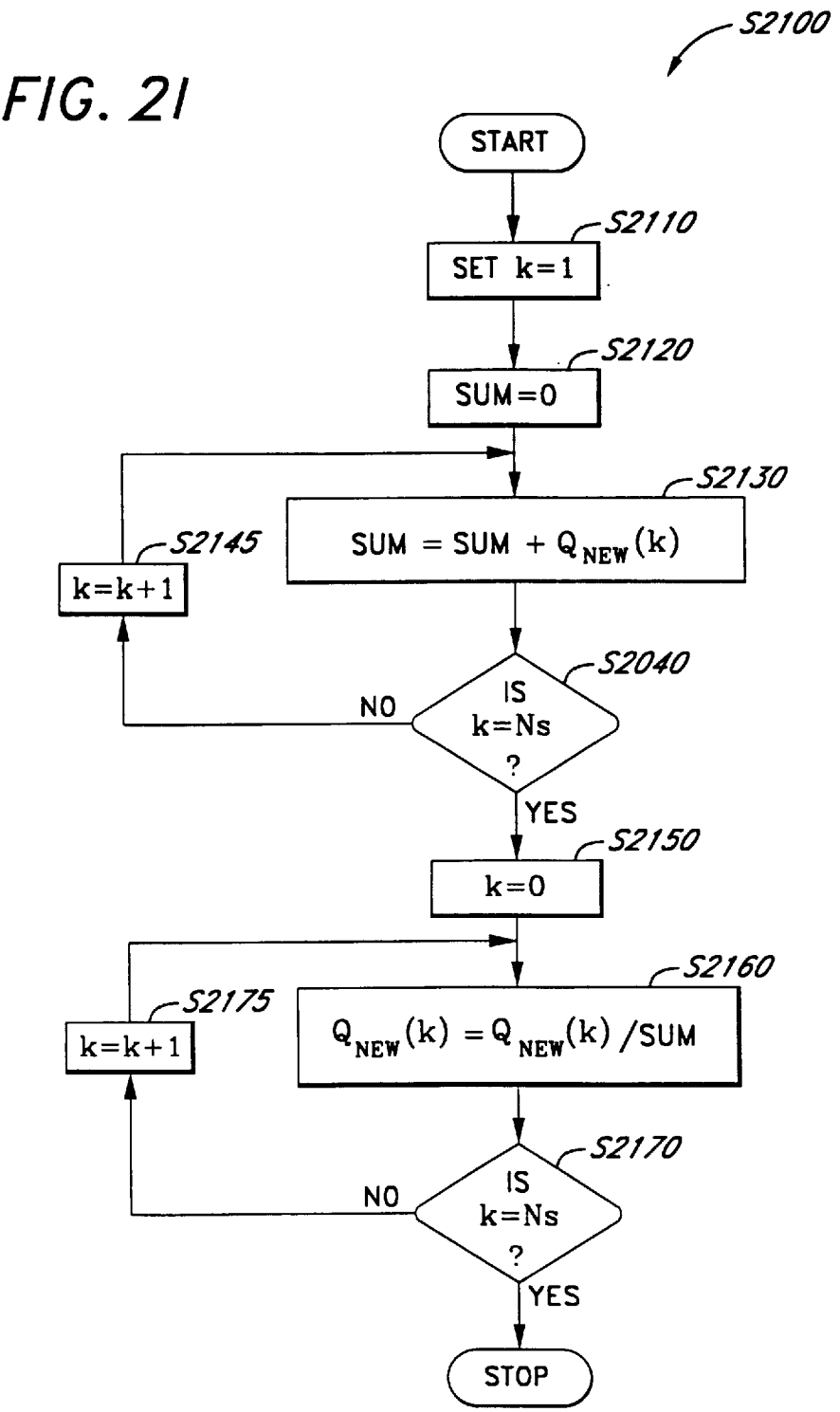
FIG. 21 is a flow chart of the Scale Estimate process implemented in step S1940 of FIG. 19.

FIG. 21 is a flow chart of the Scale Estimate process implemented in step S1940 of FIG. 19 and step S2030 of FIG. 20. The Scale Estimate process S2100 begins from a start state and proceeds to process step S2110, where the value of the current state, k, is initialized to 1. The process S2100 then advances to process step S2120, where the sum of the estimates, SUM, is initialized to 0. Next, the process S2100 proceeds to process step S2130, where the value of the new estimates are summed. The process S2100 next queries if k is equal to Ns, the total number of states. If not, the process S2100 proceeds to process step S2145, where k is incremented by one, and the process S2100 then returns to process step S2130. If the value of k is equal to Ns, the process S2100 proceeds to process step S2150, where the value of the current state, k, is initialized to 0. The process S2100 then proceeds to process step S2160, where the value of the estimates is divided by the sum of the estimates. The process S2100 then queries if k is equal to Ns. If not, the process proceeds to process step S2175, where the value of k is incremented by one. The process S2100 then returns to process step S2160. If the value of k is equal to Ns, the process S2100 terminates.

FIG. 22 is a flow chart of the Bit Decision process implemented by the Bit Decision block 108 in FIG. 17. The Bit Decision process S2200 begins from a start state and proceeds to process step S2210, where k is initialized to 1. The process S2200 then proceeds to process step S2215, where the sum of the estimates, SUM, is initialized to zero. The process then proceeds to process step S2230, where i is initialized to 1. The total of the estimates, SUM, is then provided by summing all the estimates from 1 to $\lambda 2^{2L+1}$. This is accomplished in process steps S2225–S2255. The process S2200 first sums the estimates (S2225) and then queries if i is equal to $\lambda 2^{2L+1}$. If not, the process S2200 advances to process step S2255, where i is incremented by 1. If i is equal to $\lambda 2^{2L+1}$, the process S2200 proceeds to process step S2240, where the parameters utilized for determining bit decision for each state is calculated. Here available $E_{rho-n(k)}$ is set λ the value g sum. The process S2200 then queries if k is equal to n, the number of memory states. If not, the process S2200 proceeds to process step S2250, where k is incremented by one.

The process S2200 then proceeds to process step S2215, to calculate values of each state. If k is equal to n, the process S2200 proceeds to process step S2260, where $E_{rho-n-1}$ is first initialized to 1 during the first time through the process S2200. The index INDX0 is defined to be $E_{rho-n-1}$+1, and the index INDX1 is defined to be $E_{rho-n-1}$-1. Control then passes to decision step S2265, where the process queries if INDX0 is equal to N. If so, the process advances to process step S2270, where INDX0 is set to 1. The process S2200 then proceeds to decision step S2275. If not, the process S2200 proceeds directly to decision step S2275, where it queries if INDX1 is equal to 0. If so, INDX1 is set to N, as shown in process step S2280 and the process S2200 then proceeds to decision step S2285. If not, the process S2200 proceeds directly to decision step S2285, where it queries if $E_{rho-n}$(INDX0) is greater than $E_{rho-n}$(INDX1), If so, the process S2200 proceeds to process step S2286, where the value of BIT is set to 1. The process S2200 then continues on to process step S2290. If E(INDX0) is not greater than E(INDX1), the process S2200 proceeds to process step S2288, where the value of BIT is set to -1. The process S2200 then proceeds to process step S2290. At process step S2290, the value of jm, which is the value of j for which $E_{rho-n}$(j) is maximum, is determined. The process S2200 then proceeds to process step S2295, where $E_{rho-n-1}$ is set to jm. The process S2200 then terminates.

Figure 23:
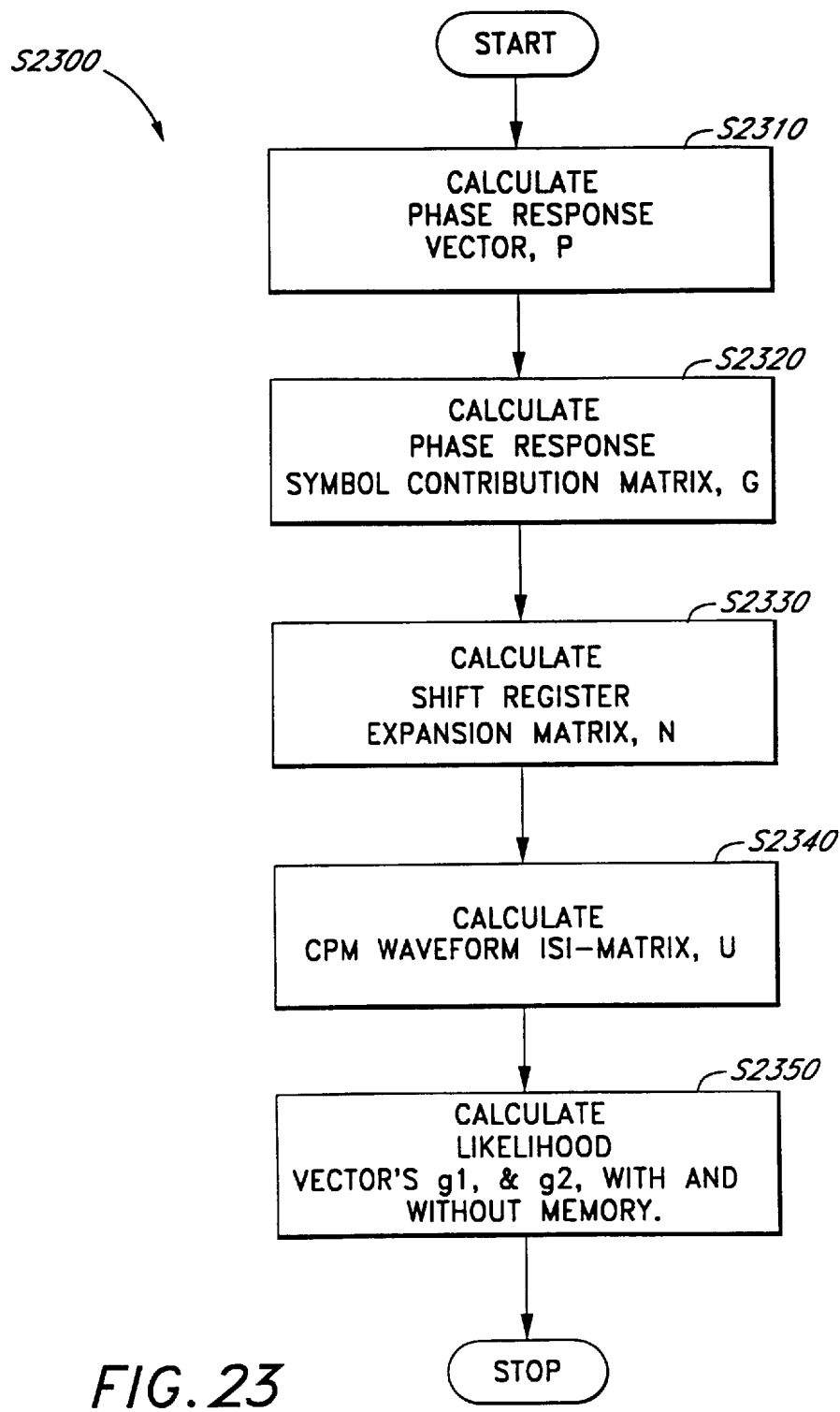
FIG. 23 is a flow chart of the Measurement Dynamics for CPM process implemented in step S2020 of FIG. 20

FIG. 23 is a flow chart of the CPM Measurement Dynamics process implemented in step S2020 of FIG. 20. The CPM Measurement Dynamics process S2300 begins from a start state and proceeds to process step S2310, where the phase response vector p is calculated, and where $$p = [p(t_0) \cdot p(t_1), \ldots p(t_{(L+2)-\lambda-1})]$$

$$t_f = -\frac{T}{2} \cdot (2L+1) + j - \frac{T}{\lambda}, \text{ where } j = 0, \ldots (L+2) \cdot \lambda - 1$$

p(t)=phase response function ("symmetric")

λ=number of samples per symbol

T=symbol -time

L=CPM ISI-parameter (ISI=2·L+1), where, L=1, 2, . . .

The process S2300 then advances to process step S2320, where the phase response symbol contribution matrix G is calculated, and where $$G = \begin{bmatrix} p(t_0) & p(t_1) & \cdots & p(t_{\lambda-1}) \\ p(t_\lambda) & p(t_{\lambda+1}) & \cdots & p(t_{2\lambda-1}) \\ \cdots & \cdots & \cdots & \cdots \\ p(t_{(L-1)+\lambda}) & p(t_{(L+1)-\lambda+1}) & \cdots & p(t_{(L+2)\lambda-1}) \end{bmatrix},$$

where $G \in \Re^{2L+1,\lambda}$.

The process S2300 then advances to process step S2330, where the shift register expansion matrix N is calculated, where $$N = 0_{2^{2L+1}, 2^{2L+1}} - 2 \cdot \begin{bmatrix} 0 & 0 & \ldots & 0 \\ 0 & 0 & \ldots & 1 \\ \ldots & \ldots & \ldots & \ldots \\ 1 & 1 & \ldots & 1 \end{bmatrix}, N \in \Re^{2^{2L+1}, 2^{2L+1}}$$

Next, the process S2300 calculates the CPM waveform ISI-matrix, U, $$U = N \cdot G = \begin{bmatrix} u_1 \\ \cdot \\ \cdot \\ \cdot \\ u_{M^{2L}-1} \end{bmatrix}, U \in \Re^{2^{2L+1}, \lambda}$$

as shown in process step S2340. Control is then passed to process step S2350, where the Likelihood Vectors $g_1$ and $g_2$, with and without memory, are calculated. Note that $g_1$ and $g_2$ are provided as follows:

$$g_1 = \cos \begin{bmatrix} v \\ v + \Delta\theta \\ \cdot \\ \cdot \\ v + (N-1) \cdot \Delta\theta \end{bmatrix}, g_2 = \sin \begin{bmatrix} v \\ v + \Delta\theta \\ \cdot \\ \cdot \\ v + (N-1) \cdot \Delta\theta \end{bmatrix}$$

where N=Number of memory states $$N = \text{Number of memory states} = \begin{Bmatrix} p \cdot 2^{2L}, m - \text{even} \\ 2 \cdot p \cdot 2^{2L}, m - \text{odd} \end{Bmatrix}$$

h=m/p=modulation-index $\Delta\theta = 2 \cdot \pi/N$ and v is defined as follows:

$$v = \begin{bmatrix} u^T \\ \cdot \\ \cdot \\ \cdot \\ \cdot \\ u_{2^{2L+1}}^T \end{bmatrix}.$$

The process S2300 then terminates.

Figure 24:
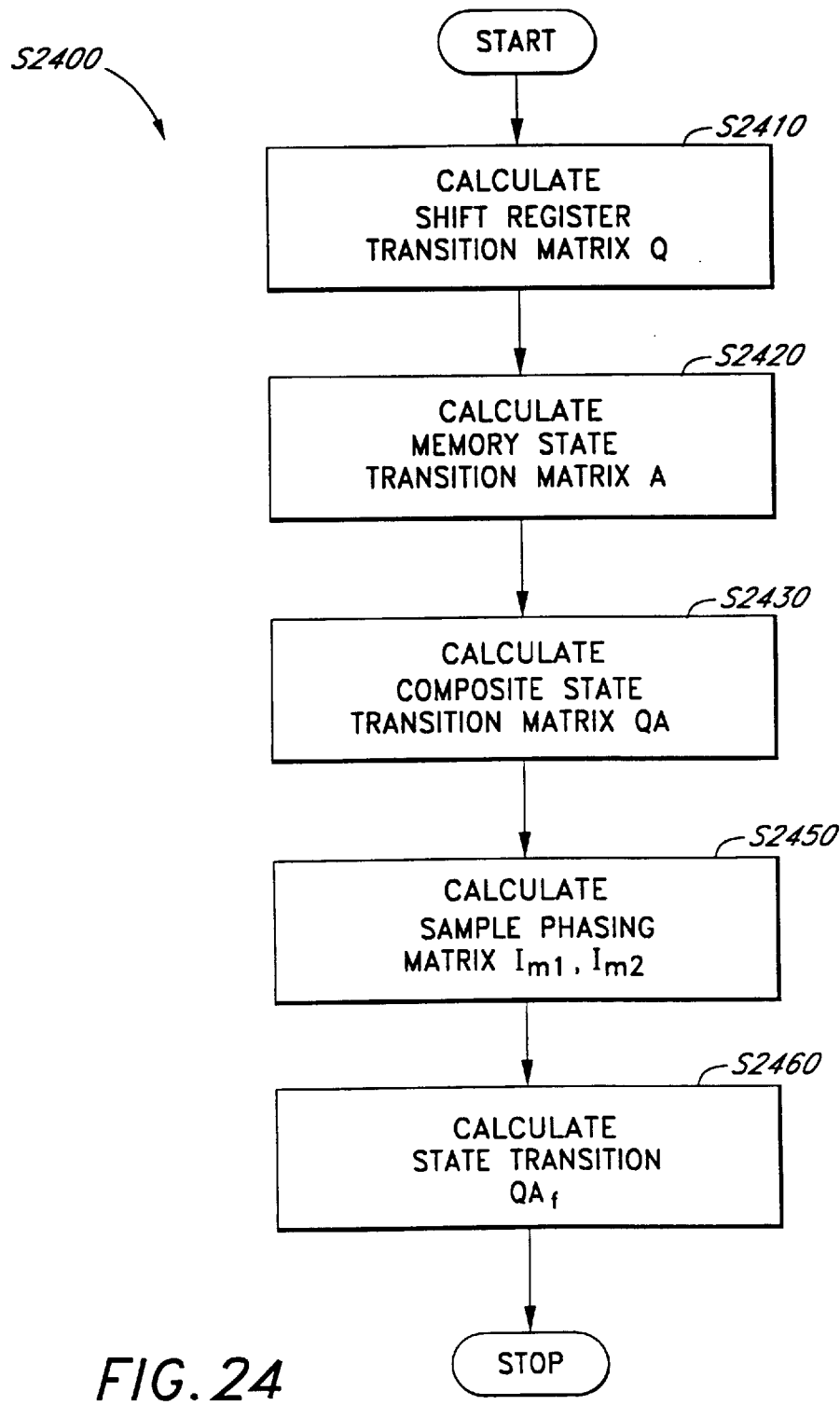
FIG. 24 is a flow chart of the State Dynamics for CPM process implemented in step S2030 in FIG. 20.

FIG. 24 is a flow chart of the CPM State Dynamics process implemented in step S2030 in FIG. 20. The CPM State Dynamics process S2400 begins from a start state and proceeds to process step S2410, where the shift register transition matrix Q is calculated, where $$q_{i, 2 \cdot i - 1} = q_{i, 2 \cdot i} = q_{1 + 2^{2L}, 2 \cdot i - 1} = q_{i + 2^{2L}, 2 \cdot i} = 0.5,$$

where $i = 1, 2, \ldots, 2^{2L}$.

The process S2400 then proceeds to process step S2420, where the Memory State Transition Matrix, A is calculated, where $$a_{2,1} = a_{N,1} = a_{1,N} = a_{n-1,n} = 0.5$$

$$a_{i-1,i} = a_{i+1,i} = 0.5, \text{ where } i = 2, \ldots, N-1$$

where N=Number of memory states=

$$N = \text{Number of memory states} = \begin{Bmatrix} p \cdot 2^{2L}, m - \text{even} \\ 2 \cdot p \cdot 2^{2L}, m - \text{odd} \end{Bmatrix}$$

h=m/p=modulation-index

Next, the process S2400 advances to process step S2430, where the Composite State Transition Matrix QA, is calculated, where $$QA = \begin{bmatrix} 0 & Q \cdot I_p & 0 & \cdot & Q \cdot I_p \\ Q \cdot I_p & 0 & Q \cdot I_p & \cdot & 0 \\ 0 & Q \cdot I_m & 0 & \cdot & 0 \\ \cdot & 0 & Q \cdot I_m & \cdot & \cdot \\ \cdot & \cdot & \cdot & \cdot & \cdot \\ 0 & \cdot & 0 & \cdot & Q \cdot I_m \\ \cdot & \cdot & \cdot & \cdot & \cdot \\ Q \cdot I_m & 0 & 0 & \cdot & 0 \end{bmatrix},$$

where we define:

$$I_p = \begin{bmatrix} 1 & 0 & \cdot & 0 & 0 & 0 \\ 0 & 0 & 0 & \cdot & \cdot & \cdot \\ \cdot & 0 & 1 & 0 & \cdot & \cdot \\ \cdot & \cdot & 0 & 0 & 0 & \cdot \\ \cdot & \cdot & \cdot & 0 & 1 & 0 \\ 0 & 0 & 0 & 0 & 0 & \cdot \end{bmatrix}, I_p \in \Re^{N,N}$$

$$I_m = \begin{bmatrix} 0 & 0 & \cdot & 0 & 0 & 0 \\ 0 & 1 & 0 & \cdot & \cdot & \cdot \\ \cdot & 0 & 0 & 0 & \cdot & \cdot \\ \cdot & \cdot & 0 & 1 & 0 & \cdot \\ \cdot & \cdot & \cdot & 0 & 0 & 0 \\ 0 & 0 & 0 & 0 & 0 & \cdot \end{bmatrix}, I_m \in \Re^{N,N}$$

The process S2400 then continues on to process step S2450, where the Sample Phasing Matrices, $I_{m1}$ and $I_{m2}$ are calculated, where $$I_{m1} = \begin{bmatrix} 0 & 0 & \ldots & 1 \\ 0 & 0 & \ldots & 0 \\ \vdots & \vdots & 0 & \vdots \\ \vdots & \vdots & & \vdots \\ 0 & 0 & . & 0 \end{bmatrix}, I_{m1} \in \Re^{\lambda,\lambda},$$

$$I_{m2} = \begin{bmatrix} 0 & \ldots & 0 \\ I_{\lambda-1,\lambda-1} & & 0 \end{bmatrix}, I_{m2} \in \Re^{\lambda,\lambda}$$

The process S2400 next proceeds to process step S2460, where the State Transition, $QA_f$ is calculated. The process S2400 then terminates.

C. Decoding of Convolutional Codes

C.1 Overview

In this section, the application of the forward estimator and data smoother described in Section A to the decoding of Convolutional codes is discussed. This involves the derivation of a transition probability matrix that governs the shift register-induced Markov chain. A case where the code rate is 1/n is first considered. The case where the code rate is m/n, where m<n, then follows.

A summary of the forward estimation and back smoothing process of the present invention is provided below. Forward Estimation: As described earlier, a transmitted signal may be described by a state vector together with a state transition matrix. To obtain the forward estimate at time p, we use the estimate that was derived at time p−1 and the new set of n samples received at time p. The process of the present invention updates the state estimate from time p−1 based on the new samples. The way that the process works is as follows. From the transition matrix A we know what states at time p−1 can lead to the states at time p, together with the probability of this transition. If we sum these for each state at time p, i.e. all the transition probabilities that lead to that state from any state at time p−1, we obtain a new vector. Each component of this vector represents the probability of the process transition in to that state. Using the new set of n measurement we compute the likelihood of being in any given state. To get the new estimated vector for time p we combine the likelihood vector obtained form the n samples with the probability vector obtained by the transition from time p−1. The result is a vector where each component represents the probability of being in that state at time p, given the set of n new samples and the state at time p−1.

Smoothing: Suppose we want to improve the estimate, obtained by the forward procedure, at time p−j. To do so, we store the past j estimates produced by the forward procedure. These estimates are for time p−1, p−2, ..., p−j, assuming we are now at time p. The back smoothing operates as follows. Starting with the current estimate q(p), to obtain the smoothed estimate at time p−1, we look at all the possible transitions that could have led from a given state at time p−1 to a state at time p. If we sum up all the components of the vector q(p) according to the states that they came from at time p−1, we get a new vector where each component represents the probability that we were in that state at time p−1. This operation is represented by the product of the transpose of the matrix A and the vector q(p). The new smooth estimate is then obtained by multiplying, component wise, this vector q(p−1), the forward estimate at time p−1. This operation is represented by the Haddamard product. The process then continues until we get to time p−j.

C.2 Theory of Operation—Shift Register Induced Markov Process

Figure 7:
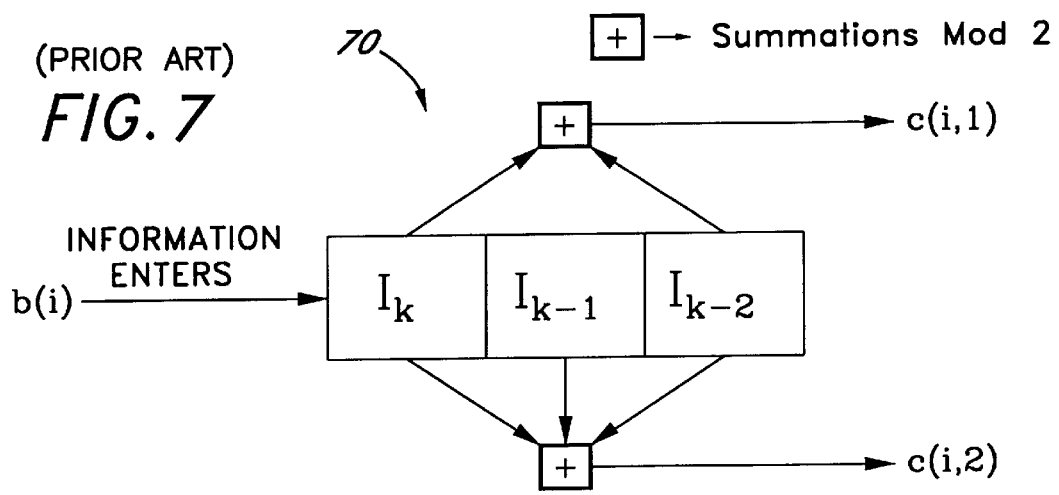
FIG. 7 is a block diagram of a shift register utilized in a conventional Convolutional encoder.

Consider the shift register of length 3 depicted in FIG. 7. The input sequence enters from the most significant bit (MSB) and leaves it from the least significant bit (LSB). Denote the input sequence by $\{x(i)\}$ and assume that each value can be either zero or one, then the content of the register at time k provides a binary representation of a number in the range of 0, ..., 7. In general, when the length of the register is L, its content gives a binary representation of a number in the range 0, ..., $2^L-1$. We call the binary representation of the register at time k the state of the register at time k and we denote it by s(k). Given the input sequence $\{x(j)\}$ s(k) can be written as $$s(k) = x(k) \cdot 2^{L-1} + \ldots + x(k-L+1).$$

When the input is a sequence of random variables with the probability distribution $$P\{x(k)=0\} = p$$

$$P\{x(k)=1\} = q$$

then the state of the register can be described by a Markov chain with a transition probability matrix A of dimension $2^L \times 2^L$ for the case where p=q=½, the matrix A is given by:

$$a(n, 2n) = P\{s(k+1) = n | s(k) = 2n\} = ½$$

$$a(n+2^{L-1}, 2n) = P\{s(k+1) = n+2^{L-1} | s(k) = 2n\} = ½$$

$$a(n, 2n+1) = P\{s(k+1) = n | s(k) = 2n+1\} = ½$$

$$a(n+2^{L-1}, 2n+1) = P\{s(k+1) = n+2^{L-1} | s(k) = 2n+1\} = ½$$

$$a(i,j) = 0 \text{ otherwise}$$

$$n = 0, \ldots, 2^{L-1}-1.$$

When the code rate is m/n, with 1<m<n, the transition matrix changes. The new process can be viewed as generated by a shift register of length m·L, where a block of m bits is shifted at each time. For this case, the transition matrix is of dimension $2^{mL} \times 2^{mL}$ and has the following structure:

$$a((2^m) \cdot i+j, i+n \cdot (2^{m(L-1)})) = P\{s(k+1)=(2^m) \cdot i+j | s(k)=i+n \cdot (2^{m(L-1)})\} = ½^m$$

where i=0, ..., $2^{m(L-1)}-1$; j=0, ..., $2^m-1$; n=0, ..., $2^m-1$ and all other components of the transition matrix are zero.

Now that the shift register state has been modeled as a Markov process, the forward estimation process and the data smoothing process developed in Section A may be applied for the present invention of the estimation of the state of the shift register.

C.3 Decoding of Convolution Codes

Recall from Section C.1 that the Convolutional encoder produces n output bits for each m input bits. The output bit sequence depends on the input bit at time k, the state of the encoder at time k−1, and also on the particular connection of the stages that produces the output pattern. The stage connection are traditionally represented by generation polynomials with the number of polynomials equal to the number of outputs. For example, in FIG. 7 there are two polynomials $g_1(x)$ and $g_2(x)$ that are given by $$g_1(x) = 1+x^2$$

$$g_2(x) = 1+x+x^2.$$

The relationship between the state of the shift register and the output sequence is shown in the table below.

| state | $g_1(x)$ | $g_2(x)$ |
|-------|----------|----------|
| 0 | 0 | 0 |
| 1 | 1 | 1 |
| 2 | 0 | 1 |
| 3 | 1 | 0 |
| 4 | 1 | 1 |
| 5 | 0 | 0 |
| 6 | 1 | 0 |
| 7 | 0 | 1 |

Note that since the code structure is known for both transmitter and receiver, the function $g_1(k), \ldots, g_n(k)$ are available to the decoder and a table similar to the above can be prepared for all $g_j(k)$, where $j=1, \ldots, n$, and states $k=0, \ldots, 2^L-1$.

Using the transition matrix A, the pre-computed table for the functions $g_j(k)$, and the algorithm, the feed-forward recursive estimation of the shift register state can be formed.

The observation vector of dimension n at time m is denoted by y(m) and the estimated state at time m by u(m). Thus, $$y(m) = h(x(m)) = z(m)$$

where x(m) is the state of the register at time m, the function h() is an n dimensional vector with the jth component given by $$2 \cdot g_j(x(m)) - 1,$$

and z(m) is a vector of channel noise where each component is Gaussian distributed with zero mean and standard deviation equal to $\sigma$.

We provide an estimate of the state x(m) and notice that the input bit sequence can be recovered when the state sequence is known.

C.4 Operation

Figure 25:
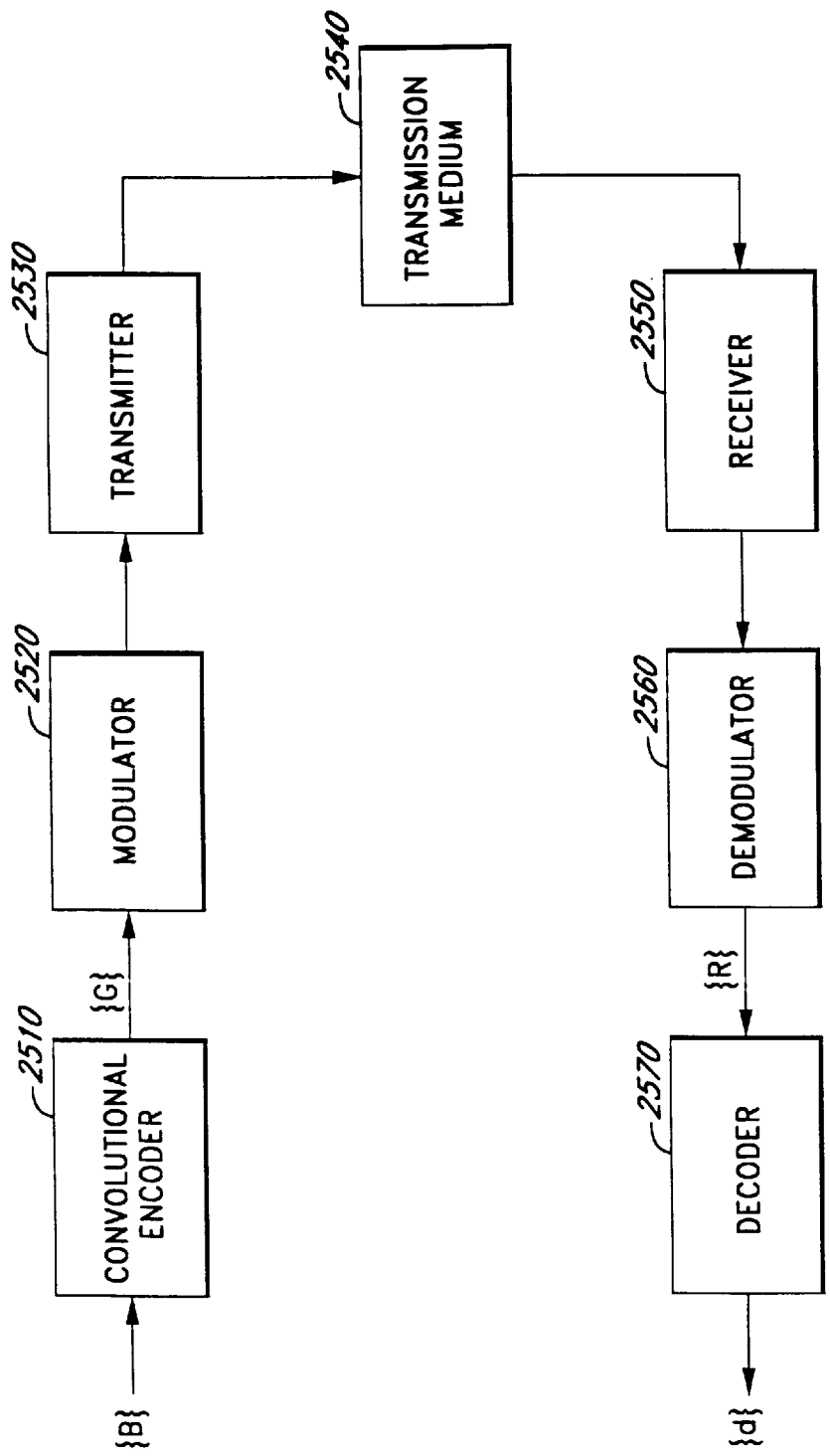
FIG. 25 is a communication system which implements a decoder 2570 utilizing the Convolutional Decoding technique in accordance with one embodiment of the present invention.

FIG. 25 is a block diagram of one embodiment of a communications system of the present invention having a coding rate of m/n. A sequence of signals {b} from an information source is first provided to a Convolutional Encoder 2510. The sequence {b} is a binary input arranged in a block of m bits, and may be expressed as follows:

$$\{b\} = \{(b_{1,1}, b_{1,2}, \ldots, b_{1,m}), (b_{2,1}, \ldots, b_{2,m}), \ldots (b_{k,1}, \ldots b_{k,m}), \ldots\}.$$

The Encoder 2510 encodes the signals {b} to provide a coded sequence {c} which is a block of n bits. The sequence {c} may be expressed as follows:

$$\{c\} = \{(c_{1,1}, \ldots c_{1,n}), \ldots (c_{k,1} \ldots c_{k,n}), \ldots\}$$

The sequence (c) is then provided to a Modulator 2520, which modulates the sequence {c} and provides the modulated sequence of signals to a transmission medium 2530 to a receiver 2540. The received signals are first provided to the demodulator 2560, which demodulates the signals and provides a sequence of real numbers {R}. This sequence is arranged in blocks of n samples which may be expressed as follows:

$$\{R\} = \{(r_{1,1}, \ldots, r_{1,n}), \ldots (r_{k,1}, \ldots r_{k,n}), \ldots\}$$

Each block of n samples is provided to the decoder 2570 or the present invention, which generates a sequence {d} which is an estimate of the sequence {b}. The sequence {d} may be expressed as follows:

$$\{d\} = \{(d_{1,1}, \ldots, d_{1,m}), \ldots (d_{k,1}, \ldots d_{k,m}), \ldots\}.$$

The decoder 2570 of the present invention provides a sequence of signals {R} received by the receiver and constructs a sequence {d} such that {d} is a close estimate of the originally transmitted signal {b}. Details of the method of providing the sequence {d} will be discussed in detail in the sections below.

Figure 26:
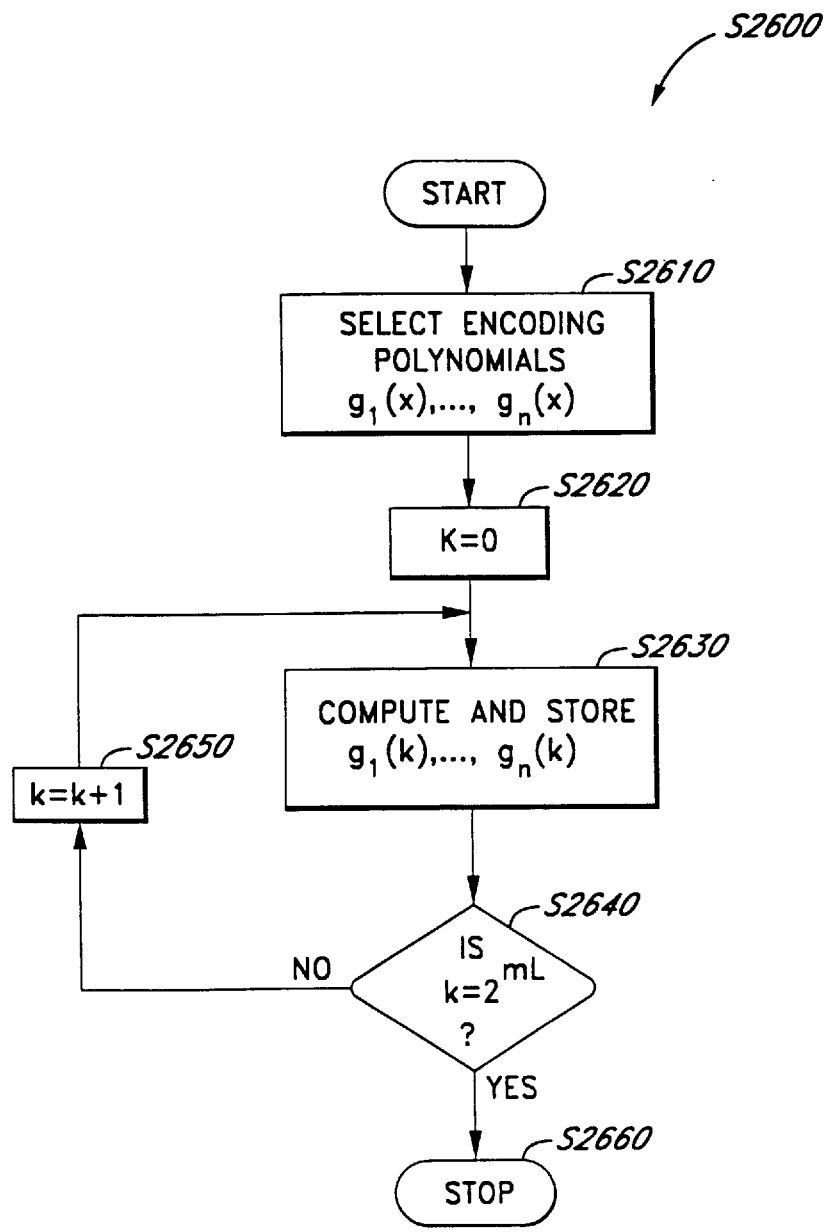
FIG. 26 is a flow chart illustrating the preprocessing steps utilized in the communication system of FIG. 25.

FIG. 26 is a flow chart illustrating the preprocessing steps utilized in the communications system of FIG. 25. The process S2600 begins from a start state and proceeds to process step S2610, where the encoding polynomials $g_1(x), \ldots, g_n(x)$ are selected. The process S2600 then advances to process step S2620, where k is initialized to 0. The process S2600 then continues to process step S2630, where the values of $g_1(k), \ldots, g_n(k)$ are computed and stored. Next, the process S2600 queries if k is equal to $2^{mL}$. If not, the process S2600 proceeds to process step S2650, where k is incremented by one. The process S2600 then continues on to process step S2630. If k is equal to $2^{mL}$, the process S2600 has processed all the polynomials selected, and it thus terminates.

Figure 27:
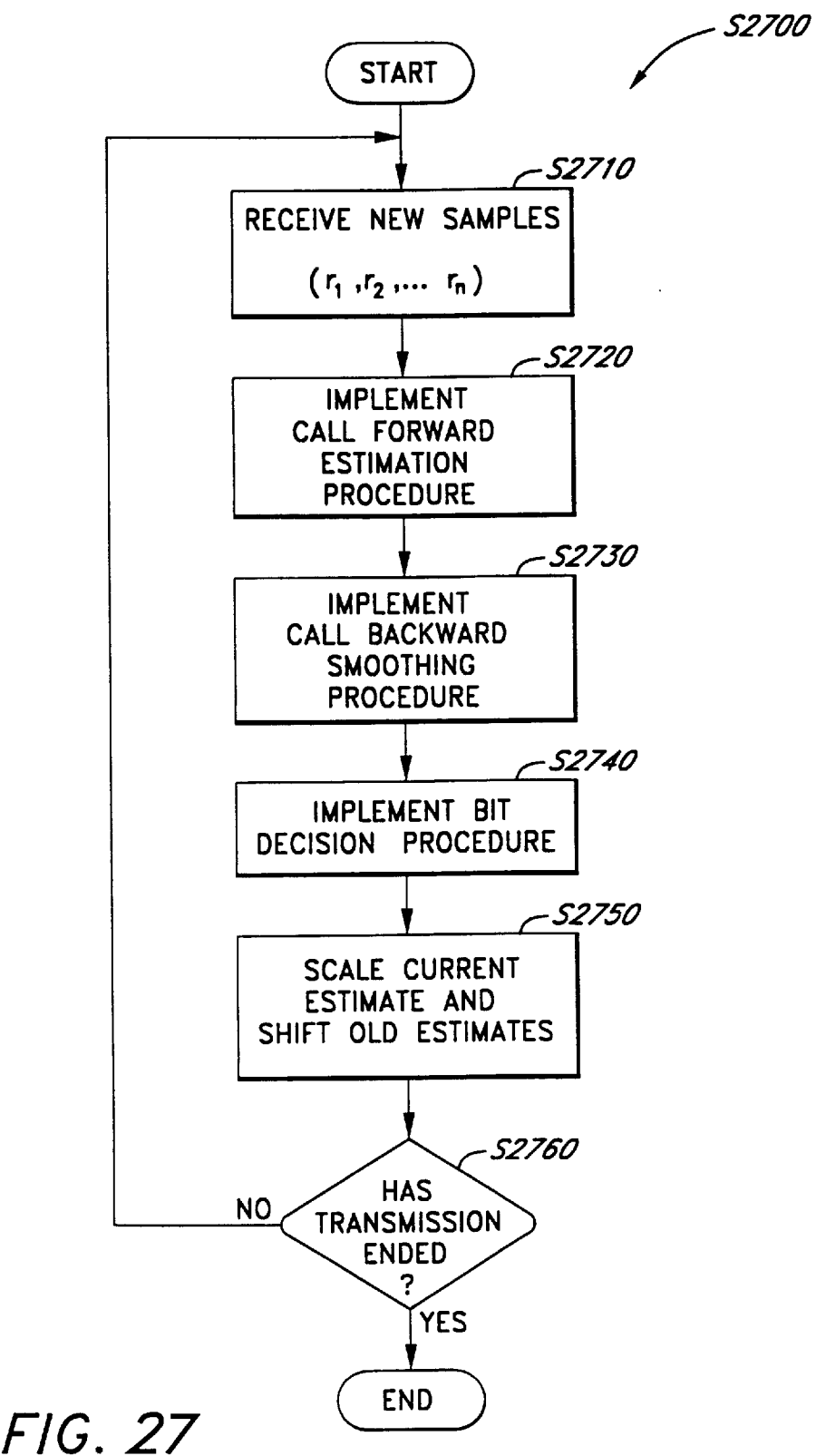
FIG. 27 is a flow chart illustrating the Convolutional Decoding process implemented in the Decoder of FIG. 25.

FIG. 27 is a flow chart illustrating the Convolutional Decoding process of the present invention as implemented in the Decoder 2570 of FIG. 25. The process S2700 begins from a start state and proceeds to process step S2710, where new samples $\{r_1, r_2, \ldots, r_n\}$ of the sequence {R} are received. The process S2700 then advances to process step S2720, where forward estimation of the states are performed. The process then proceeds to process step S2730, where backward smoothing is performed. Next, the process S2700 proceeds to process step S2740, where bit decision is provided. The process S2700 then scales the current estimate of the samples and replaces the old estimates with the current estimates, as shown in process step S2750. The process S2700 then queries if the transmission of new samples has ended, as shown in decision step S2760. If not, the process S2700 returns to process step S2710 to process a new batch of n samples. If transmission has ended, the process S2700 terminates.

Figure 28:
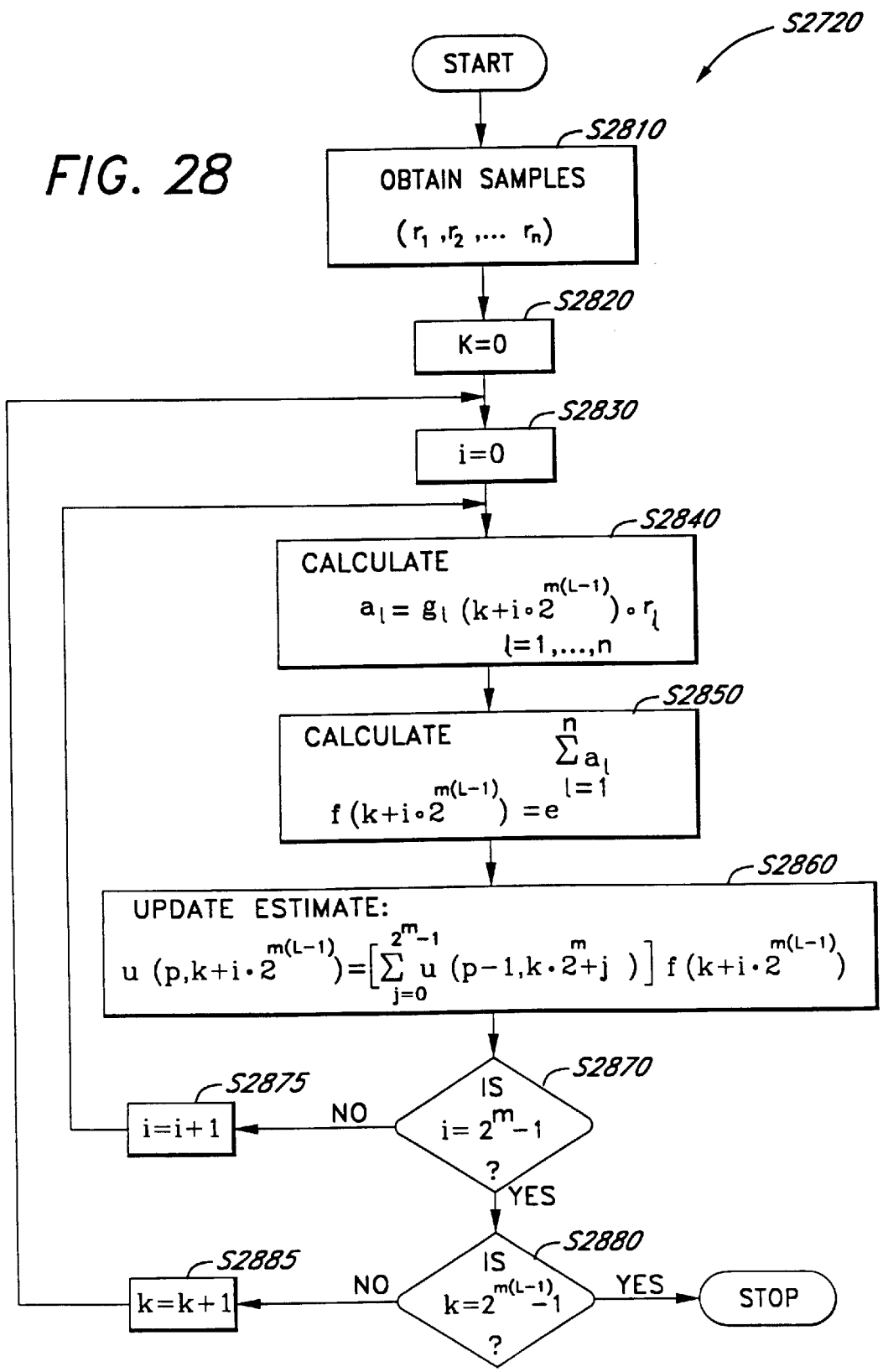
FIG. 28 is a flow chart illustrating the Forward Estimation process implemented in step S2720 of FIG. 27.

FIG. 28 is a flow chart illustrating the Forward Estimation process implemented in step S2720 of FIG. 27. The forward estimation process S2720 may be summarized as follows:

For each state $k=0, \ldots, 2^{(L-1)}-1$ compute $$u(m,k) = (u(m-1, 2k) + u(m-1, 2k+1)) \cdot f(k)$$

$$u(m,k+2^{(L-1)}) = (u(m-1,2l) + u(m-1,2k+1)) \cdot f(k+2^{(L-1)})$$

where u(m,k) is the kth component of the vector u(m) and f(j) is given by $$f(j) = \prod_{i=1}^{n} \frac{\exp(-(y(m,i) - (2g_i(j) - 1))^2)/2\sigma^2}{\sigma \exp(-(y(m,i))^2)/2}$$

For the general case where the code rate is m/n, the feed-forward update equation is the following:

$$u(p, k+i \cdot 2^{(m(L-1))}) = [u(p-1, k \cdot 2^m) + \ldots + u(p-1, k \cdot 2^m + 2^m - 1)] f(k + i \cdot 2^{m(L-1)})$$

for:

$$k+0, \ldots, 2^{m(L-1)}-1, i=0, \ldots, 2^m-1,$$

and function f is as defined above.

The process S2720 begins from a start state and proceeds to process step S2810, where the samples $r_1, r_2, \ldots, r_n$ are obtained. The process S2720 then proceeds to process step S2820, where k is initialized to 0. The process step S2720 next advances to process step S2830, where i is initialized to 0. The process S2720 then computes $a_l$ for l=1, ..., n. Next, the process S2720 proceeds to process step S2850, where it calculates $f(k+i \cdot 2^{m(L-1)})$. Next, the process S2720 updates the estimate, as shown in process step S2860. The process S2720 next queries if i is equal to $2^m-1$, as shown in decision step S2870. If not, the process S2720 proceeds to process step S2875, where i is incremented by one. The process S2720 then returns to process step S2840. If i is equal to $2^m-1$, the process S2720 proceeds on to decision step S2880, where it queries if k is equal to $2^{m(L-1)}-1$. If not, the process proceeds on to process step S2885, where k is incremented by one, and then returns to process step S2830. If k is equal to $2^{m(L-1)}-1$, the process terminates.

Figure 29:
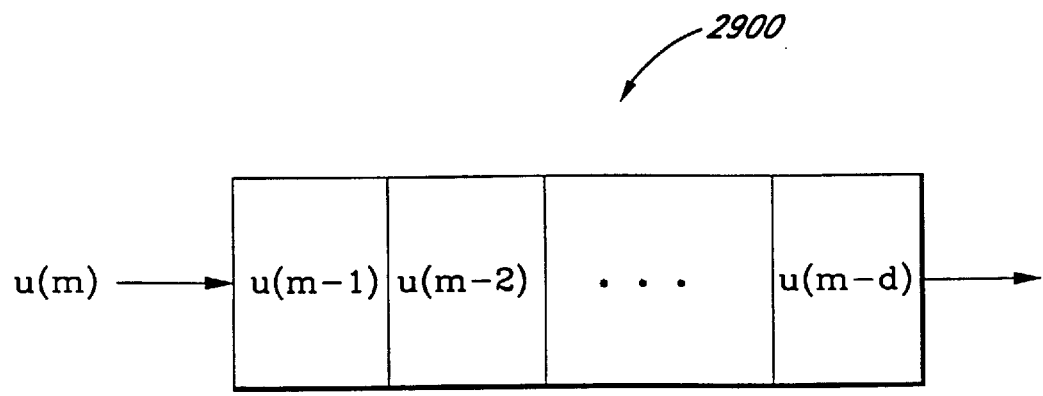
FIG. 29 is a flow chart illustrating the register for storing the forward estimate values provided by the process shown in FIG. 28.

FIG. 29 is a flow chart illustrating the register 2900 for storing the forward estimate values provided by the process shown in FIG. 28. As shown, m is the current time and each u(m) is a vector of dimension equal to the states. The value of most current vector u(m) is placed into the shift register 2900, while the value of the oldest vector u(m−d) is discarded.

Figure 30:
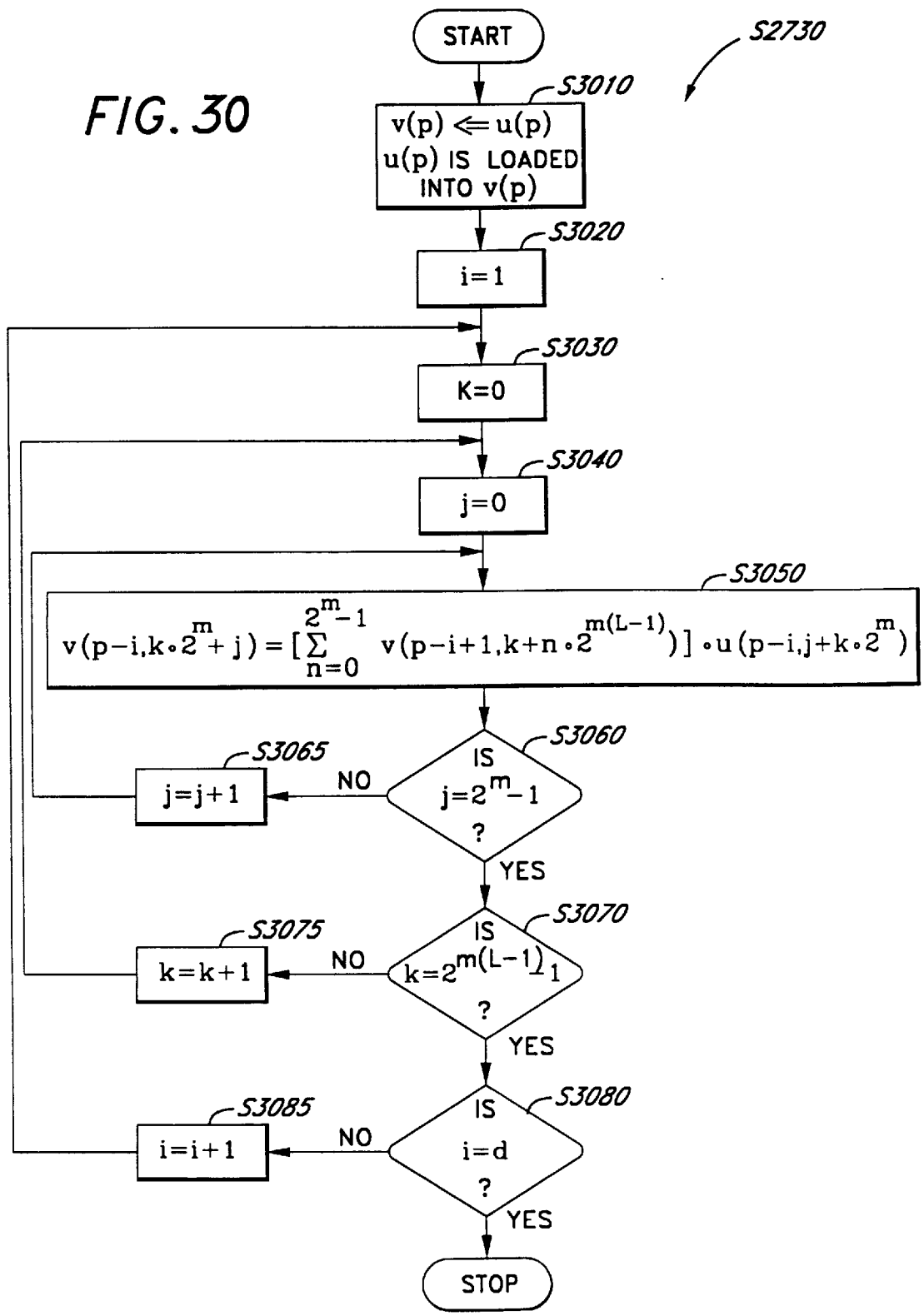
FIG. 30 is a flow chart illustrating the backward smoothing process implemented in step S2730 of FIG. 27.

FIG. 30 is a flow chart illustrating the backward smoothing process implemented in step S2730 of FIG. 27. The backward smoothing process S2700 may be summarized as follows:

Once the sequence of state estimates u(m), is obtained they are used as the input to the following smoothing procedure described in Section A.

Define the smoothing depth by d and the smoothed vector by v(m), then for each i=1, ..., d and states k=0, ..., $2^{(L-1)}-1$ compute:

$$v(m-i, 2k+1) = (v(m-i+1, k) + v(m-i+1, k+2^{(L-1)})) \cdot u(m-j, 2k+1)$$

$$v(m-i, 2k) = v(m-i+1, k) + v(m-i+1, k+2^{(L-1)}) \cdot u(m-i, 2k)$$

For the case where the code rate is m/n, the smoothing equations are given by:

$$v(p-i, k \cdot 2^m + j) = [v(p-i+1, k+ \ldots + v(p-i+1, k+(2^m-1) \cdot (2^{m(L-1)}))] \cdot u(p-i, k \cdot 2^m + j)$$

for:

$$k=0, \ldots, 2^{m(L-1)}-1, j=0, \ldots, 2^m-1.$$

The Backward Smoothing process S2730 begins from a start state and advances to process step S3010, where the values of vector U(p) are loaded into vector V(p). The vectors U(p) and V(p) are vectors of dimension $2^{mL}$, having values u(i,j) and v(i,j) which represent the jth component of a sample at time i. The current time is p. The process S2730 next initializes i to 1, as shown in process step S3020. The process S2730 next advances to process step S3030, where k is initialized to 0. Next, the process S2730 proceeds to process step S3040, where j is initialized to 0. Control is then passed to process step S3050.

At process step S3050, the process S2730 calculates the value of the vector $V(p-i, k \cdot 2^m + j)$. The process step S2730 then proceeds on to decision step S3060, where it queries if j is equal to $2^m-1$. If not, the process S2730 proceeds to process step S3065, where j is incremented by 1 and it then returns to process step S3050. If j is equal to $2^m-1$, the process S2730 proceeds on to decision step S3070, where it queries if k is equal to $2^{m(L-1)}-1$. If not, the process S2730 proceeds to process step S3075, where k is incremented by 1, and then the process S2730 returns to process step S3040. If k is equal to $2^{m(L-1)}-1$, the process S2730 advances to decision step S3080, where it queries if i is equal to d, the depth of the smoother. If not, the process S2730 proceeds to process step S3085, where i is incremented by one. The process S2730 then returns to process step S3030. If i is equal to d, the process terminates.

Figure 31:
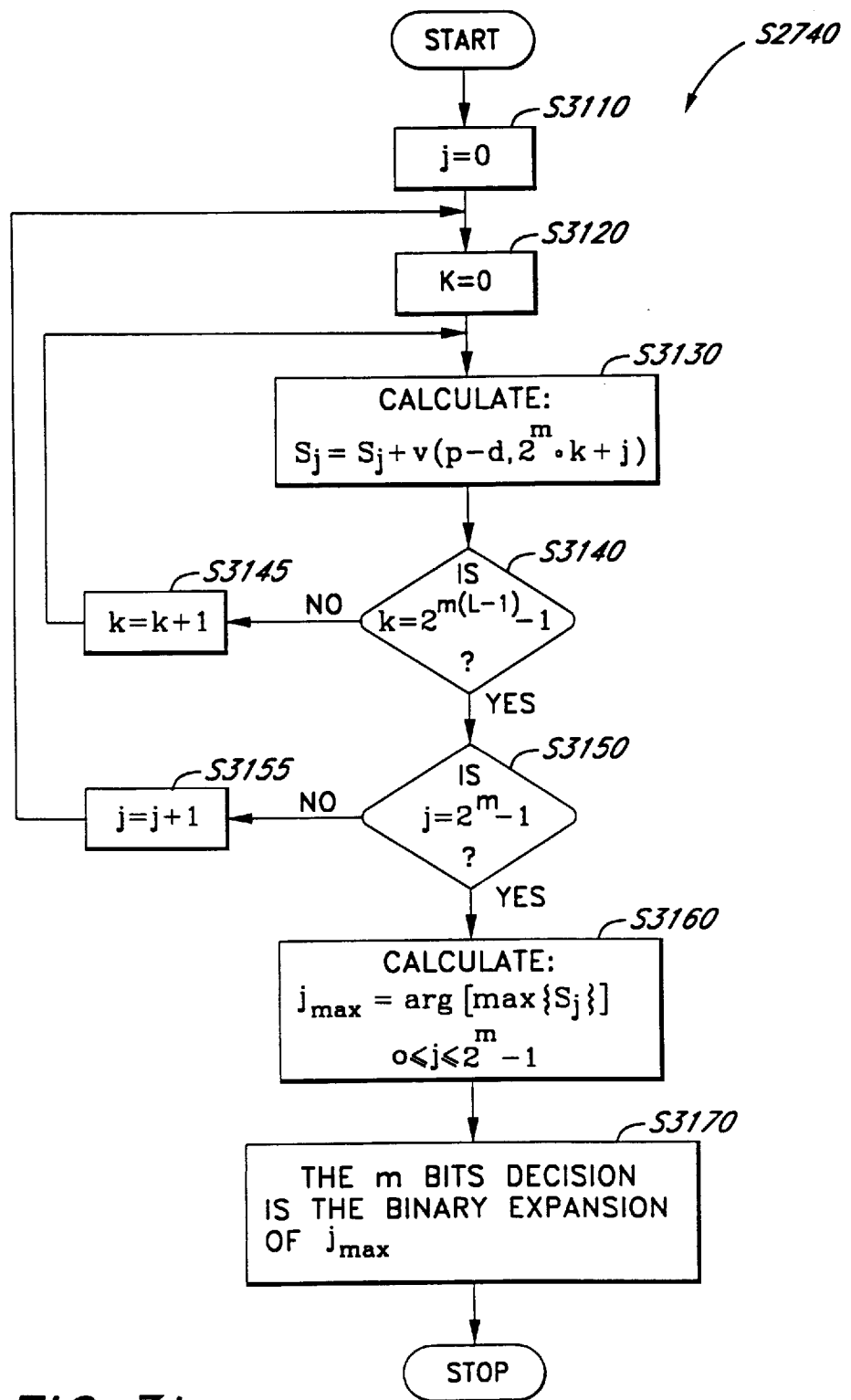
FIG. 31 is a flow chart illustrating the bit decision process implemented in step S2740 in FIG. 27 for a code rate of m/n.

FIG. 31 is a flow chart illustrating the bit decision process implemented in step S2740 in FIG. 27 for a code rate of m/n. The bit decision process S2700 may be summarized as follows.

The bit decision at time p is made by using the vector v(p−d). This vector can be viewed as the probability distribution of the states at time p−d. Thus, for the 1/n code rate, if we sum the components of this vector over the odd states and the even states, it represents the probability that the LSB of the shift register is 1 or 0, respectively. The bit selection is them made according to the largest of these two probabilities. For the general case of code rate m/n, a decision is made on m bits at a time, as follows: s(j) is defined to be:

$$s(j) = v(p-d, j) + v(p-d, j+2^m) + \ldots + v(p-d, j+i \cdot 2^m) + \ldots + v((p-d, j+(2^{m(L-1)})-1) \cdot 2^m)$$

for all j=0, ..., $2^m-1$.

The m bits decision is made according to the binary expansion of the index j associated with the largest of the $2^m$ sums of s(j).

The process S2740 begins from a start state and proceeds to process step S3110, where j is initialized to 0. The process S2740 then proceeds to process step S3120, where k is initialized to 0. Next, the process S2740 advances to process step S3130, where $S_j$ is calculated. The process S2740 then advances to decision step S3140, where it queries if k is equal to $2^{m(L-1)}-1$. If not, the process S2740 proceeds to process step S3145, where k is incremented by 1, and the process S2740 then returns to process step S3130. If k is equal to $2^{m(L-1)}-1$, the process proceeds to decision step S3150, where it queries if j is equal to $2^m-1$. If not, the process S2740 advances to process step S3155, where j is incremented by 1, and the process S2740 then returns to process step S3120. If j is equal to $2^m-1$, the process S2740 proceeds to process step S3160, where $j_{max}$, which is the argument of the maximum value of s(j), is calculated. The process S2740 then advances to process step S3170, where the bit decision for m bits is made according to the binary expansion of $j_{max}$. The process S2740 then terminates.

Figure 32:
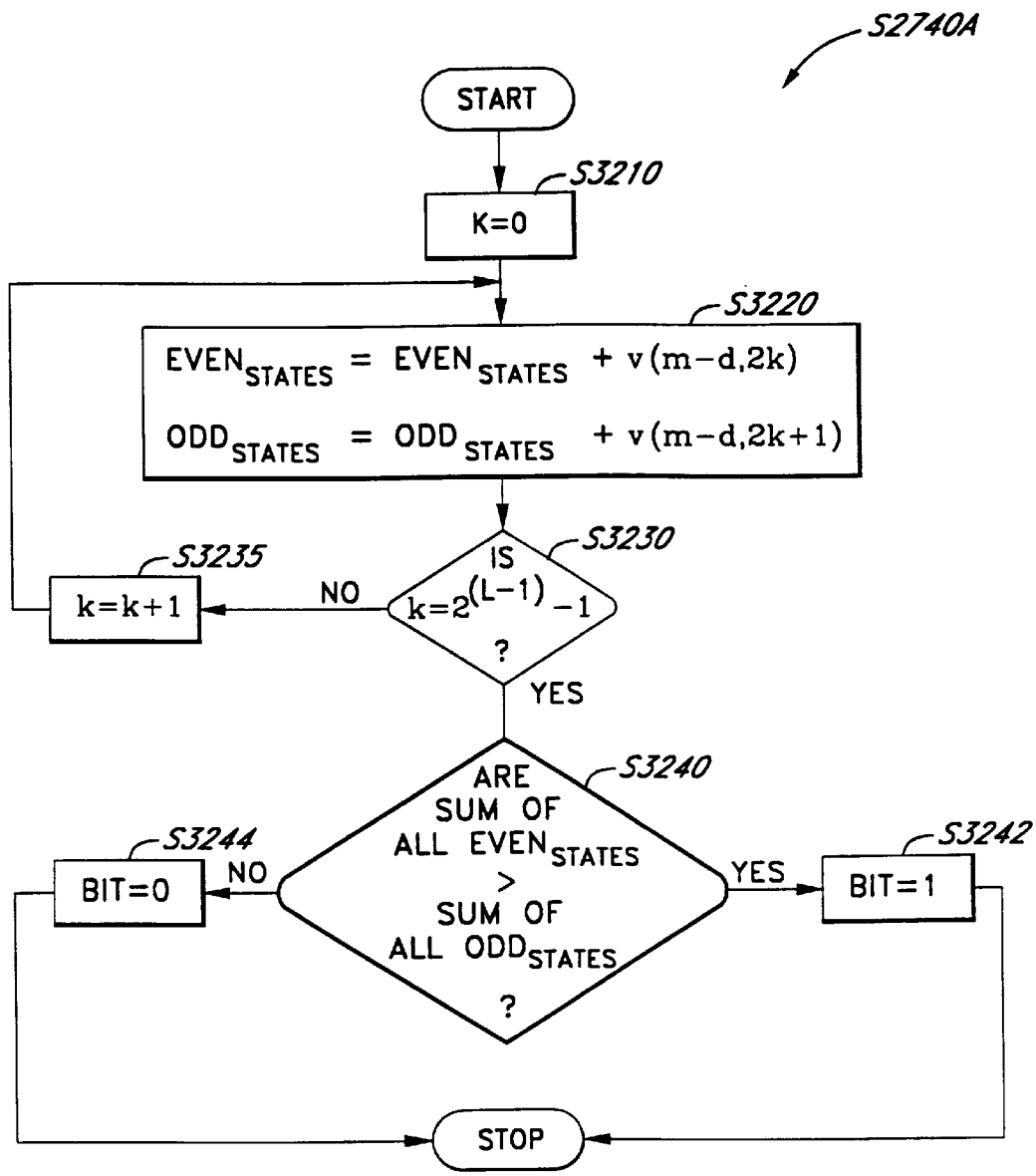
FIG. 32 is a flow chart illustrating the bit decision process implemented in step S2740 in FIG. 27, for a code rate of 1/n.

FIG. 32 is a flow chart illustrating the bit decision process shown in step S2740 of FIG. 27 for a code rate of 1/n. The process S2740A begins from a start state and proceeds on to process step S3210, where k is initialized to 0. The process S2740A then proceeds to process step S3220, where the sum of the even states and odd states are calculated. This is done by summing the even states and odd states, from k=0 to k=$2^{(L-1)}-1$, as follows:

$$EVEN_{states} = EVEN_{states} + v(m-d, 2k)$$

$$ODD_{states} = ODD_{states} + v(m-d, 2k+1)$$

The process S2740A then queries if k is equal to $2^{L-1}-1$, as shown in process step S3230. If not, the process S2740A proceeds to process step S3235, where k is incremented by 1, and the process S2740A then returns to process step S3220. If k is equal to $2^{L-1}-1$, the process S2740A proceeds to decision step S3240, where it queries if the sum of all even states is larger than the sum of all odd states. If so, the bit is set to 1, as shown in process step S3242. If not, the bit is set to 0, as shown in S3244. Following either case, the process S2740A terminates.

Figure 33:
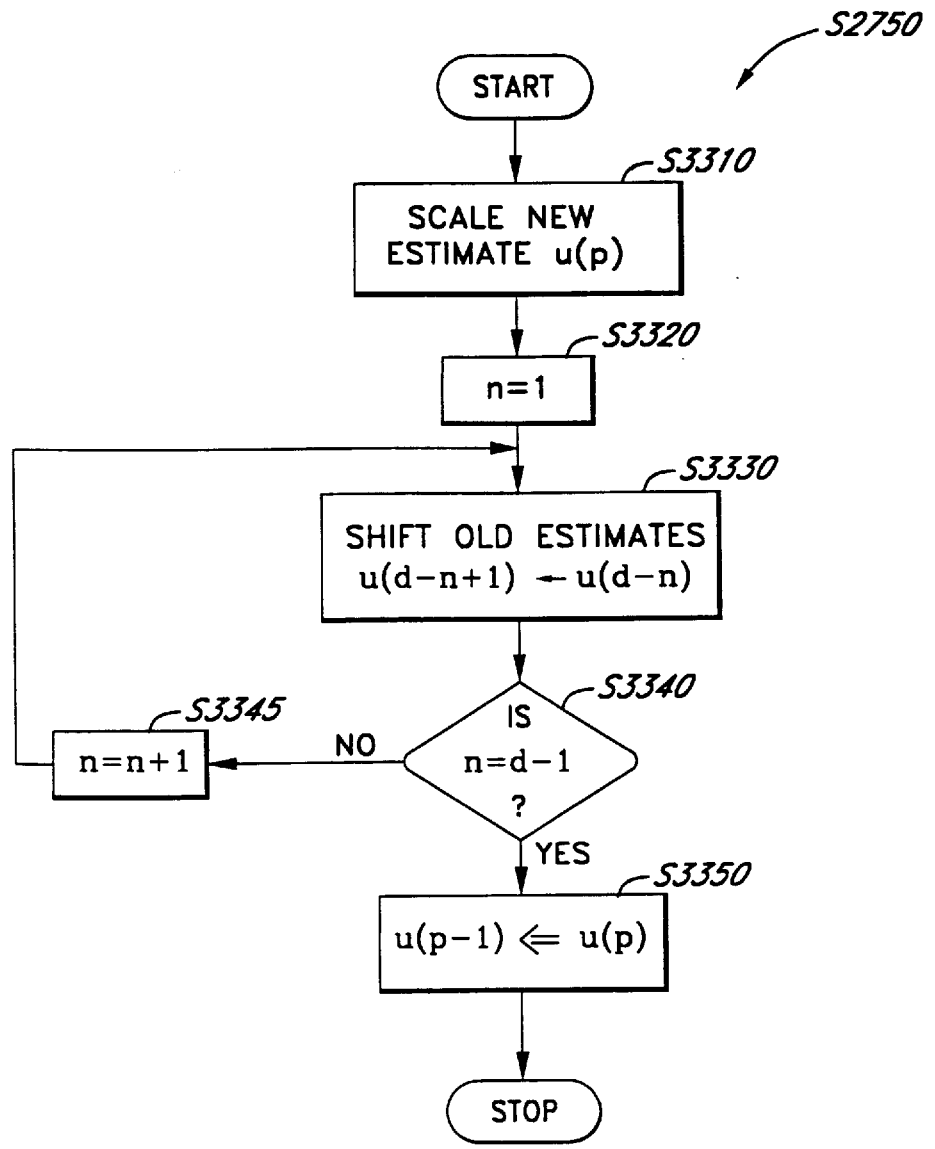
FIG. 33 is a flow chart illustrating the scale and update process implemented in step S2750 as shown in FIG. 27.

FIG. 33 is a flow chart illustrating the scale and update process implemented in step S2750 as shown in FIG. 27. The scaling process S2750 at time p may be expressed as follows:

$$u(p,k) \Leftarrow u(p,k)/(u(p, 1)+ \ldots + u(p, 2^{mL}-1))$$

The scaled estimate is saved as the current estimate and the old estimates are shifted. The old estimate d time units back is discarded.

The process S2750 begins from a start state and proceeds to process step S3310, where it scales the new estimate u(p). The process S2750 then proceeds to process step S3320, where n is initialized to 1. the process S2750 then advances to process step S3330, where the old estimates are shifted. The process S2750 then advances to decision step S3340, where it determines if n is equal to d−1. If not, the process S2750 proceeds to process step S3345, where n is incremented by 1, and the process S2750 then returns to process step S3330. If n is equal to d−1, the process S2750 proceeds to process step S3350, where the estimates are updated by substituting u(p−1) by u(p). The process S2750 then terminates.

C.5 Implementation Issues

This section provides a discussion on some simplifications that can further reduce the complexity of the Convolutional code decoding process of the present invention. First consider the function f(j) that is computed and used in the first part of the recursion. This function is given by $$f(j) = \prod_{i=1}^{n} \frac{\exp(-(y(m,i) - (2g_i(j) - 1))^2)/2\sigma^2}{\sigma \exp(-(y(m,i))^2)/2}$$

Note that the denominator of this function depends only on the time index m and not on the state j. Thus, that part of the computations can be ignored. Furthermore, we can expand the numerator and since $(2g_i(j)-1)^2$ is equal one for all generators i and states j it follows that f(j) can be written as:

$$f(j) = \exp\left(\sum_{i=1}^{n} (2g_i(j) - 1)y(m,i)\right)/2\sigma^2$$

where terms that are independent of j are ignored. Now it is clear that all we really need to use in the algorithm is a monotone positive function of the inner product of the vectors h(j) and y(m).

Another important issue is that of the proper selection of the polynomial generators $g_i(x)$. It is shown in Shu Lin and Daniel J. Costelo, Jr. in *Error Control Coding: Fundamentals and Applications* (Prentice-Hall 1983), that for each decoding method there exists an optimal set of polynomials for a given constraint length L and a code rate m/n. In the present situation, it has been determined that some polynomials for the case L=7, m=1, and n=2 provide a better performance with the decoding processing of the present invention, than the one used in conjunction with the Viterbi algorithm.

The methods described in relation to the present invention may readily be carried out with a microprocessor-based system under program control. The encoding polynomials $g_1(x), \ldots g_n(x)$ as shown in process S2600 of FIG. 26 can readily be preprogrammed in memory. The processes S1800, S1900, S2000, S2100, S2200, S2260, S2300, S2400, S2600, S2700, S2720, S2730, S2740, S2740A and S2750 can readily be implemented through software running in memory.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing descriptions. All changes which come within the meaning and range of equivalency of the claims are to be embraced within their scope.

What is claimed is:

1. A method of recovering transmitted signals in a digital communications system, comprising the steps of:
   (a) obtaining n samples of a received signal for a respective time p, p−1, p−2, . . . , p−j and digitizing the n samples to provide (j+1) sets of n digitized samples;
   (b) providing (j+1) vectors based on the (j+1) sets of n digitized samples, each vector having signal estimates of a transmitted signal for a respective time (p−t), where t=0 to j;
   (c) storing the j vectors; and
   (d) providing an estimate vector having signal estimates of the transmitted signal for time (p−j), based on the (j+1) vectors.

2. The method of claim 1, further comprising the steps of:
   (e) determining if transmission of signals has ended;
   (f) if transmission has not ended, then
      (f.1) storing the vector for time p and discarding the vector for time (p−j);
      (f.2) obtaining additional n samples of the received signal for time (p+1);
      (f.3) providing an additional vector based on the additional n samples, the vector having signal estimates of the transmitted signal for time (p+1); and
      (f.4) providing an estimate vector having signal estimates of the transmitted signal for time (p+1−j), based on the additional vector and the immediately preceding j vectors.

3. The method of claim 2, further comprising the step of:
   recovering the transmitted signal based on the estimate vector having signal estimates obtained at time (p−j).

4. The method of claims 3, further comprising the steps of scaling the estimate vector and applying bit decision to the scaled estimate vector.

5. A method of recovering transmitted continuous phase modulated signals in a digital communications system, comprising the steps of:
   (a) obtaining n samples of a received signal for a respective time p, p−1, p−2, . . . , p−j and digitizing the n samples to provide (j+1) sets of n digitized samples;
   (b) providing (j+1) vectors based on the (j+1) sets of n digitized samples, each vector having signal estimates of a transmitted continuous phase modulated signal for a respective time (p−t), where t=0 to j;
   (c) storing the j vectors; and
   (d) providing an estimate vector having signal estimates of the transmitted signal for time (p−j), based on the (j+1) vectors.

6. The method of claim 5, further comprising the steps of:
   (e) determining if transmission of signals has ended;
   (f) if transmission has not ended, then
      (f.1) storing the vector for time p and discarding the vector for time (p−j);
      (f.2) obtaining additional n samples of the received signal for time (p+1);
      (f.3) providing an additional vector based on the additional n samples, the vector having signal estimates of the transmitted signal for time (p+1); and
      (f.4) providing an estimate vector having signal estimates of the transmitted signal for time (p+1−j), based on the additional vector and the immediately preceding j vectors.

7. The method of claim 6, further comprising the step of:

recovering the transmitted signal based on the estimate vector having signal estimates for time (p−j).

8. The method of claim 7, further comprising the steps of scaling the estimate vector and applying bit decision to the scaled estimate vector.

9. The method of claim 5, wherein the step (b) comprises the steps of:

(b.1) determining phase response vector p(t$_j$), where $$p(t_j) = [p(t_0), p(t_1), \ldots, p(t_{(L+2)\cdot\lambda-1})]$$

where $$t_j = -\frac{T}{2} \cdot (2L+1) + j \cdot \frac{T}{\lambda},$$

j=0, ... (L+2)·λ−1, λ is number of samples per symbol, T is symbol time and L is a predetermined integer;

(b.2) determining a first matrix G based on the phase response vector, where $$G = \begin{bmatrix} p(t_0) & p(t_1) & \cdots & p(t_{\lambda-1}) \\ p(t_\lambda) & p(t_{\lambda+1}) & \cdots & p(t_{2\lambda-1}) \\ \cdots & \cdots & \cdots & \cdots \\ p(t_{(L+1)\cdot\lambda}) & p(t_{(L+1)\cdot\lambda+1}) & \cdots & p(t_{(L+2)\cdot\lambda-1}) \end{bmatrix},$$

where $G \in \Re^{2L+1, \lambda}$ (b.3) determining a second matrix NN, where $$NN = 0_{2^{2L+1}, 2^{2L+1}} - 2 \cdot \begin{bmatrix} 0 & 0 & \cdots & 0 \\ 0 & 0 & \cdots & 1 \\ \cdots & \cdots & \cdots & \cdots \\ 1 & 1 & \cdots & 1 \end{bmatrix},$$

where $NN \in \Re^{2^{2L+1}, 2^{2L+1}}$ (b.4) providing a third matrix U, the third matrix being a product of the first and second matrices, where $$U = NN \cdot G = \begin{bmatrix} u_1 \\ \cdot \\ \cdot \\ \cdot \\ u_{2^{2L+1}} \end{bmatrix},$$

and $U \in \Re^{2^{2L+1}, \lambda}$ (b.5) providing a probability vector comprising a first probability vector g$_1$ and a second probability vector g$_2$, where $$g_1 = \cos\begin{bmatrix} v \\ v + \Delta\theta \\ \cdot \\ \cdot \\ v + (N-1) \cdot \Delta\theta \end{bmatrix}, g_2 = \sin\begin{bmatrix} v \\ v + \Delta\theta \\ \cdot \\ \cdot \\ v + (N-1) \cdot \Delta\theta \end{bmatrix}$$

where N is the number of memory states for the continuous phase modulated signal, $\Delta\theta = 2 \cdot \pi/N$;

and $$v = \begin{bmatrix} u^T \\ \cdot \\ \cdot \\ \cdot \\ \cdot \\ u^T_{2^{2L+1}} \end{bmatrix}.$$

10. The method of claim 9, wherein in the step (b.5), $$N = \left\{ \begin{array}{l} p \cdot 2^{2L}, m - \text{even} \\ 2 \cdot p \cdot 2^{2L}, m - \text{odd} \end{array} \right\}$$

and m/p is a modulation index.

11. The method of claim 5, wherein the step (d) comprises the steps of:

(d.1) determining a first transition vector q, where $$q_{i,2\cdot i-1} = q_{i,2\cdot i} = q_{i+2^{2L}, 2\cdot i-1} = q_{i+2^{2L}, 2\cdot i} = 0.5,$$

where i=1,2, ... , $2^{2L}$;

(d.2) determining a second transition vector a, where $$a_{2,1} = a_{N,1} = a_{1,N} = a_{N-1,N} = 0.5$$

$$a_{i-1,i} = a_{i+1,i} = 0.5, \text{ where } i=2, \ldots, N-1$$

where N is the Number of memory states for the continuous phase modulated signal; and (d.3) providing a transition matrix QA based on the first and second transition vectors, where $$QA = \begin{bmatrix} 0 & Q \cdot I_p & 0 & \cdot & Q \cdot I_p \\ Q \cdot I_p & 0 & Q \cdot I_p & \cdot & 0 \\ 0 & Q \cdot I_m & 0 & \cdot & 0 \\ \cdot & & & & \cdot \\ \cdot & 0 & & Q \cdot I_m & \cdot \\ 0 & \cdot & 0 & \cdot & Q \cdot I_m \\ Q \cdot I_m & 0 & 0 & \cdot & 0 \end{bmatrix},$$

-continued $$I_p = \begin{bmatrix} 1 & 0 & . & 0 & 0 & 0 \\ & & . & & & \\ 0 & 0 & 0 & . & . & . \\ & & & . & . & . \\ . & 0 & 1 & 0 & . & . \\ & & & . & & \\ . & . & 0 & 0 & 0 & . \\ & & & . & & \\ . & . & . & 0 & 1 & 0 \\ & & & & & . \\ 0 & 0 & 0 & 0 & 0 & . \\ & & & & & . \end{bmatrix}, I_p \in \mathfrak{R}^{N,N},$$

and $$I_m = \begin{bmatrix} 0 & 0 & . & 0 & 0 & 0 \\ & & . & & & \\ 0 & 1 & 0 & . & . & . \\ & & & . & . & . \\ . & 0 & 0 & 0 & . & . \\ & & & . & & \\ . & . & 0 & 1 & 0 & . \\ & & & . & & \\ . & . & . & 0 & 0 & 0 \\ & & & & & . \\ 0 & 0 & 0 & 0 & 0 & . \\ & & & & & . \end{bmatrix}, I_m \in \mathfrak{R}^{N,N}$$

(d.4) determining sample phasing matrices $Im_1$ and $Im_2$, where $$I_{m1} = \begin{bmatrix} 0 & 0 & \ldots & 1 \\ 0 & 0 & \ldots & 0 \\ . & . & & . \\ . & . & 0 & . \\ . & . & & . \\ 0 & 0 & . & 0 \\ & & . & \end{bmatrix}, I_{m1} \in \mathfrak{R}^{\lambda,\lambda},$$

$$I_{m2} = \begin{bmatrix} 0 & \ldots & 0 \\ I_{\lambda-1,\lambda-1} & & 0 \end{bmatrix}, I_{m2} \in \mathfrak{R}^{\lambda,\lambda};$$

and (d.5) determining a State Transition, $QA_f$ and providing an estimate vector based on $QA_f$.

12. The method of claim 11, wherein in step (d.2), $$N = \begin{Bmatrix} p \cdot 2^{2L}, m - \text{even} \\ 2 \cdot p \cdot 2^{2L}, m - \text{odd} \end{Bmatrix}$$

and m/p is a modulation index.

13. A method of decoding transmitted Convolutionally encoded signals in a digital communication system, comprising the steps of:

(a) obtaining n samples of a received signal for a respective time p, p−1, p−2, . . . , p−j and digitizing the n samples to provide (j+1) sets of n digitized samples;

(b) providing (j+1) vectors based on the (j+1) sets of n digitized samples, each vector having signal estimates of a transmitted signal for a respective time (p−t), where t=0 to j;

(c) storing the j vectors; and (d) providing an estimate vector having signal estimates of the transmitted signal for time (p−j), based on the (j+1) vectors.

14. The method of claim 13, further comprising the steps of:

(e) determining if transmission of signals has ended;

(f) if transmission has not ended, then (f.1) storing the vector for time p and discarding the vector for time p−j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

15. The method of claim 14, further comprising the step of:

recovering the transmitted signal based on the estimate vector having signal estimates for time (p−j).

16. The method of claim 15, further comprising the steps of scaling the estimate vector and applying bit decision to the scaled estimate vector.

17. The method of claim 13, wherein step (b) comprises the steps of:

(b.1) selecting n encoding polynomials, $g_1(x), \ldots, g_n(x)$, where $x=(0, \ldots, 2^{mL})$, m/n is the code rate and mL is a size of a shift register used for data encoding;

(b.2) determining $a_l$, where $a_l = g_l(k+i \cdot 2^{m(L-1)}) \cdot r_l$, $g_l$ being representative of the encoding polynomials $g_1(x), \ldots, g_n(x)$, $r_1$ being representative of the digitized samples, and l=1, . . . , n;

(b.3) determining a function f, where f is the exponential of the summation of $a_l$ from l=1 to l=n; and (b.4) updating the signal estimate u, where an updated estimate $u(p, k+i \cdot 2^{m(L-1)})$ is equal to the summation of u(p−1,k·2m+j) taken from j=0 to j=$2^m$−1, multiplied by the function f.

18. The method of claim 13, wherein step (d) comprises the steps of:

(d.1) summing a plurality of probabilities of state transitions from a state at time (p−1) to a state at time p to obtain an intermediate estimate vector;

(d.2) multiplying the intermediate estimate vector with a corresponding vector obtained in step (b) component by component;

(d.3) repeating steps (d.1) and (d.2) for t=2, . . . , j, to obtain the estimate vector for time (p−j).

19. An apparatus for recovering transmitted signals in a digital communications system, comprising:

a receiver for obtaining n samples of a received signal for a respective time p, p−1, p−2, . . . , p−j and digitizing the n samples to provide (j+1) sets of n digitized samples;

a decoder for providing (j+1) vectors based on the (j+1) sets of n digitized samples, each vector having signal estimates of a transmitted signal for a respective time (p−t), where t=0 to j;

a register for storing the j vectors; and the decoder also providing an estimate vector having signal estimates of the transmitted signal for time (p−j), based on the (j+1) vectors.

20. The apparatus of claim 19, wherein the decoder further determines if transmission of signals has ended, and wherein if transmission has not ended, the register further stores the vector for time p and discards the vector for time p−j, the receiver further obtains additional n samples of the received signal for time (p+1), the decoder further provides an additional vector based on the additional n samples, the vector having signal estimates of the transmitted signal for time (p+1), and the decoder further provides an estimate vector having signal estimates of the transmitted signal for time (p+1−j), based on the additional vector and the immediately preceding j vectors.

21. The apparatus of claim 20, wherein the decoder further recovers the transmitted signal based on the estimate vector having signal estimates for time (p−j).

22. The apparatus of claim 21, wherein the decoder further scales the estimate vector, and applies bit decision to the scaled estimate vector.

23. An apparatus for recovering transmitted continuous phase modulated signals in a digital communications system, comprising:

a receiver for obtaining n samples of a received signal for a respective time p, p−1, p−2, . . . , p−j and digitizing the n samples to provide (j+1) sets of n digitized samples;

a decoder for providing (j+1) vectors based on the (j+1) sets of n digitized samples, each vector having signal estimates of a transmitted continuous phase modulated signal for a respective time (p−t), where t=0 to j;

a register for storing the j vectors; and the decoder also providing an estimate vector having signal estimates of the transmitted signal for time (p−j), based on the (j+1) vectors.

24. The apparatus of claim 23, wherein the decoder further determines if transmission of signals has ended, and wherein if transmission has not ended, the register further stores the vector for time p and discards the vector for time p−j, the receiver further obtains additional n samples of the received signal for time (p+1), the decoder further provides an additional vector based on the additional n samples, the vector having signal estimates of the transmitted signal for time (p+1), and the decoder further provides an estimate vector having signal estimates of the transmitted signal for time (p+1−j), based on the additional vector and the immediately preceding j vectors.

25. The apparatus of claim 24, wherein the decoder further recovers the transmitted signal based on the estimate vector having signal estimates for time (p−j).

26. The apparatus of claim 25, wherein the decoder further scales the estimate vector, and applies bit decision to the scaled estimate vector.

27. The apparatus of claim 23, wherein the decoder provides the j vectors by:

(b.1) determining phase response vector $p(t_j)$, where $$p(t_j) = [p(t_0), p(t_1), \ldots, p(t_{(L+2)\cdot\lambda-1})]$$

where $$t_j = -\frac{T}{2} \cdot (2L+1) + j \cdot \frac{T}{\lambda},$$

j=0, . . . (L+2)·λ−1, λ is the number of samples per symbol, T is symbol time and L is a predetermined integer;

(b.2) determining a first matrix G based on the phase response vector, where $$G = \begin{bmatrix} p(t_0) & p(t_1) & \ldots & p(t_{\lambda-1}) \\ p(t_\lambda) & p(t_{\lambda+1}) & \ldots & p(t_{2\lambda-1}) \\ \ldots & \ldots & \ldots & \ldots \\ p(t_{(L-1)+\lambda}) & p(t_{(L+1)\cdot\lambda+1}) & \ldots & p(t_{(L+2)\lambda-1}) \end{bmatrix},$$

where $G \in \mathfrak{R}^{2L+1,\lambda}$ (b.3) determining a second matrix NN, where $$NN = 0_{2^{2L+1},2^{2L+1}} - 2 \cdot \begin{bmatrix} 0 & 0 & \ldots & 0 \\ 0 & 0 & \ldots & 1 \\ \ldots & \ldots & \ldots & \ldots \\ 1 & 1 & \ldots & 1 \end{bmatrix},$$

where $NN \in \mathfrak{R}^{2^{2L+1},2^{2L+1}}$ (b.4) providing a third matrix U, the third matrix being a product of the first and second matrices, where $$U = NN \cdot G = \begin{bmatrix} u_1 \\ \cdot \\ \cdot \\ \cdot \\ u_{2^{2L+1}} \end{bmatrix},$$

and $U \in \mathfrak{R}^{2^{2L+1},\lambda}$ (b.5) providing a probability vector comprising a first probability vector $g_1$ and a second probability vector $g_2$, where $$g_1 = \cos \begin{bmatrix} v \\ v + \Delta\theta \\ \cdot \\ \cdot \\ v + (N-1) \cdot \Delta\theta \end{bmatrix}, g_2 = \sin \begin{bmatrix} v \\ v + \Delta\theta \\ \cdot \\ \cdot \\ v + (N-1) \cdot \Delta\theta \end{bmatrix}$$

where N is the number of memory states for the continuous phase modulated signal, $\Delta\theta = 2 \cdot \pi/N;$ and $$v = \begin{bmatrix} u^T \\ \cdot \\ \cdot \\ \cdot \\ u^T_{2^{2L+1}} \end{bmatrix}.$$

28. The apparatus of claim 27, wherein $$N = \begin{Bmatrix} p \cdot 2^{2L}, m - \text{even} \\ 2 \cdot p \cdot 2^{2L}, m - \text{odd} \end{Bmatrix}$$

and m/p is a modulation index.

29. The apparatus of claim 23, wherein the decoder provides the estimate vector by:

(d.1) determining a first transition vector q, where $$q_{i,2\cdot i-1} = q_{i,2\cdot i} = q_{1+2^{2L},2\cdot i-1} = q_{i+2^{2L},2\cdot i} = 0.5,$$

where $i = 1, 2, \ldots, 2^{2L}$;

(d.2) determining a second transition vector a, where $$a_{2,1} = a_{N,1} = a_{1,N} = a_{N-1,N} = 0.5$$

$$a_{i-1,i} = a_{i+1,i} = 0.5, \text{ where } i = 2, \ldots, N-1$$

where N is the Number of memory states for the continuous phase modulated signal; and (d.3) providing a transition matrix QA based on the first and second transition vectors, where $$QA = \begin{bmatrix} 0 & Q \cdot I_p & 0 & . & Q \cdot I_p \\ Q \cdot I_p & 0 & Q \cdot I_p & . & 0 \\ 0 & Q \cdot I_m & 0 & . & 0 \\ . & & & & . \\ . & 0 & Q \cdot I_m & . & . \\ . & & & & . \\ 0 & . & 0 & . & Q \cdot I_m \\ . & & & & . \\ Q \cdot I_m & 0 & 0 & . & 0 \end{bmatrix},$$

$$I_p = \begin{bmatrix} 1 & 0 & . & 0 & 0 & 0 \\ 0 & 0 & 0 & . & . & . \\ . & & & & & . \\ . & 0 & 1 & 0 & . & . \\ . & & & & & . \\ . & . & 0 & 0 & 0 & . \\ . & & & & & . \\ . & . & . & 0 & 1 & 0 \\ . & & & & & . \\ 0 & 0 & 0 & 0 & 0 & . \end{bmatrix}, I_p \in \Re^{N,N},$$

and $$I_m = \begin{bmatrix} 0 & 0 & . & 0 & 0 & 0 \\ . & & & & & . \\ 0 & 1 & 0 & . & . & . \\ . & & & & & . \\ . & 0 & 0 & 0 & . & . \\ . & & & & & . \\ . & . & 0 & 1 & 0 & . \\ . & & & & & . \\ . & . & . & 0 & 0 & 0 \\ . & & & & & . \\ 0 & 0 & 0 & 0 & 0 & . \end{bmatrix}, I_m \in \Re^{N,N}$$

(d.4) determining sample phasing matrices $Im_1$ and $Im_2$, where $$I_{m1} = \begin{bmatrix} 0 & 0 & \ldots & 1 \\ 0 & 0 & \ldots & 0 \\ . & . & & . \\ . & . & 0 & . \\ . & . & & . \\ 0 & 0 & . & 0 \end{bmatrix}, I_{m1} \in \Re^{\lambda,\lambda};$$

$$I_{m2} = \begin{bmatrix} 0 & \ldots & 0 \\ I_{\lambda-1,\lambda-1} & & 0 \end{bmatrix}, I_{m2} \in \Re^{\lambda,\lambda};$$

and (d.5) determining a State Transition, $QA_f$ and providing the estimate vector based on $QA_f$.

30. The apparatus of claim 29, wherein $$N = \begin{Bmatrix} p \cdot 2^{2L}, m - \text{even} \\ 2 \cdot p \cdot 2^{2L}, m - \text{odd} \end{Bmatrix}$$

where m/p is a modulation index.

31. An apparatus for decoding transmitted Convolutionally encoded signals in a digital communication system, comprising:

a receiver for obtaining n samples of a received signal for a respective time p, p−1, p−2, . . . , p−j and digitizing the n samples to provide (j+1) sets of n digitized samples;

a decoder for providing (j+1) vectors based on the (j+1) sets of n digitized samples, each vector having signal estimates of a transmitted Convolutionally encoded signal for a respective time (p−t), where t=0 to j;

a register for storing the j vectors; and the decoder also providing an estimate vector having signal estimates of the transmitted signal for time (p−j), based on the (j+1) vectors.

32. The apparatus of claim 31, wherein the decoder further determines if transmission of signals has ended, and wherein if transmission has not ended, the register further stores the vector for time p and discards the vector for time p−j, the receiver further obtains additional n samples of the received signal for time (p+1), the decoder further provides an additional vector based on the additional n samples, the vector having signal estimates of the transmitted signal for time (p+1), and the decoder further provides an estimate vector having signal estimates of the transmitted signal for time (p+1−j), based on the additional vector and the immediately preceding j vectors.

33. The apparatus of claim 32, wherein the decoder further recovers the transmitted signal based on the estimate vector having signal estimates for time (p−j).

34. The apparatus of claim 33, wherein the decoder further scales the estimate vector, and applies bit decision to the scaled estimate vector.

35. The apparatus of claim 31, wherein the decoder provides the j vectors by:

(b.1) selecting n encoding polynomials, $g_1(x), \ldots, g_n(x)$, where $x=(0, \ldots, 2^{mL})$, m/n is the code rate and mL is a size of a shift register used for data encoding;

(b.2) determining $a_l$, where $a_l = g_l(k+i \cdot 2^{m(L-1)}) \cdot r_l$, $g_l$ being representative of the encoding polynomials $g_1(x), \ldots, g_n(x)$, $r_l$ being representative of the digitized samples, and $l=1, \ldots, n$;

(b.3) determining a function f, where f is the exponential of the summation of $a_l$ from $l=1$ to $l=n$; and (b.4) updating the signal estimate u, where an updated estimate $u(p, k+i \cdot 2^{m(L-1)})$ is equal to the summation of $u(p-1, k \cdot 2m+j)$ taken from j=0 to j=$2^m-1$, multiplied by the function f.

36. The apparatus of claim 31, wherein the decoder provides the estimate vector by:

(d.1) summing a plurality of probabilities of state transitions from a state at time (p−1) to a state at time p to obtain an intermediate estimate vector;

(d.2) multiplying the intermediate estimate vector with a corresponding vector obtained in step (b) component by component;

(d.3) repeating steps (d.1) and (d.2) for t=2, . . . , j, to obtain the estimate vector for time (p−j).

37. Computer-executable process steps for recovering transmitted signals in a digital communications system, the process steps including:

(a) obtaining n samples of a received signal for a respective time p, p−1, p−2, . . . , p−j and digitizing the n samples to provide (j+1) sets of n digitized samples;

(b) providing (j+1) vectors based on the (j+1) sets of n digitized samples, each vector having signal estimates of a transmitted signal for a respective time (p−t), where t=0 to j;

(c) storing the j vectors; and (d) providing an estimate vector having signal estimates of the transmitted signal for time (p−j), based on the (j+1) vectors.

38. The computer-executable process steps of claim 37, further including the steps of:

(e) determining if transmission of signals has ended;

(f) if transmission has not ended, then (f.1) storing the vector for time p and discarding the vector for time p−j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

39. The computer-executable process steps of claim 38, further including the step of:

recovering the transmitted signal based on the estimate vector having signal estimates for time (p−j).

40. The computer-executable process steps of claim 39, further including the steps of:

scaling the estimate vector; and applying bit decision to the scaled estimate vector.

41. Computer-executable process steps for recovering transmitted continuous phase modulated signals in a digital communications system, including the steps of:

(a) obtaining n samples of a received signal for a respective time p, p−1, p−2, . . . , p−j and digitizing the n samples to provide (j+1) sets of n digitized samples;

(b) providing (j+1) vectors based on the (j+1) sets of n digitized samples, each vector having signal estimates of a transmitted continuous phase modulated signal for a respective time (p−t), where t=0 to j;

(c) storing the j vectors; and (d) providing an estimate vector having signal estimates of the transmitted signal for time (p−j), based on the (j+1) vectors.

42. The computer-executable process steps of claim 41, further including the steps of:

(e) determining if transmission of signals has ended;

(f) if transmission has not ended, then (f.1) storing the vector for time p and discarding the vector for time p−j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

43. The computer-executable process steps of claim 42, further including the step of:

recovering the transmitted signal based on the estimate vector having signal estimates for time (p−j).

44. The computer-executable process steps of claim 43, further including the steps of:

scaling the estimate vector; and applying bit decision to the scaled estimate vector.

45. The computer-executable process steps of claim 41, wherein the step (b) comprises the steps of:

(b.1) determining phase response vector $p(t_j)$, where $$p(t_j)=[p(t_0), p(t_1), \ldots p(t_{(L+2)-l-1})]$$

where $$t_j = -\frac{T}{2} \cdot (2L+1) + j \cdot \frac{T}{\lambda},$$

j=0, . . . (L+2)·λ−1, λ is the number of samples per symbol, T is symbol time and L is a predetermined integer;

(b.2) determining a first matrix G based on the phase response vector, where $$G = \begin{bmatrix} p(t_0) & p(t_1) & \ldots & p(t_{\lambda-1}) \\ p(t_\lambda) & p(t_{\lambda+1}) & \ldots & p(t_{2\lambda-1}) \\ \ldots & \ldots & \ldots & \ldots \\ p(t_{(L-1)+\lambda}) & p(t_{(L+1)-\lambda+1}) & \ldots & p(t_{(L+2)\lambda-1}) \end{bmatrix},$$

where $G \in \Re^{2L+1,\lambda}$ (b.3) determining a second matrix NN, where $$NN = 0_{2^{2L+1},2^{2L+1}} - 2 \cdot \begin{bmatrix} 0 & 0 & \ldots & 0 \\ 0 & 0 & \ldots & 1 \\ \ldots & \ldots & \ldots & \ldots \\ 1 & 1 & \ldots & 1 \end{bmatrix},$$

where $NN \in \Re^{2^{2L+1},2^{2L+1}}$ (b.4) providing a third matrix U, the third matrix being a product of the first and second matrices, where $$U = NN \cdot G = \begin{bmatrix} u_1 \\ \cdot \\ \cdot \\ \cdot \\ u_{2^{2L+1}} \end{bmatrix},$$

and $U \in \Re^{2^{2L+1},\lambda}$ (b.5) providing a probability vector comprising a first probability vector $g_1$ and a second probability vector $g_2$, where $$g_1 = \cos \begin{bmatrix} v \\ v + \Delta\theta \\ \cdot \\ \cdot \\ v + (N-1) \cdot \Delta\theta \end{bmatrix}, g_2 = \sin \begin{bmatrix} v \\ v + \Delta\theta \\ \cdot \\ \cdot \\ v + (N-1) \cdot \Delta\theta \end{bmatrix}$$

N is the number of memory states of the continuous phase modulated signal, $\Delta\theta = 2 \cdot \pi/N;$ and $$v = \begin{bmatrix} u^T \\ \cdot \\ \cdot \\ \cdot \\ u^T_{2^{2L+1}} \end{bmatrix}.$$

46. The computer-executable process steps of claim 41, wherein in the step (b.5), $$N = \begin{Bmatrix} p \cdot 2^{2L}, m - \text{even} \\ 2 \cdot p \cdot 2^{2L}, m - \text{odd} \end{Bmatrix}$$

where m/p is a modulation index.

47. The computer-executable process steps of claim 41, wherein the step (d) comprises the steps of:

(d.1) determining a first transition vector q, where $q_{i,2 \cdot i-1} = q_{i,2 \cdot i} = q_{i+2^{2L}, 2 \cdot i-1} = q_{i+2^{2L}, 2 \cdot i} = 0.5,$ where $i = 1, 2, \ldots, 2^{2L}$;

(d.2) determining a second transition vector a, where $a_{2,1} = a_{N,1} = a_{1,N} = a_{N-1,N} = 0.5$ $a_{i-1,i} = a_{i+1,i} = 0.5$, where $i = 2, \ldots, N-1$ where N is the Number of memory states of the continuous phase modulated signal; and (d.3) providing a transition matrix QA based on the first and second transition vectors, where $$QA = \begin{bmatrix} 0 & Q \cdot I_p & 0 & . & Q \cdot I_p \\ Q \cdot I_p & 0 & Q \cdot I_p & . & 0 \\ 0 & Q \cdot I_m & 0 & . & 0 \\ . & 0 & Q \cdot I_m & . & . \\ 0 & . & 0 & . & Q \cdot I_m \\ . & . & . & . & . \\ Q \cdot I_m & 0 & 0 & . & 0 \end{bmatrix},$$

$$I_p = \begin{bmatrix} 1 & 0 & . & 0 & 0 & 0 \\ 0 & 0 & 0 & . & . & . \\ . & 0 & 1 & 0 & . & . \\ . & . & 0 & 0 & 0 & . \\ . & . & . & 0 & 1 & 0 \\ 0 & 0 & 0 & 0 & 0 & . \end{bmatrix}, I_p \in \Re^{N,N},$$

and $$I_m = \begin{bmatrix} 0 & 0 & . & 0 & 0 & 0 \\ 0 & 1 & 0 & . & . & . \\ . & 0 & 0 & 0 & . & . \\ . & . & 0 & 1 & 0 & . \\ . & . & 0 & 0 & 0 & . \\ 0 & 0 & 0 & 0 & 0 & . \end{bmatrix}, I_m \in \Re^{N,N}$$

(d.4) determining sample phasing matrices $Im_1$ and $Im_2$, where $$I_{m1} = \begin{bmatrix} 0 & 0 & \cdots & 1 \\ 0 & 0 & \cdots & 0 \\ \cdot & \cdot & & \cdot \\ \cdot & \cdot & 0 & \cdot \\ \cdot & \cdot & & \cdot \\ 0 & 0 & \cdot & 0 \\ & & \cdot & \end{bmatrix}, I_{m1} \in \mathfrak{R}^{\lambda,\lambda},$$

$$I_{m2} = \begin{bmatrix} 0 & \cdots & 0 \\ I_{\lambda-1,\lambda-1} & & 0 \end{bmatrix}, I_{m2} \in \mathfrak{R}^{\lambda,\lambda};$$

and (d.5) determining a State Transition, $QA_f$ and providing the estimate vector based on $QA_f$.

48. The computer-executable process steps of claim 47, wherein in step (d.2), $$N = \begin{Bmatrix} p \cdot 2^{2L}, m - \text{even} \\ 2 \cdot p \cdot 2^{2L}, m - \text{odd} \end{Bmatrix}$$

where m/p is a modulation index.

49. Computer-executable process steps of decoding transmitted Convolutionally encoded signals in a digital communication system, including the steps of:

(a) obtaining n samples of a received signal for a respective time p, p−1, p−2, . . . , p−j and digitizing the n samples to provide (j+1) sets of n digitized samples;

(b) providing (j+1) vectors based on the (j+1) sets of n digitized samples, each vector having signal estimates of a transmitted Convolutionally encoded signal for a respective time (p−t), where t=0 to j;

(c) storing the j vectors; and (d) providing an estimate vector having signal estimates of the transmitted signal for time (p−j), based on the (j+1) vectors.

50. The computer-executable process steps of claim 49, further including the steps of:

(e) determining if transmission of signals has ended;

(f) if transmission has not ended, then (f.1) storing the vector for time p and discarding the vector for time p−j;

(f.2) obtaining additional n samples of the received signal for time (p+1);

(f.3) providing an additional vector based on the additional n samples, the vector having signal estimates of the transmitted signal for time (p+1); and (f.4) providing an estimate vector having signal estimates of the transmitted signal for time (p+1−j), based on the additional vector and the immediately preceding j vectors.

51. The computer-executable process steps of claim 50, further including the step of:

recovering the transmitted signal based on the estimate vector having signal estimates for time (p−j).

52. The computer-executable process steps of claim 51, further including the steps of:

scaling the estimate vector; and applying bit decision to t he scaled estimate vector.

53. The computer-executable process steps of claim 49, wherein step (b) includes the steps of:

(b.1) selecting n encoding polynomials, $g_1(x), \ldots, g_n(x)$, where $x=(0, \ldots, 2^{mL})$, m/n is the code rate and mL is a size of a shift register used for data encoding;

(b.2) determining $a_l$, where $a_l = g_l(k+i \cdot 2^{m(L-1)}) \cdot r_l$, $g_l$ being representative of the encoding polynomials $g_1(x), \ldots, g_n(x)$, $r_1$ being representative of the digitized samples, and l=1, . . . ,n;

(b.3) determining a function f, where f is the exponential of the summation of $a_l$ from l=1 to l=n; and (b.4) updating the signal estimate u, where an updated estimate $u(p,k+i \cdot 2^{m(L-1)})$ is equal to the summation of $u(p-1,k \cdot 2m+j)$ taken from j=0 to $j=2^m-1$, multiplied by the function f.

54. The computer-executable process steps of claim 53, wherein step (d) includes the steps of:

(d.1) summing a plurality of probabilities of state transitions from a state at time (p−1) to a state at time p to obtain an intermediate estimate vector;

(d.2) multiplying the intermediate estimate vector with a corresponding vector obtained in step (b) component by component;

(d.3) repeating steps (d.1) and (d.2) for t=2, . . . , j, to obtain the estimate vector for time (p−j).

* * * * *

UNITED STATES PATENT AND TRADEMARK OFFICE
CERTIFICATE OF CORRECTION

PATENT NO. : 5,841,817

DATED : November 24, 1998

INVENTOR(S) : Krieger et al.

It is certified that error appears in the above-identified patent and that said Letters Patent is hereby corrected as shown below:

At Col. 3, line 30, please delete "input(i)," and insert --input b(i),--.

At Col. 6, line 2, please insert --$p(t_j) = [p(t_0), p(t_1), ... p(t_{(L+2)-1-1})]$--.

At Col. 7, line 25, please delete "N is" and insert --where N is--.

At Col. 8, line 52, please delete "(J+1))" and insert --(j+1)--.

At Col. 9, line 25, please ".$r_1g_1$" and insert --.$r_1,g_1$--.

At Col. 10, line 60, please insert --$p(t_j) = [p(t_0), p(t_1), ... p(t_{(L+2)-1-1})]$--.

At Col. 11, line 62, please insert --and m/p is a modulation index.--.

At Col. 13, line 64, please delete "n/n is" and insert --m/n is --.

At Col. 14, line 36, please delete "(J+1))" and insert --(j+1)--.

Figure 22B:
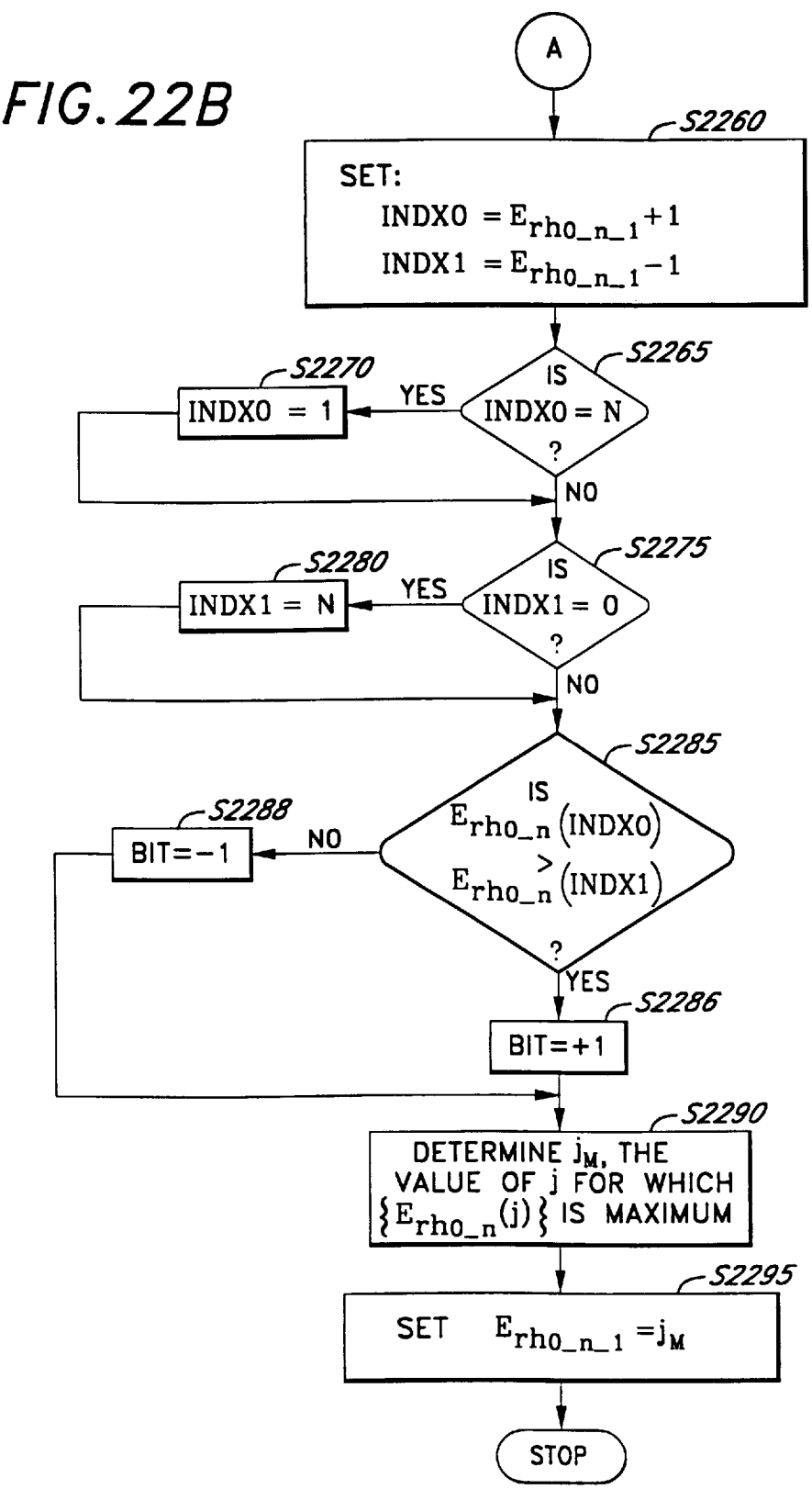

At Col. 20, line 17, please delete "FIGS 22A and 22B are" and insert --FIG 22 is--.

At Col. 27, line 28, please delete "$F_{-1}$ is" and insert --$F_{n-1}$ is--.

UNITED STATES PATENT AND TRADEMARK OFFICE
CERTIFICATE OF CORRECTION

PATENT NO. : 5,841,817

DATED : November 24, 1998

INVENTOR(S) : Krieger et al.

It is certified that error appears in the above-identified patent and that said Letters Patent is hereby corrected as shown below:

At Col. 28, line 64, please delete "$\zeta_n = f(Q, \phi_{n-1}) \cdot \zeta_{n-1} + 2_n$" and insert --$\zeta_n = f(Q, \phi_{n-1}) \cdot \zeta_{n-1} + W_n$--.

At Col. 31, line 9, please delete "$KS = 1_\lambda \oplus 1^1{}_{80.2}{}^{2L+1}$" and insert --$KS = 1_\lambda \oplus 1^1{}_{\lambda.2}{}^{2L+1}$--.

Signed and Sealed this

Twenty-fifth Day of January, 2000

Attest:

*Attesting Officer*

*Acting Commissioner of Patents and Trademarks*